United States Patent [19]
Amano et al.

[11] Patent Number: 5,937,218
[45] Date of Patent: Aug. 10, 1999

[54] CAMERA CAPABLE OF RECORDING INFORMATION RELATIVE TO PRINTING PROCESSING

[75] Inventors: Kenichiro Amano; Masaaki Ishihara, both of Kanagawa-ken, Japan

[73] Assignee: Canon Kabushiki Kaisha, Tokyo, Japan

[21] Appl. No.: 08/803,544

[22] Filed: Feb. 20, 1997

Related U.S. Application Data

[63] Continuation of application No. 08/410,054, Mar. 24, 1995, abandoned.

[30] Foreign Application Priority Data

| Mar. 31, 1994 | [JP] | Japan | 6-063527 |
| Mar. 31, 1994 | [JP] | Japan | 6-083599 |
| Apr. 21, 1994 | [JP] | Japan | 6-105041 |
| Jun. 10, 1994 | [JP] | Japan | 6-151831 |
| Jun. 10, 1994 | [JP] | Japan | 6-151832 |

[51] Int. Cl.$^6$ .................................................. G03B 17/24
[52] U.S. Cl. ................................................................ 396/311
[58] Field of Search .......................... 354/106, 105; 396/311, 310, 319, 315

[56] References Cited

U.S. PATENT DOCUMENTS

| 4,364,647 | 12/1982 | Kawamura et al. | 354/23 D |
| 5,016,039 | 5/1991 | Sosa et al. | 354/430 |
| 5,227,823 | 7/1993 | Shigaki | 354/106 |
| 5,432,571 | 7/1995 | Aoki et al. | 354/106 |

OTHER PUBLICATIONS

Patent Abstracts of Japan No. JP3072338, vol. 15, No. 237, Mar. 27, 1991.
Patent Abstracts of Japan No. JP4353837, vol. 17, No. 220, Dec. 8, 1992.

*Primary Examiner*—Safet Metjahic
*Assistant Examiner*—Christopher E. Mahoney
*Attorney, Agent, or Firm*—Robin, Blecker & Daley

[57] ABSTRACT

The present invention relates to a camera capable of recording information indicative of an instruction to inhibit automatic printing on a film and, more particularly, to a camera capable of automatically recording information indicative of an instruction to inhibit such automatic printing, if photography unsuited to the automatic printing is performed for not less than a predetermined number of exposed frames of the film.

34 Claims, 48 Drawing Sheets

FIG. 7
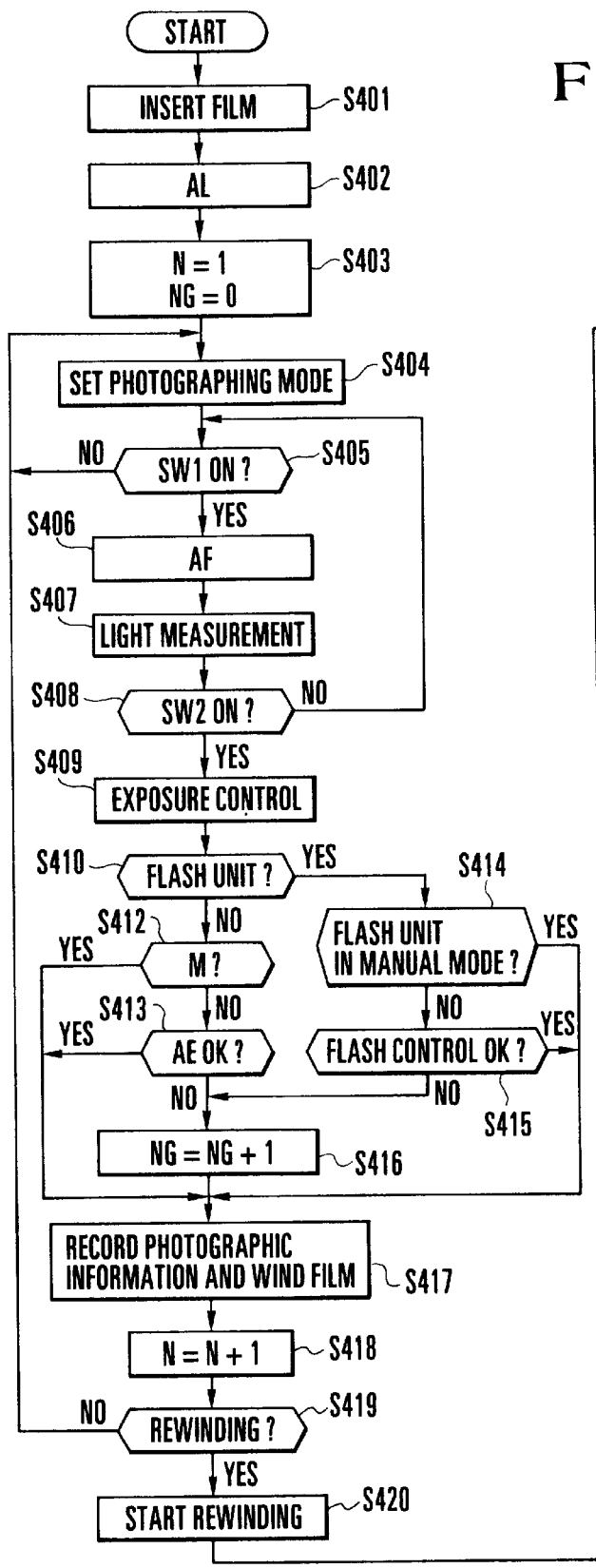
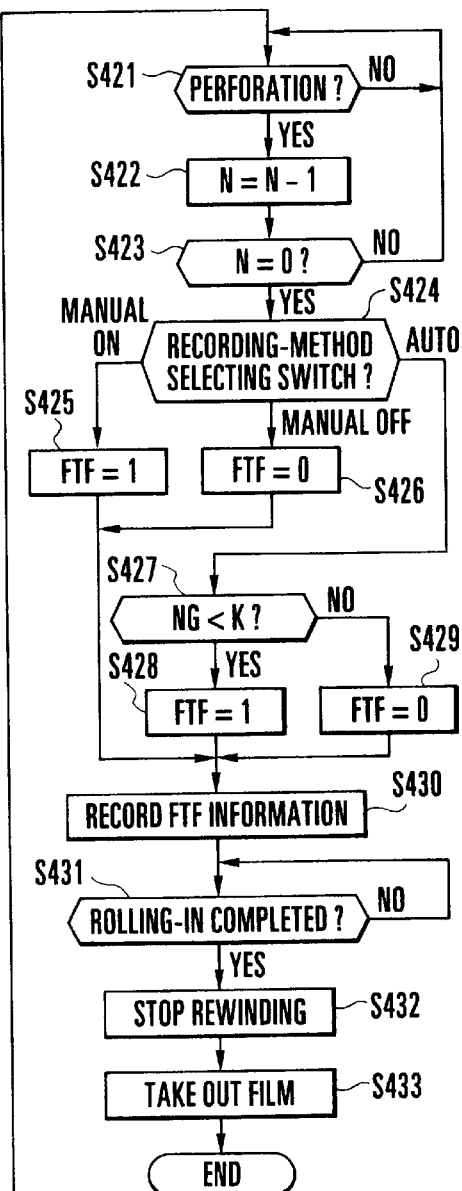

F I G.32
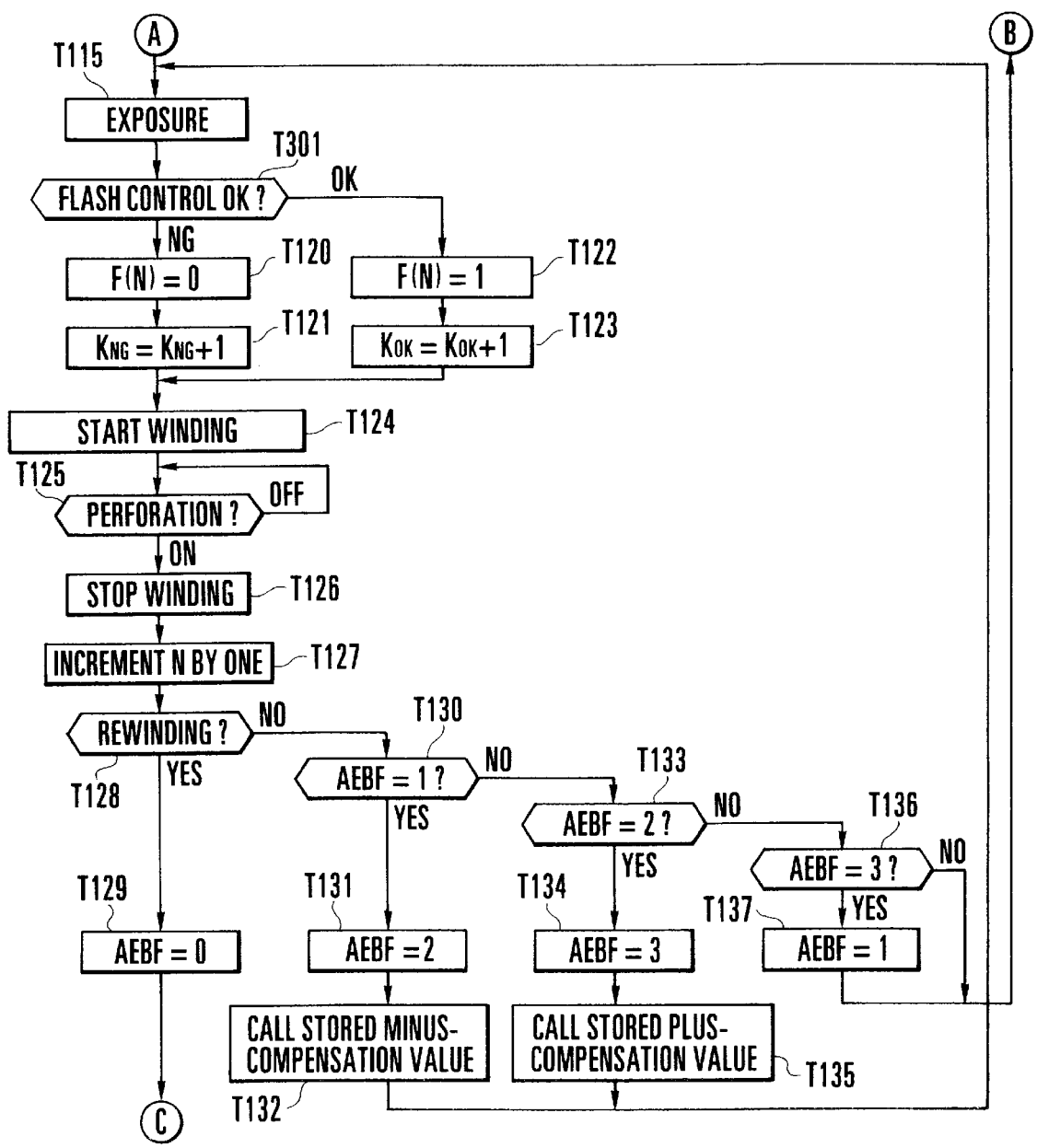

CAMERA CAPABLE OF RECORDING INFORMATION RELATIVE TO PRINTING PROCESSING

This is a continuation application under 37 CFR 1.62 of prior application Ser. No. 08/410,054, filed Mar. 24, 1995, now abandoned.

BACKGROUND OF THE INVENTION

1. Field of the Invention

The present invention relates to a camera capable of making a decision as to the state of exposure during photography and recording the resultant photographic information on a film to specify a method of producing photographic prints from the film, and, more particularly, to an information recording method for recording such photographic information.

2. Description of the Related Art

A conventional process for producing prints from a developed negative film through the printing processing of an automatic printer includes the steps of finding the integral transmission density of the whole of each individual exposed frame from the light transmitted therethrough, determining an amount of print exposure for each individual exposed frame, and performing printing processing on the basis of the amount of print exposure on a frame-by-frame basis, thereby compensating for exposure fluctuations and color failure occurring during photography and producing prints each having an optimum density and color balance.

However, such a printing method using an automatic printer assumes a uniform printing finish and is, therefore, unable to reflect the image-creating intention of each individual photographer. For example, if a person is photographed at a correct exposure level under backlighting conditions, the person will be printed as a shaded (or dark) photographic image through automatic printing based on the amount of print exposure determined depending on a high-luminance portion which surrounds the person.

To cope with the printing problem involved in the automatic printer, Japanese Laid-Open Patent Application No. Hei 3-72338 entitled "CAMERA AND PHOTOGRAPHIC PRINTER" discloses a system in which a mark indicating that no exposure compensation is needed is recorded on a film during photography and, during printing, an automatic printer determines whether automatic compensation for the amount of print exposure is needed, by making a decision as to the presence or absence of such mark. According to this system, during printing, if the automatic printer detects the mark recorded on the film during photography, the automatic printer performs printing based on a reference amount of print exposure (the amount of print exposure required to produce a print of optimum density and color balance from a normally exposure-controlled negative film) without performing automatic compensation for the amount of print exposure of each individual frame.

Japanese Laid-open Patent Application No. Hei 4-319933 entitled "PHOTOGRAPHIC PRINTING METHOD" discloses a system suitable for use with a camera or the like having an AE (automatic exposure) function of high exposure accuracy. According to the system, "information indicating that the amount of exposure has been determined by a multiple-point light measuring system or information indicating that the amount of exposure has been determined from the value of light measured when focusing was performed by an autofocus system" is recorded on a film in the form of a bar code or the like. During printing, a printer determines whether the bar code is recorded on the film, and if there is no such information recording, the printer performs the processing of compensating for the amount of print exposure for each individual frame. If there is such information recording, the printer obtains the integral transmission densities of all frames of the film and determines a reference amount of print exposure on the basis of an average value of the integral transmission densities.

In addition, Japanese Laid-open Patent Application No. Hei 5-127271 entitled "PHOTOGRAPHIC-PRINT PRODUCING METHOD" discloses a system suitable for use with recent cameras or the like capable of performing high-precision exposure control which does not require a large amount of compensation for the amount of print exposure because of its uniform exposure control. This system is arranged to switch a print exposure method by determining whether discrimination information is recorded on a film. Specifically, during photography, each time a frame is exposed under correct exposure control by a camera, the camera records discrimination information on an information recording part for the frame in the form of a bar code or the like. During printing, a printer individually reads the discrimination information for each of the frames, and if an information recording part on which the discrimination information is recorded is detected, the printer performs printing of the corresponding frame with a predetermined time of timer exposure by slightly modifying a fixed amount of print exposure on the basis of a deviation of the speed of the film. If an information recording part on which the discrimination information is not recorded is detected, the printer performs automatic printing of the corresponding frame by automatically compensating for the amount of print exposure.

Any of the above-described conventional methods has a number of problems. One problem is that even if all frames of one film are correctly exposed by a camera, the same information indicative of correct exposure must be recorded for each individual frame of the frame, so that it is impossible to effectively use the information recording parts of the film. Another problem is that a printer must make a decision as to the state of exposure of each individual frame by reading the same information therefrom on a frame-by-frame basis by means of a reader device, such as a bar code reader, so that the processing capability of the printer is lowered.

The pace of improvement of the performance of cameras themselves has recently been accelerated, and recent cameras have multiple functions and are highly precisely controlled so that a main subject can be correctly exposed under exposure control using AF control and AE control. For example, a camera has been provided which has multiple distance measuring points to used for AF as well as multiple light measuring areas corresponding to the respective distance measuring points. During photography using such a camera, if a photographer selects a main subject by means of a visual line, the camera automatically focuses the main subject and performs light measurement corresponding to the main subject, thereby performing exposure control to optimize the negative density of the main subject. Since all frames of one film are correctly exposed in this manner, it becomes less necessary to compensate for the amount of print exposure. In such a situation, recording of the same information for each individual frame leads to the remarkable problem that the information recording parts of the respective frames of a film cannot be effectively used and the processing capability of a printer is lowered.

SUMMARY OF THE INVENTION

It is, therefore, an object of the present invention to provide a camera capable of recording information indicative of an instruction to inhibit automatic printing of all frames of a film, if photography unsuited to automatic printing processing is performed.

Another object of the present invention is to provide a camera capable of recording information indicative of an instruction to inhibit automatic printing of all frames of a film, if photography unsuited to automatic printing processing is performed for not less than a predetermined number of frames.

Another object of the present invention is to provide a camera of improved operability which has a mode for recording information indicative of an instruction to inhibit automatic printing of all frames of a film and a mode for recording such information if photography unsuited to automatic printing processing is performed.

Another object of the present invention is to provide a camera capable of recording information indicative of an instruction to inhibit automatic printing of all frame of a film, if the number of frames for which photography unsuited to automatic printing processing is performed is large, and, if the number of frames for which photography unsuited to automatic printing processing is small, recording information indicative of an instruction to individually inhibit automatic printing of each of the frames.

Another object of the present invention is to provide a camera capable of selecting either one of a mode for recording information indicative of an instruction to inhibit automatic printing of all frames of a film and a mode for recording information indicative of an instruction to individually inhibit automatic printing of each frame unsuited to the automatic printing.

Another object of the present invention is to provide a camera which allows a user to manually choose whether to record information indicative of an instruction to inhibit automatic printing of all frames of a film and which is capable of inhibiting recording of such information if the number of frames unsuited to automatic printing processing is small, even if it is chosen that such information be recorded.

Another object of the present invention is to provide a camera capable of optimally performing recording of the aforesaid information and its operational control by matching the operation of recording the aforesaid information with the state of a photographic operation of the camera.

Another object of the present invention is to provide a camera which allows a user to manually select a mode for recording information indicative of an instruction to inhibit automatic printing or an automatic printing mode and which is capable of inhibiting the manually selected mode from being changed after even one frame has been exposed.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 7 is a flowchart of the processing of a camera according to a fourth embodiment of the present invention;

FIG. 32 is a flowchart showing the operation of a fourteenth embodiment of the present invention;

DETAILED DESCRIPTION OF THE PREFERRED EMBODIMENTS

Preferred embodiments of the present invention will be described below with reference to the accompanying drawings.

Figure 1:
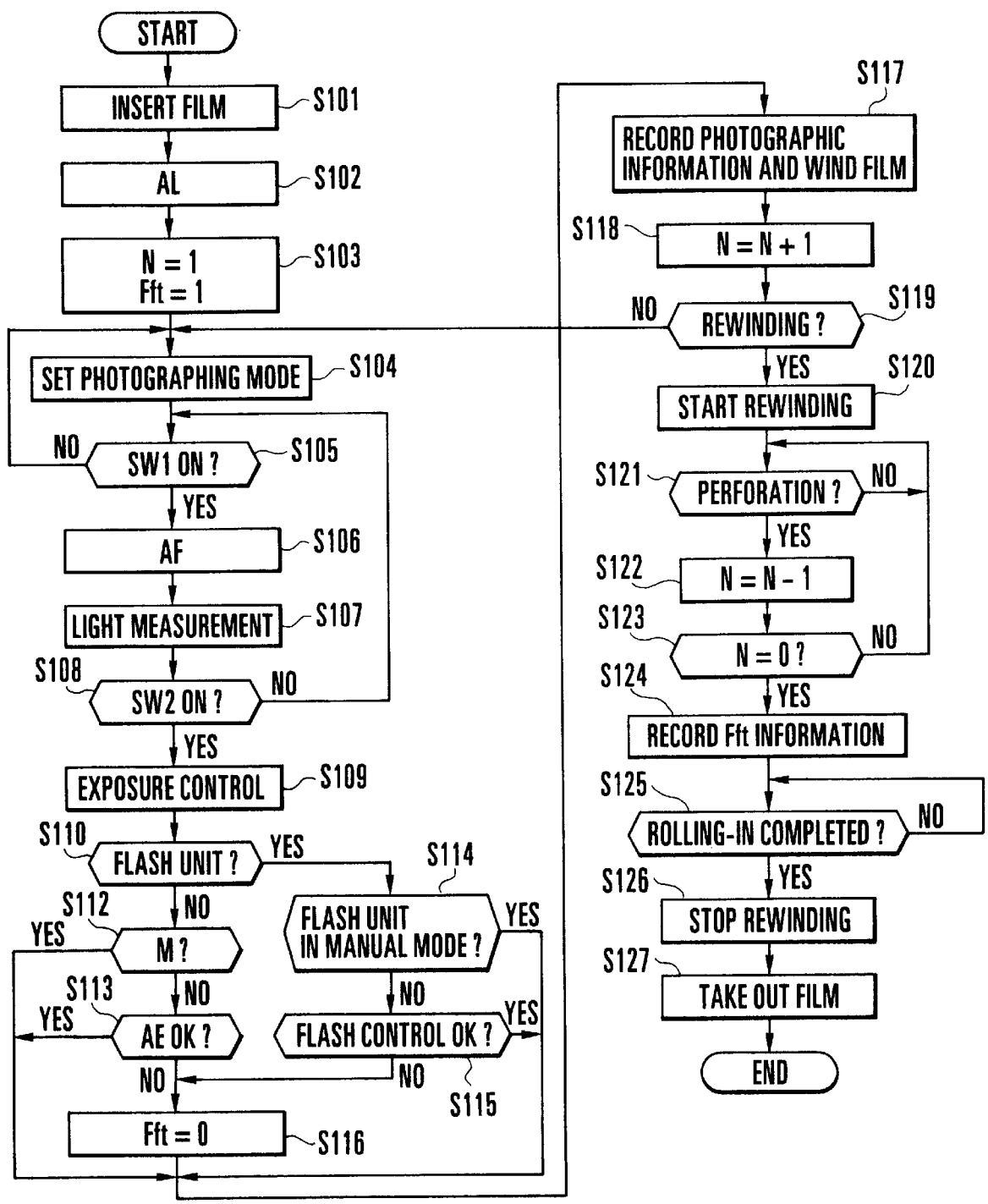
FIG. 1 is a flowchart of the processing of a camera according to a first embodiment of the present invention.
Figure 2:
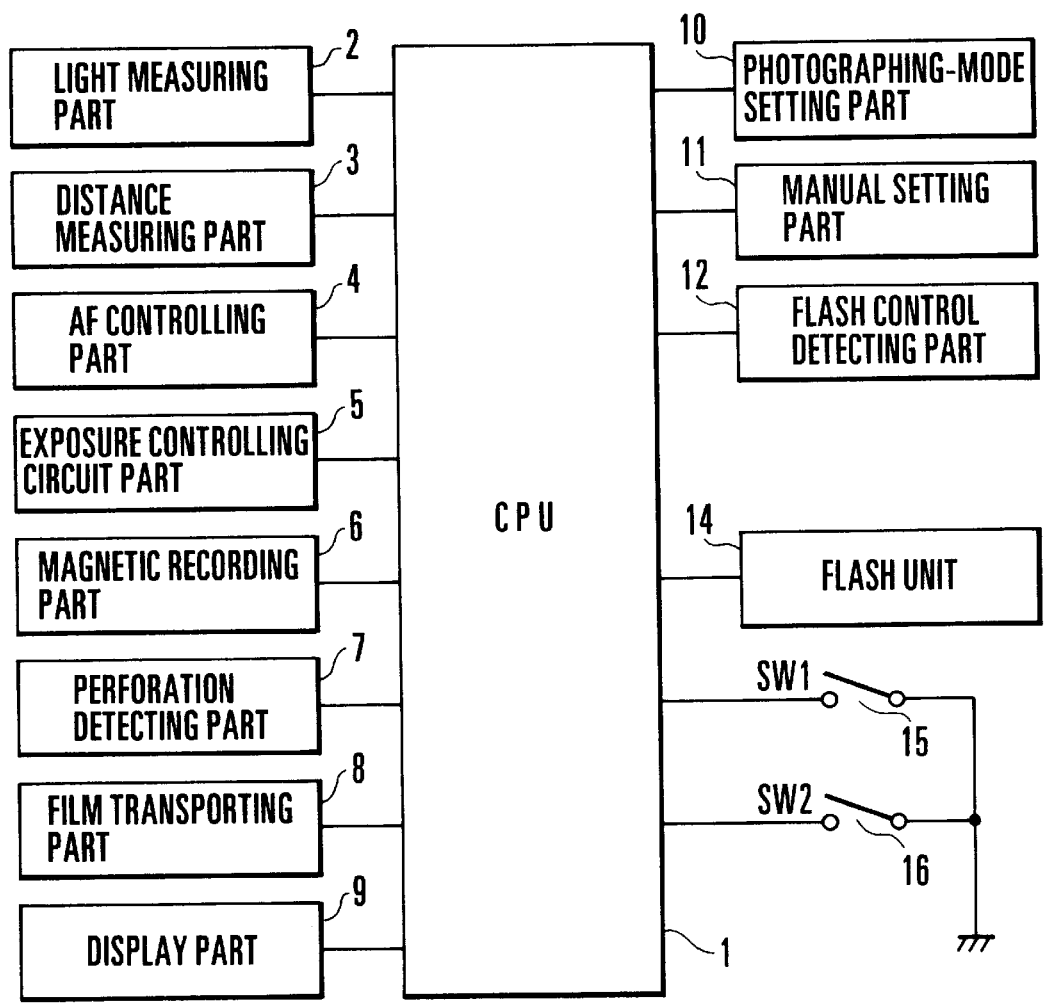
FIG. 2 is a block diagram showing the circuit arrangement of the camera to which the present invention is applied.
Figure 3:
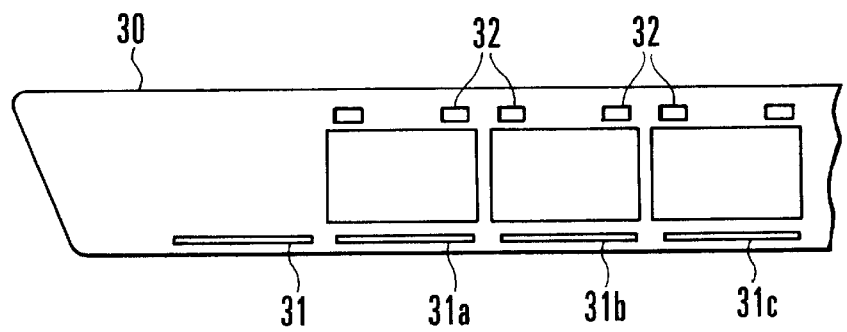
FIG. 3 is a schematic plan view of a film for use in the camera shown in FIG. 2.

FIGS. 1 to 3 show a first embodiment of the present invention.

FIG. 1 is a flowchart of information recording processing for a camera according to the first embodiment of the present invention.

FIG. 2 is a block diagram of the circuit arrangement of the camera according to the first embodiment shown in FIG. 1.

FIG. 3 is a plan view of a film for use in the camera shown in FIG. 2.

In the camera according to the first embodiment shown in FIG. 2, its entire operation, display processing and the like are controlled by a CPU 1. A light measuring part 2 has a spot light measuring range disposed in the center of an image area sensor or the like and is provided with divided light measurement and spot light measurement. The output of the light measuring part 2 is inputted to the CPU 1 as light measurement data. A distance measuring part 3 measures the distance to a subject and inputs the distance measurement data to the CPU 1, and an AF controlling part 4 performs AF control in accordance with the distance measurement data processed by the CPU 1.

An exposure controlling circuit part 5 performs exposure control on the basis of exposure control information processed by the CPU 1 according to photographic information such as the input light measurement data. A magnetic recording part 6 records information, such as an instruction to perform printing based on a reference amount of print exposure, on a recording portion of a film 30 of the type shown in FIG. 3 via a magnetic head. The recording portion includes a leader-part recording area 31 as well as recording areas 31a to 31c . . . 31n which are allocated to individual frames.

Transport and rewinding of the film 30 are carried out by causing a perforation detecting part 7, such as a photoreflector, to detect perforations 32 formed in the film 30, confirming the position of a frame on the film 30 and causing a film transporting part 8 to drive a film transporting motor (not shown). A display part 9, such as an LCD, displays the state of the camera, input information data, an exposure control value, a frame number and the like under the control of the CPU 1.

A photographing-mode setting part 10 is provided for selecting any one of photographing modes such as aperture priority AE, shutter priority AE, program AE and manual. If a user selects the manual mode by the photographing-mode setting part 10, the user inputs an aperture value and a shutter speed through a manual setting part 11 as control exposure values.

A flash unit 14 which operates during flash photography has an automatic mode for automatically controlling the amount of flash emission and a manual mode for manually setting the amount of flash emission. A flash control detecting part 12 makes a decision as to whether the amount of flash emission has reached a predetermined amount under flash control. The camera is also provided with a release switch made up of a switch SW1 15 for starting light measurement and distance measurement at the first stroke and a switch SW2 16 for starting exposure at the second stroke.

A first embodiment of an information recording method for use in the camera having the above-described arrangement and construction will be described below with reference to FIG. 1. First of all, it is confirmed whether the insertion of the film 30 has been completed (S101), and the film transporting part 8 is operated to perform automatic loading (AL) of the film 30, thereby driving the film 30 up to a predetermined position where photography is possible and stopping the film 30 at that position (S102). A frame number N is set to "1" and a flag Fft, which indicates information relative to the reference amount of print exposure to be recorded on the leader-part recording area 31 of the film 30, is set to "1" (S103). Then, any one of the photographing modes is set through the photographing-mode setting part 10 (S104). This step S104 is repeated until the SW1 15 is pressed. When the SW1 15 is turned on (S105), the CPU 1 causes the distance measuring part 3 to perform distance measurement, converts the result of the distance measurement into the amount of lens driving, and causes the AF controlling part 4 to perform AF (S106). Then, the light measuring part 2 is made to perform light measurement (S107). These steps are repeated until the SW2 16 is pressed. When the SW2 16 is turned on (S108), the exposure controlling circuit part 5 is made to perform exposure control to expose the film 30 (S109).

The following steps S110 to S116 perform the processing of making a decision as to the flag Fft. The steps S110 to S115 perform the processing of making a decision as to the processing result of the exposure control performed in Step S109. First, if the flash unit 14 is off (not used) (if the answer in Step S110 is NO), the process proceeds to Step S112. If any one of the AE photographing modes has been selected and the result of AE (automatic exposure) is N.G. (incorrect exposure) (the answers in both Steps S112 and S113 are NO), the flag Fft is reset to "0" (S116). If the flash unit 14 is on (used) (if the answer in Step S110 is YES), the process proceeds to Step S114. If automatic flash photography has been selected and the result of flash control is N.G. (incorrect exposure) (the answers in both Steps S114 and S115 are NO), the flag Fft is reset to "0" (S116). In any other case, the flag Fft remains "1". In these steps, Fft=0 represents a decision indicating that no correct exposure control has been effected. If manual photography in which both an aperture value and a shutter speed are manually set is performed, the flag Fft remains "1", as in Step S112 or S114. Accordingly, if the photographing mode is switched from AE photography to manual photography while the film 30 is in use or manual photography is performed for every frame of the film 30, it is determined that correct exposure has been effected, and correct-exposure information (which can be used instead of the information relative to the reference amount of print exposure) is recorded (a printer produces a print from each frame with an equal predetermined amount of exposure in accordance with the correct-exposure information). Since no automatic printing is performed, it is possible to produce a print which reflects the photographic intention of the user and conforms to the state of exposure of the manual photography.

While the film 30 is being transported by the film transporting part 8, the photographic information required for the exposed frame (ordinary photography recording information, such as year, month and day, other than the reference amount of print exposure indicated by the flag Fft) is recorded on the corresponding one of the recording areas 31a to 31c ... 31n of the film 30. The CPU 1 detects the perforations 32 via the perforation detecting part 7 to confirm whether film winding has been completed, and if the completion of the film winding is confirmed, the CPU 1 brings a photographic cycle for that frame to an end (S117).

Then, the frame number N of the film 30 is incremented by one (S118), and whether rewinding is needed is determined according to whether the frame number N has reached a maximum frame number beyond which no photography is allowed (S119). If the current frame is not the last frame and no film winding is needed, the process returns to Step S104. If the answer in Step S119 is YES, the film transporting part 8 is activated to start rewinding (S120). The CPU 1 detects the perforations 32 of the film 30 via the perforation detecting part 7 and confirms the frame position of the film 30 which is being rewound (S121). If the film 30 is rewound by one frame, the CPU 1 decrements the frame number N by one (S122). This processing is continued until the frame number N reaches "0" (S123). If the frame number N reaches "0", correct-exposure information indicated by the flag Fft (information indicative of an instruction to perform printing based on the reference amount of print exposure) is recorded on the leader-part recording area 31 of the film 30 by the magnetic recording part 6 (S124). Film transport is continued until the film 30 is completely rolled in a cartridge (not shown) (S125). If the rolling-in operation is completed, the CPU 1 stops the rewinding of the film 30 (S126). When the exposed film 30 is taken out from the camera, a series of sequential operations is brought to an end (S127).

As described above, according to the first embodiment, if all the frames of the film 30 are exposed in any one of the AE photographing modes and an automatic flash photographing mode and the flag Fft indicative of an instruction to perform printing based on the reference amount of print exposure is set to "1" for all the frames, information indicative of Fft=1 is recorded on the leader-part recording area 31 of the film 30. Accordingly, unlike the conventional example, it is not necessary to individually record such information for each of the frames, and a printer can produce perfect prints from all the frames of the film 30 at one time through a printing process based on the reference amount of print exposure by reading the information indicative of Fft=1 from only the leader-part recording area 31. In addition, it is possible to utilize each of the recording areas 31a to 31c ... 31n for various other useful purposes.

Figure 4:
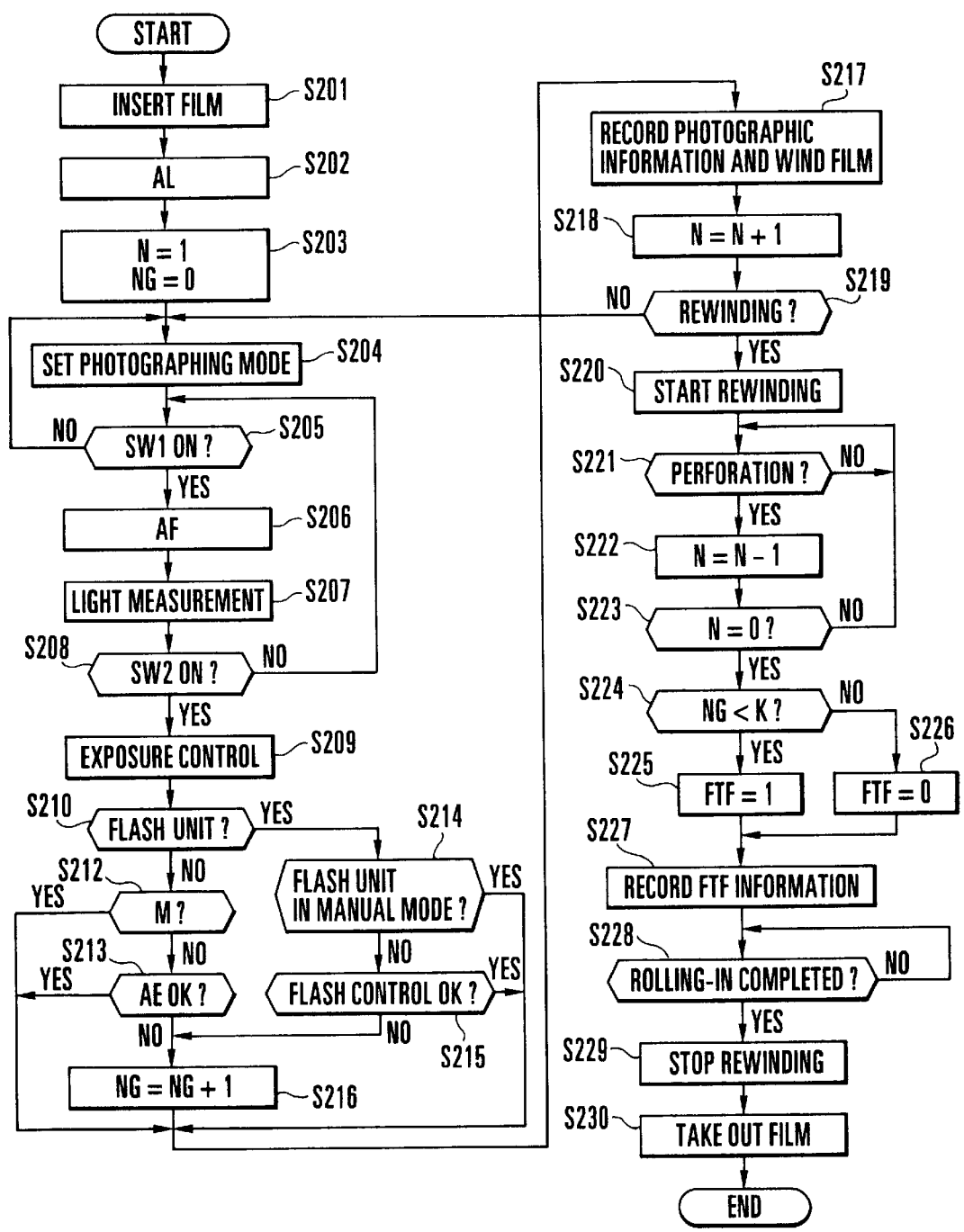
FIG. 4 is a flowchart of the processing of a camera according to a second embodiment of the present invention.

A second embodiment of the present invention will be described below. FIG. 4 is a flowchart of information recording processing for a camera according to the second embodiment of the present invention. Although the processing according to the second embodiment will be described below with reference to FIG. 4, a camera and a film which are used in the second embodiment are identical to those used in the first embodiment.

First of all, it is confirmed whether the insertion of the film 30 has been completed (S201), and the film transporting part 8 is made to perform automatic loading of the film 30, thereby driving the film 30 up to a predetermined position where photography is possible and stopping the film 30 at that position (S202). The frame number N is set to "1" and an N.G. counter which provide a criterion for determining whether to record information on the leader-part recording area 31 is set to "0" (S203). Then, any one of the photographing modes is set through the photographing-mode setting part 10 (S204). If the switch SW1 15 for starting light measurement and distance measurement is turned on (S205), the CPU 1 causes the distance measuring part 3 to perform distance measurement, converts the result of the distance measurement into the amount of lens driving, and causes the AF controlling part 4 to perform AF (S206). Then, the light measuring part 2 is made to perform light measurement (S207). If the switch SW2 16 for starting exposure is turned on (S208), the exposure controlling circuit part 5 is made to perform exposure control to expose the film 30 (S209).

The following steps S210 to S216 perform the processing of making a decision as to the N.G. counter. The steps S210 to S215 perform the processing of making a decision as to the processing result of the exposure control performed in Step S209. First, if the flash unit 14 is off (if the answer in Step S210 is NO), the process proceeds to Step S212. If any one of the AE photographing modes has been selected and the result of AE (automatic exposure) is N.G. (incorrect exposure) (the answers in both Steps S212 and S213 are NO), the N.G. counter is incremented by one (S216). If the flash unit 14 is on (if the answer in Step S210 is YES), the process proceeds to Step S214. If automatic flash photography has been selected and the result of flash control is N.G. (incorrect exposure) (the answers in both Steps S214 and S215 are NO), the N.G. counter is incremented by one (S216). In any other case, the N.G. counter remains unchanged. Processing for manual photography is similar to that described previously in connection with the first embodiment.

While the film 30 is being transported by the film transporting part 8, the ordinary photographic information required for the exposed frame, such as year, month and day, is recorded on the corresponding one of the recording areas 31a to 31c . . . 31n of the film 30. The CPU 1 detects the perforations 32 via the perforation detecting part 7 to confirm whether film winding has been completed, and if the completion of the film winding is confirmed, the CPU 1 brings a photographic cycle for that frame to an end (S217). Then, the frame number N is incremented by one (S218), and whether rewinding is needed is determined according to whether the frame number N has reached the maximum frame number (which is preset) beyond which no photography is allowed (S219). If the answer in Step S219 is YES, the film transporting part 8 is activated to start rewinding (S220). The CPU 1 detects the perforations 32 of the film 30 via the perforation detecting part 7 (S221), and each time the film 30 is rewound by one frame, the CPU 1 decrements the frame number N by one (S222). This processing is continued until the frame number N reaches "0" (S223).

Then, the CPU 1 makes a decision as to the N.G. counter by comparing the value of the N.G. counter with a predetermined value K (S224). If the value of the N.G. counter is less than K, the CPU 1 determines that the number of incorrectly exposed frames is small and sets a flag FTF to "1" which indicates an instruction to perform printing based on a reference amount of print exposure (S225). On the other hand, if the value of the N.G. counter is not less than K, the CPU 1 determines that the number of incorrectly exposed frames is large and resets the flag FTF to "0" which indicates an instruction to perform automatic printing (S226). Information according to the value of the flag FTF is recorded on the leader-part recording area 31 of the film 30 (S227). Then, film transport is continued until the film 30 is completely rolled in the cartridge (S228). If the rolling-in operation is completed, the CPU 1 stops the rewinding of the film 30 (S229). When the exposed film 30 is taken out from the camera (S230), a series of sequential operations is brought to an end. Incidentally, if the above K is set to "1", the flag FTF is set to "1" when all frames are correctly exposed.

As described above, in accordance with the second embodiment, the value of the N.G. counter which is based on the result of exposure control performed for each frame is compared with the predetermined value K, and if the number of incorrectly exposed frames is small, information indicative of FTF=1, which indicates an instruction to perform printing based on the reference amount of print exposure, is recorded on the leader-part recording area 31. Accordingly, the printer can process all the frames of one film at one time by reading the information indicative of FTF=1 from only the leader-part recording area 31, thereby producing prints of practically satisfactory quality.

Figure 5:
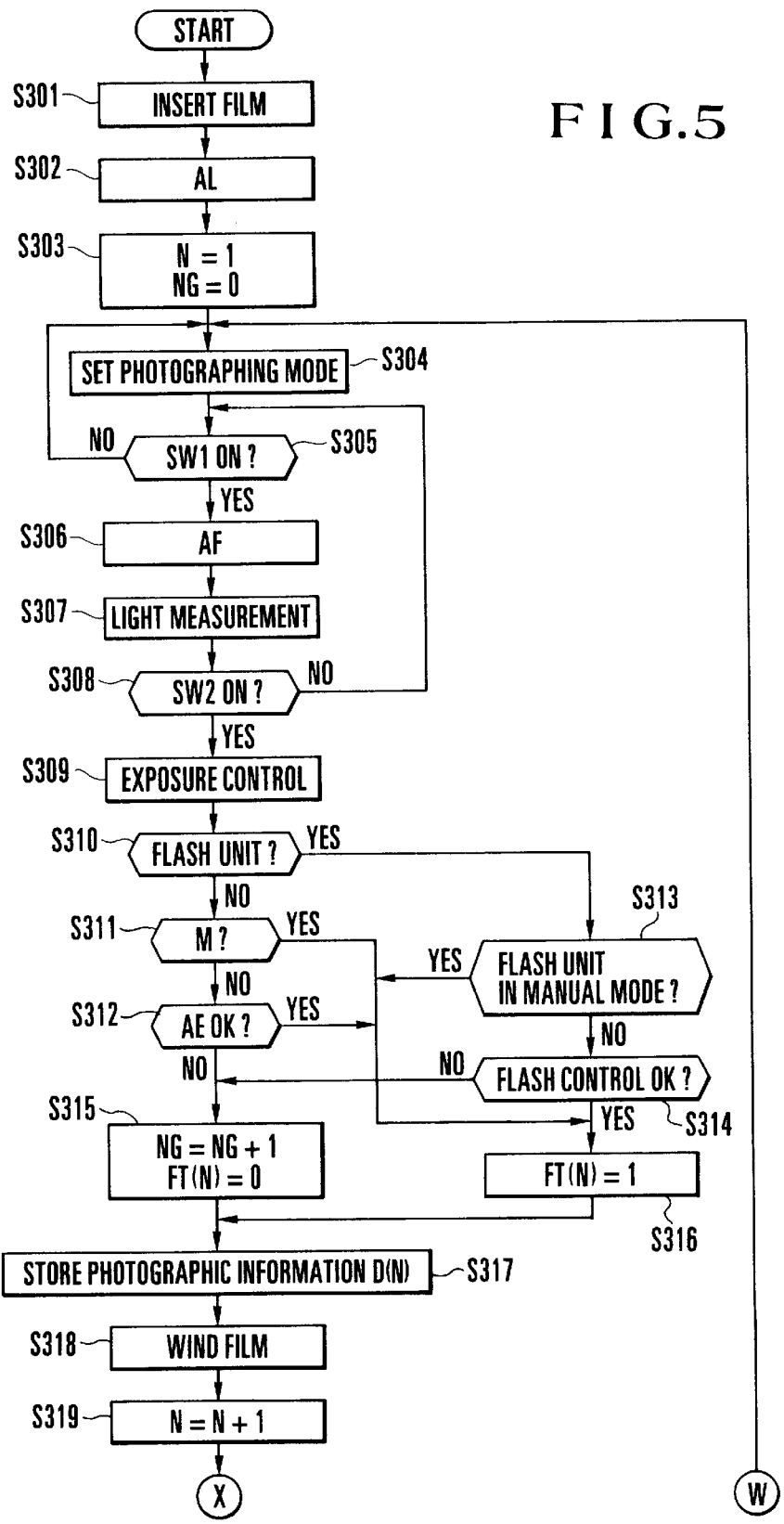
FIG. 5 is a flowchart of the processing of a camera according a third embodiment of the present invention.
Figure 6:
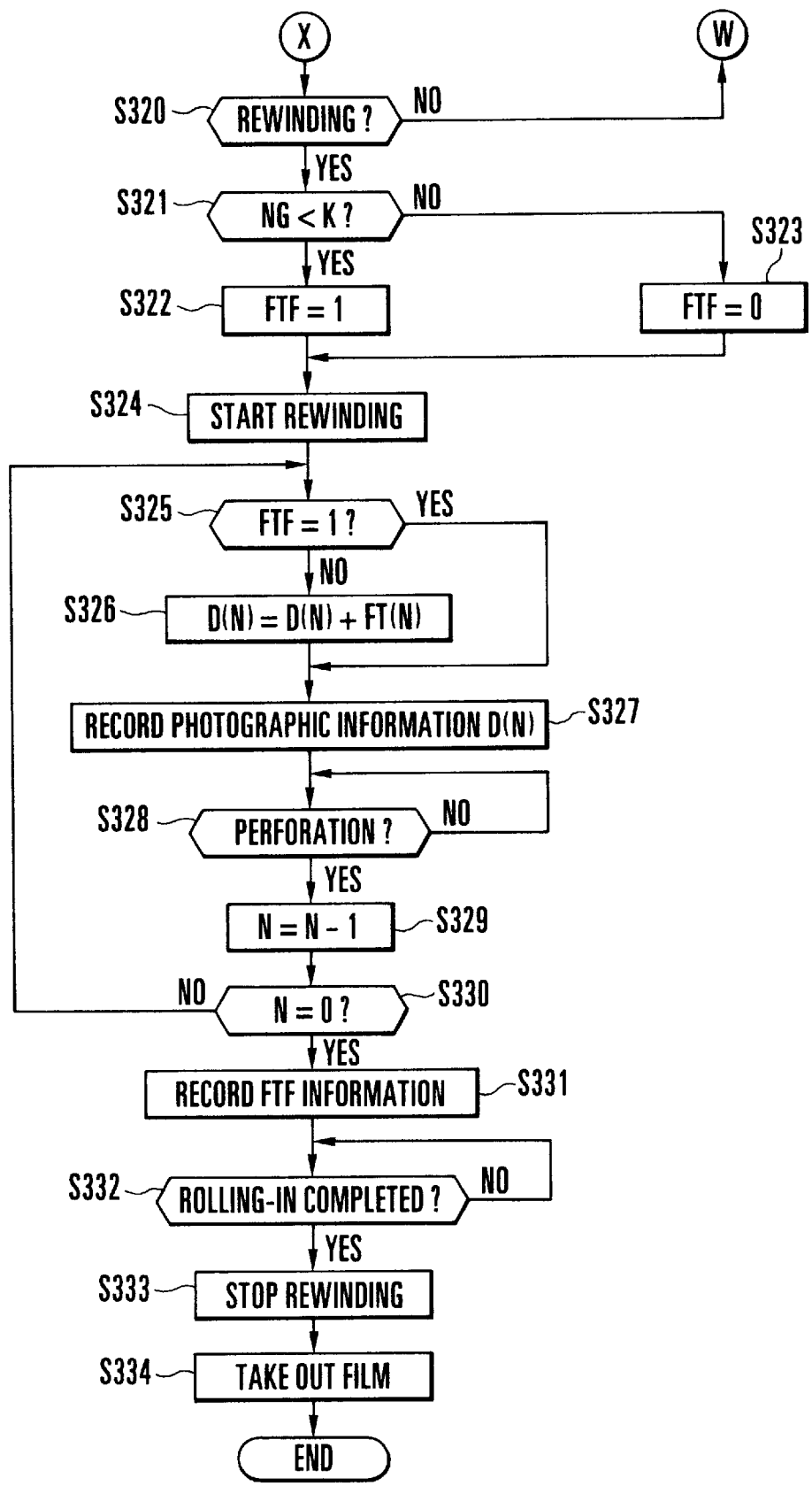
FIG. 6 is a companion flowchart of the processing of the camera according to a third embodiment of the present invention.

A third embodiment of the present invention will be described below. FIGS. 5 and 6 show a flowchart of information recording processing for a camera according to the third embodiment of the present invention. The processing according to the third embodiment will be described below with reference to FIGS. 5 and 6. A camera and a film which are used in the third embodiment are identical to those used in the first embodiment.

First of all, it is confirmed whether the insertion of the film 30 has been completed (S301), and the film transporting part 8 is made to perform automatic loading of the film 30, thereby driving the film 30 up to a predetermined position where photography is possible and stopping the film 30 at that position (S302). The frame number N is set to "1" and an N.G. counter, which provides a criterion for determining whether to record information on the leader-part recording area 31 or each of the recording areas 31a to 31c . . . 31n, is set to "0" (S303). Then, any one of the photographing modes is set through the photographing-mode setting part 10 (S304). If the SW1 15 is turned on (S305), the CPU 1 causes the distance measuring part 3 to perform distance measurement, converts the result of the distance measurement into the amount of lens driving, and causes the AF controlling part 4 to perform AF (S306). Then, the light measuring part 2 is made to perform light measurement (S307). If the SW2 16 is turned on (S308), the exposure controlling circuit part 5 is made to perform exposure control to expose the film 30 (S309).

The following steps S310 to S316 perform the processing of making a decision as to the N.G. counter. The steps S310 to S315 perform the processing of making a decision as to the processing result of the exposure control performed in Step S309. First, if the flash unit 14 is off (if the answer in Step S310 is NO), the process proceeds to Step S311. If any one of the AE photographing modes has been selected and the result of AE (automatic exposure) is N.G. (incorrect exposure) (the answers in both Steps S311 and S312 are NO), the N.G. counter is incremented by one and a flag FT(N) indicative of an instruction to record information for each individual frame is reset to "0" (S315). The character "N" of FT(N) represents a frame number. If the manual photographing mode has been selected (the answer in Step S311 is YES) or if any one of the AE photographing modes has been selected and the result of AE is O.K. (correct exposure) (the answer in Step S312 is YES), the flag FT(N) indicative of an instruction to record information for each individual frame is set to "1" (S316). If the flash unit 14 is on (if the answer in Step S310 is YES), the process proceeds to Step S313. If automatic flash photography has been selected and the result of flash control is N.G. (the answers in both Steps S313 and S314 are NO), the N.G. counter is incremented by one and the flag FT(N) indicative of an instruction to record information for each individual frame is reset to "0" (S315). If manual flash photography has been selected (the answer in Step S313 is YES) or if automatic flash photography has been selected and the result of flash control is O.K. (correct exposure) (the answer in Step S314 is YES), the flag FT(N) indicative of an instruction to recording information for each individual frame is set to "1" (S316). The CPU 1 temporarily stores ordinary photographic information D(N) for each individual frame (S317), and causes the film transporting part 8 to wind the film 30 and confirms whether film-winding has been completed through the detection of the perforations 32 (S318). Then, the frame number N is incremented by one (S319).

Then, the process proceeds to the flowchart shown in FIG. 6. Whether rewinding is needed is determined according to whether the frame number N has reached the maximum frame number (which is preset) beyond which no photography is allowed (S320). If it is determined that rewinding is needed, a decision is made as to the N.G. counter by comparing the value of the N.G. counter with the predetermined value K. If the value of the N.G. counter is less than K, the CPU 1 determines that a small number of frames are unsuited to the process of producing prints from all the frames of the film 30 on the basis of a reference amount of print exposure (S321), and sets the flag FTF to "1" which indicates an instruction to perform printing based on the reference amount of print exposure (S322). On the other hand, if the value of the N.G. counter is not less than K, the CPU 1 determines that a large number of frames are unsuited to printing based on the reference amount of print exposure, and resets the flag FTF to "0" which indicates an instruction to perform automatic printing (S323).

The film transporting part 8 is activated to starting rewinding (S324), and a decision is made as to the flag FTF (S325). If the value of the flag FTF is "0", i.e., there are a large number of unsuited frames, the ordinary photographic information D(N) for each individual frame, stored in Step S317, and the flag FT(N) for each individual frame, obtained in Step S315 or S316, are added together (S326), and the ordinary photographic information D(N) and flag FT(N) information (indicative of an instruction to perform either printing based on the reference amount of print exposure or automatic printing) are recorded as photographic information on the recording areas 31a to 31c . . . 31n on frame-by-frame basis by the magnetic recording part 6 (S327). The CPU 1 detects the perforations 32 of the film 30 via the perforation detecting part 7 (S328), and each time the film 30 is rewound by one frame, the CPU 1 decrements the frame number N by one (S329). This processing is continued until the frame number N reaches "0" (S330). If the frame number N reaches "0", the value of the flag FTF is recorded on the leader-part recording area 31 of the film 30. In this case, if there are a larger number of unsuited frames, the value of the flag FTF to be recorded is "0", while if there are a small number of unsuited frames, the value of the flag FTF to be recorded is "1" (S331). Film transport is continued until the film 30 is rolled in the cartridge (S332). If the rolling-in operation is completed, the CPU 1 stops the rewinding of the film 30 (S333). When the exposed film 30 is taken out from the camera, a series of sequential operations is brought to an end (S334).

As described above, in the third embodiment, the values of the flag FT(N) and the N.G. counter are determined on frame-by-frame basis, and the number of unsuited frames is determined from a comparison between the value of the N.G. counter and the predetermined value K. If the number of unsuited frames is large, the ordinary photographic information D(N) and the flag FT(N) information are recorded on the recording areas 31a to 31c . . . 31n on frame-by-frame basis, and the corresponding value of the flag FTF (FTF=0 (or 1)) is recorded on the leader-part recording area 31. Accordingly, for example if the number of unsuited frames is large, it is possible to instruct a printer to perform different processes on frame-by-frame basis.

Figure 8:
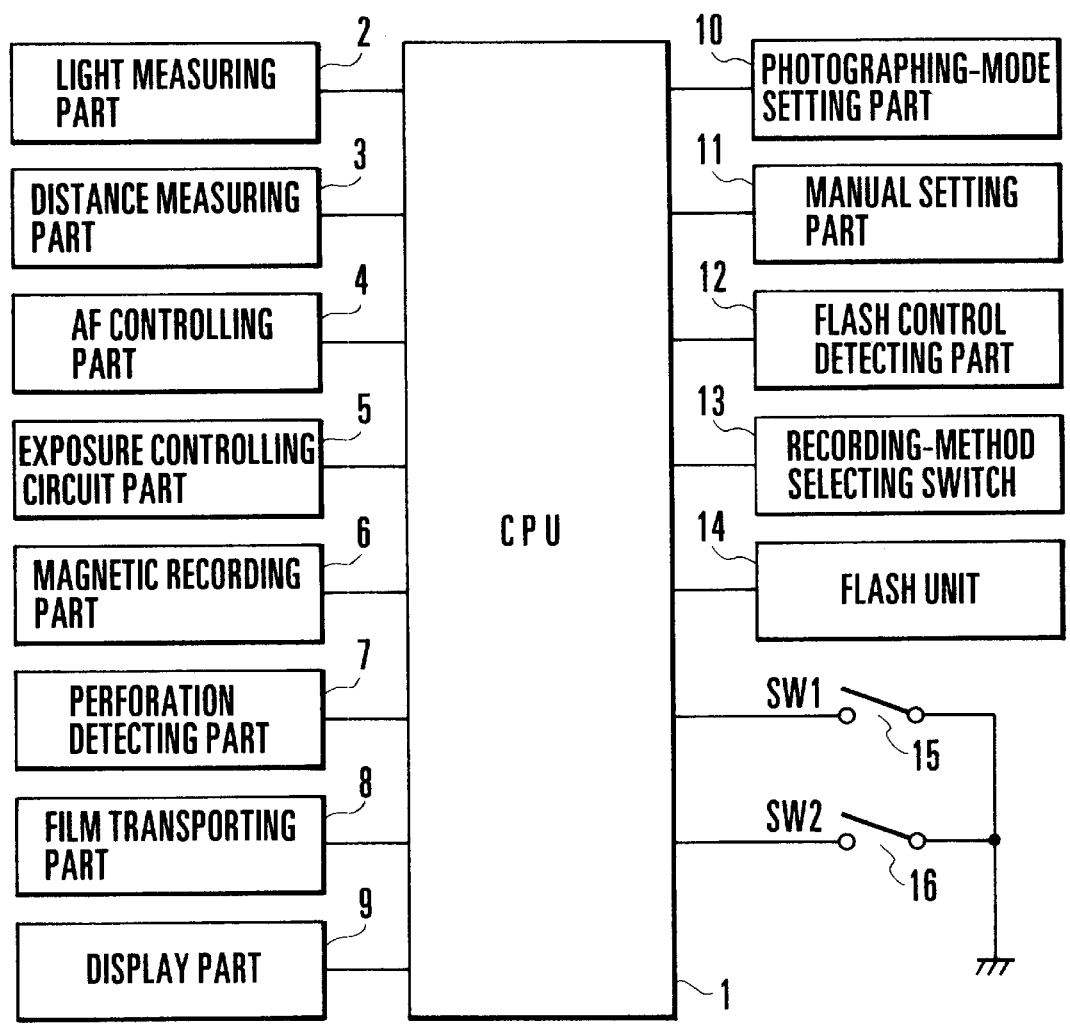
FIG. 8 is a block diagram showing the circuit arrangement of the camera according to the fourth embodiment shown in FIG. 7.

A fourth embodiment of the present invention will be described below. FIG. 7 is a flowchart of information recording processing for a camera according to the fourth embodiment of the present invention. FIG. 8 is a block diagram of the circuit arrangement of a camera according to the fourth embodiment shown in FIG. 7.

The camera shown in FIG. 8 differs from the camera of FIG. 2 according to each of the above-described embodiments in that a recording-method selecting switch 13 is newly added. The recording-method selecting switch 13 includes three positions for automatic recording, manual on and manual off, and is manipulated by a user who desires to manually select an information recording method for recording information relative to printing based on a reference amount of print exposure. In FIG. 8, identical reference numerals are used to denote constituent elements identical to those shown in FIG. 2, and the detailed description thereof is omitted for the sake of simplicity.

The processing according to the fourth embodiment will be described below with reference to the flowchart of FIG. 7.

First of all, it is confirmed whether the insertion of the film 30 has been completed (S401), and the film transporting part 8 is made to perform automatic loading of the film 30, thereby driving the film 30 up to a predetermined position where photography is possible and stopping the film 30 at that position (S402). The frame number N is set to "1" and an N.G. counter, which provides a criterion for determining whether to record information on the leader-part recording area 31, is reset to "0" (S403). Then, any one of the photographing modes is set through the photographing-mode setting part 10 (S404). If the switch SW1 15 for starting light measurement and distance measurement is turned on (S405), the CPU 1 causes the distance measuring part 3 to perform distance measurement, converts the result of the distance measurement into the amount of lens driving, and causes the AF controlling part 4 to perform AF (S406). Then, the light measuring part 2 is made to perform light measurement (S407). If the switch SW2 16 for starting exposure is turned on (S408), the exposure controlling circuit part 5 is made to perform exposure control to expose the film 30 (S409).

The following steps S410 to S416 perform the processing of making a decision as to the N.G. counter. The steps S410 to S415 perform the processing of making a decision as to the processing result of the exposure control performed in Step S409. First, if the flash unit 14 is off (if the answer in Step S410 is NO), the process proceeds to Step S412. If any one of the AE photographing modes has been selected and the result of AE (automatic exposure) is N.G. (incorrect exposure) (the answers in both Steps S412 and S413 are NO), the N.G. counter is incremented by one. If the flash unit 14 is on (if the answer in Step S410 is YES), the process proceeds to Step S414. If automatic flash photography has been selected and the result of flash control is N.G. (incorrect exposure) (the answers in both Steps S414 and S415 are NO), the N.G. counter is incremented by one (S416). In any other case, the N.G. counter remains unchanged.

While the film 30 is being transported by the film transporting part 8, the ordinary photographic information required for the exposed frame is recorded on the corresponding one of the recording areas 31a to 31c . . . 31n of the film 30. The CPU 1 detects the perforations 32 via the perforation detecting part 7 to confirm whether film winding has been completed, and if the completion of the film winding is confirmed, the CPU 1 brings a photographic cycle for that frame to an end (S417). Then, the frame number N is incremented by one (S418), and whether rewinding is needed is determined according to whether the frame number N has reached the maximum frame number (which is preset) beyond which no photography is allowed (S419). If the answer in Step S419 is YES, the film transporting part 8 is activated to start rewinding (S420). The CPU 1 detects the perforations 32 of the film 30 via the perforation detecting part 7 (S421), and if the film 30 is rewound by one frame, the CPU 1 decrements the frame number N by one (S422). This processing is continued until the frame number N reaches "0" (S423). If the frame number N reaches "0", the state of the recording-method selecting switch 13 is detected to determine an information recording method for recording information relative to printing based on the reference amount of print exposure (S424). If the recording-method selecting switch 13 is set to the manual-off position, the flag FTF is set to "1" which indicates an instruction to perform printing based on the reference amount of print exposure (S425). If the recording-method selecting switch 13 is set to the manual-on position, the flag FTF is set to "0" which indicates an instruction to perform automatic printing (S426).

If the recording-method selecting switch 13 is set to the automatic-recording position, a decision is made as to the N.G. counter and compares the value of the N.G. counter with the predetermined value K (S427). If the value of the N.G. counter is less than K, it is determined that the number of incorrectly exposed frames is small, and the flag FTF is set to "1" (S428). If the value of the N.G. counter is not less than K, it is determined that the number of incorrectly exposed frames is large, and the flag FTF is set to "0" (S429). The value of the flag FTF is recorded on the leader-part recording area 31 of the film 30 (S430). Film transport is continued until the film 30 is rolled in the cartridge (S431), and if the rolling-in operation is completed, the CPU 1 stops the rewinding of the film 30 (S432). When the exposed film 30 is taken out from the camera (S433), a series of sequential operations is brought to an end.

As described above, in accordance with the fourth embodiment, the user can manipulate the recording-method selecting switch 13 and select printing based on the reference amount of print exposure of his/her own free will. Accordingly, the user can select either of an automatic recording method which is a first mode and a recording method which allows the user to manually specify printing based on the reference amount of print exposure of his/her own free will.

Although a magnetic recording system is adopted as information recording means, it is, of course, possible to adopt an optical recording system. However, the magnetic recording system is more advantageous than the optical recording system because the magnetic recording system can process a larger amount of information.

In each of the above-described embodiments, whether any one of the AE photographing modes has been selected, whether the state of exposure is in an AE-controllable range, which of the flash photographing modes has been selected, and whether flash control is N.G., are adopted as decision criteria for decision means for determining whether an exposed frame is suited to printing based on the reference amount of print exposure. However, such decision criteria are not limited to only the aforesaid ones. For example, the value of the flag FTF can also be determined in the above-described manner according to the state of exposure compensation (FTF=1 when exposure compensation is selected), the state of shifting of a film speed, the kind of light measuring mode (whether spot light measurement has been selected; FTF=1 when spot light measurement is selected), the state of automatic exposure bracketing (FTF=1 when an automatic exposure bracketing mode is selected), and the like.

Figure 9:
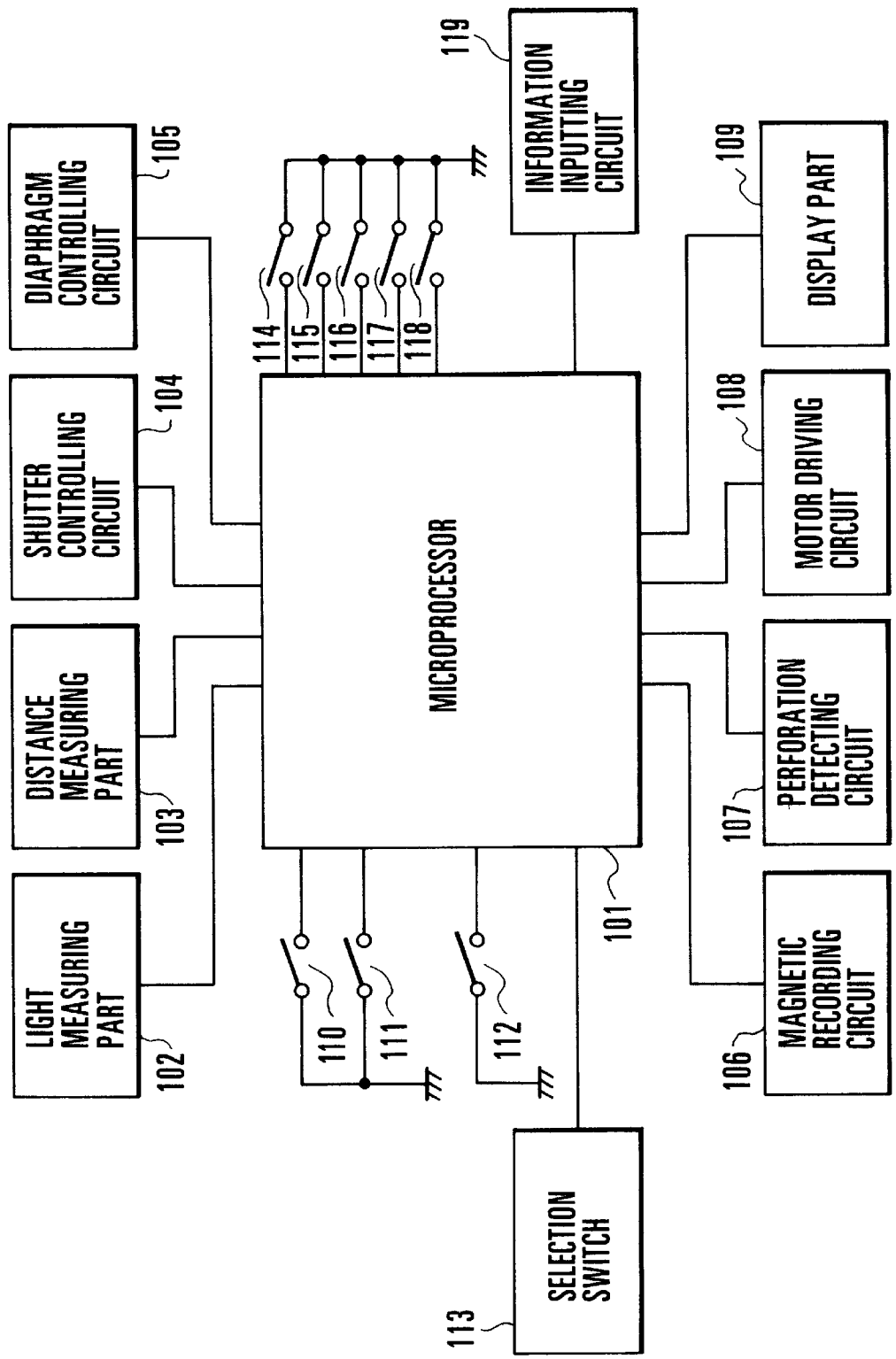
FIG. 9 is a block diagram showing another example of the circuit arrangement of a camera to which the present invention is applied.

FIG. 9 is a block diagram showing the circuit arrangement of a camera according to a fifth embodiment of the present invention.

The camera shown in FIG. 9 includes a microprocessor 101, and all the operations, such as display processing, that are required for the camera to execute a photographing operation are controlled in accordance with a program built in the microprocessor 101. The mechanism of each part of the camera operates in accordance with an instruction given by the microprocessor 101. The camera also includes a light measuring part 102 for, for example, dividing the entire image plane into a plurality of areas and measuring light for each of the areas, and the output of the light measuring part 102 is inputted to an A/D converter provided in the microprocessor 101 and is converted into a digital value. The camera also includes a distance measuring part 103, a shutter controlling circuit 104 and a diaphragm controlling circuit 105, all of which make use of known circuits. The camera also includes a magnetic recording circuit 106, a perforation detecting circuit 107 and a motor driving circuit 108, and the motor driving circuit 108 is arranged to drive a film transporting motor (not shown) in the forward direction during film winding or in the reverse direction during film rewinding. A display part 109 displays a shutter control value, an aperture control value and the states of various other information settings.

The camera also includes a light measurement starting switch (SW1) 110 which is turned on when a release operating member (not shown) is placed in a first operational state, an exposure starting switch (SW2) 111 which is turned on when the release operating member is placed in a second operational state, a switch 112 for specifying whether information indicative of an instruction to set print exposure to a fixed time is to be recorded for each individual frame, and a selection switch 113 for selecting a recording method for such information. The selection switch 113 can be switched among four states: "recording off", "recording for all frames", "recording by manual input on frame-by-frame basis" and "recording by automatic input on frame-by-frame basis", or among three states: "recording off", "recording for all frames" and "recording by manual input on frame-by-frame basis", or among three states: "recording off", "recording for all frames" and "recording by automatic input on frame-by-frame basis". The camera also includes a light-measuring-range selecting switch 114 for selecting either one of evaluative light measurement and spot light measurement, an exposure controlling switch 115 for selecting either one of AE (automatic exposure) and manual exposure, an exposure compensation switch 116 arranged to be pressed while the amount of exposure compensation is being inputted via an information inputting circuit 119, an automatic-exposure-bracketing (AEB) selecting switch 117 arranged to be pressed while the amount of exposure bracketing is being inputted via the information inputting circuit 119, a film speed setting switch 118 arranged to be pressed while a film speed is being inputted via the information inputting circuit 119, and the information inputting circuit 119 for decoding and counting information inputted from a dial (not shown).

The fifth embodiment of the present invention will be described below with reference to the flowchart shown in FIGS. 10, 11 and 12.

In Step #101, the state of the selection switch 113 for selecting an information recording method is inputted. At this time, according to the state of the selection switch 113, a flag S is set to S=0 (recording off), S=1 (recording for all frames), S=2 (recording by manual input on frame-by-frame basis) or S=3 (recording by automatic input on frame-by-frame basis). In Step #102, the state of the light measurement starting switch (SW1) 110 is detected, and if it is off, the process returns to Step #101. If it is on, the process proceeds to Step #103. When an input signal is provided from the light-measuring-range selecting switch 114, it is determined whether a spot light measurement mode has been selected (#103). If it has not been selected, the process proceeds to Step #104, in which a light measurement value is determined by evaluative light measurement (a light measurement value is determined from the light measurement values obtained from the respective areas, in accordance with an algorithm). If it has been selected, the process proceeds to Step #105, in which a light measurement value is determined by spot light measurement. The light measurement value obtained in Step #104 or #105 depends on a film speed.

Then, in Step #106, an input signal is provided from the exposure controlling switch 115 and it is determined whether the selected exposure control mode is manual exposure. If AE (automatic exposure) has been selected, the process proceeds to Step #107, in which it is determined whether exposure compensation has been set through the information inputting circuit 119 by the operation of the exposure compensation switch 116. If it is determined that exposure compensation has been set, the exposure compensation is executed in Step #108. If it is determined that manual compensation has been set, the process proceeds to Step #109, in which the difference between the light measurement value and a manually set control value (a value obtained by performing an APEX computation on a manually set shutter time and a manually set aperture value) is computed. Incidentally, exposure control is performed by using the control value. Then, in Step #110, it is determined whether the automatic exposure bracketing (AEB) has been set. If the AEB has not been set, the process proceeds to Step #111, in which a flag AEB is set to "0". If the AEB function has been set, the process proceeds to Step #112, in which control values for the second and third exposures are stored, and the flag AEB is set to "1" in Step #113. Then, distance measurement is performed (#114), and it is determined in Step #115 whether a release switch (the exposure starting switch (SW2) 111) has been pressed. If the release switch has not been pressed, the process returns to Step #102, whereas if it has been pressed, the process proceeds to Step #116 of FIG. 11. In Step #116, film exposure is performed on the basis of the shutter and diaphragm control values.

Then, in Step #117, it is determined whether the flag S has been set to S=2 (recording by manual input on frame-by-frame basis), in accordance with the state of the selection switch 113 for selecting an information recording method, which state has been read in Step #101. If the flag S has been set to S=2, the process proceeds to step #118, in which the state of the recording switch 112 is detected. If the recording switch 112 is off, the process proceeds to Step #119, in which P=0 is set. If it is on, the process proceeds to Step #120, in which P=1 is set. If the answer in Step #117 is NO, the process proceeds to Step #121, in which the flag S has been set to S=3 (recording by automatic input on frame-by-frame basis). If S=3 in Step #121, the process proceeds to Step #122, in which it is determined whether the mode of spot light measurement has been selected. If the answer in Step #122 is NO, the process proceeds to Step #123, in which it is determined whether the mode of manual exposure control has been selected. If the answer in Step #123 is NO, the process proceeds to Step #124, in which it is determined whether exposure compensation has been set or the film speed has been shifted. If the answer in Step #124 is NO, the process proceeds to Step #125, in which it is determined whether the AEB (automatic exposure bracketing) has been set. If the answer in any one of Steps #122 to #125 is YES, the process proceeds to Step #127, in which P=1 is set (the mode of printing based on a reference amount of print exposure). If all the answers in Steps #122 to #125 are NO, the process proceeds to Step #126, in which P=0 (the mode of automatic printing) is set. If S≠3 in Step #121, the process proceeds to Step #128, in which P=0 is set. Then, in Step #129, the set value of P ("0" or "1") is set as information F(N) (N=frame number) for each individual frame. In Step #130, the motor driving circuit 108 is activated to start winding. In Step #131, the set information F(N) is recorded on the film via the magnetic recording circuit 106. Incidentally, the set information F(N) is recorded on a magnetic track (recording area) provided for each individual frame of the film.

Then, after film transport for one frame has been detected by the perforation detecting circuit 107 in Step #132, the motor driving circuit 108 is stopped to stop winding in Step #133. In Step #134, the frame number N is increased by one, and it is determined in Step #135 whether rewinding is needed. This decision in Step #135 is made by determining whether the frame number N of the film has reached a predetermined frame number. If rewinding is not needed, the process proceeds to Step #137, in which it is determined whether the value of the flag AEB is "1". If it is "1", the flag AEB is set to "2" in Step #138 and a minus-compensation value is called in Step #139. Then, the process returns to Step #116. If it is determined in Step #137 that the value of the flag AEB is not "1", the process proceeds to Step #140, in which it is determined whether the value of the flag AEB is "2". If it is "2", the flag AEB is set to "3" in Step #141 and a plus-compensation value is called in Step #142. Then, the process returns to Step #116. If it is determined in Step #140 that the value of the flag AEB is not "2", the process proceeds to Step #143, in which it is determined whether the value of the flag AEB is "3". If it is "3", the flag AEB is returned to "1" in Step #144, whereas if it is not "3", the process returns to Step #101.

If rewinding is needed, the process proceeds to Step #136, in which the flag AEB is returned to "0". Then, the process proceeds to Step #145 shown in FIG. 12. In Step #145, it is determined whether the flag S has been set to S=1 (recording of input information for all frames of film), in accordance with the state of the selection switch 113 which has been read in Step #101. If S=1, a flag $F_{ALL}$, which indicates an instruction to produce prints from all frames on the basis of the reference amount of print exposure, is set to "1" in Step #146 and the information F(N) (N=1 to MAX) for each individual frame is also set to "1" in Step #147. If S≠1 in Step #145, the flag $F_{ALL}$ is reset to "0" in Step #148. Then, the motor driving circuit 108 is activated to start rewinding, and it is detected in Step #150 whether the film is being rewound on frame-by-frame basis, through the perforation detecting circuit 107. If film rewinding for one frame is detected, the frame number N is decreased by one in Step #151 and it is determined in Step #152 whether the film for all frames has been rewound. If the film for all frames has not yet been rewound, the process returns to Step #150. If the film for all frames has been rewound, the process proceeds to Step #153, in which the value of the information flag $F_{ALL}$ which indicates an instruction to product prints from all frames on the basis of the reference amount of print exposure, i.e., $F_{ALL}=1$ which has been set in Step #146 or #148, is recorded via the magnetic recording circuit 106. (In Step #153, such information is recorded on a magnetic track (leader-part recording area) provided in the leader part of the film.) Then, rewinding is stopped in Step #154, and when the film is taken out in Step #155, the entire operation is stopped.

Figure 12:
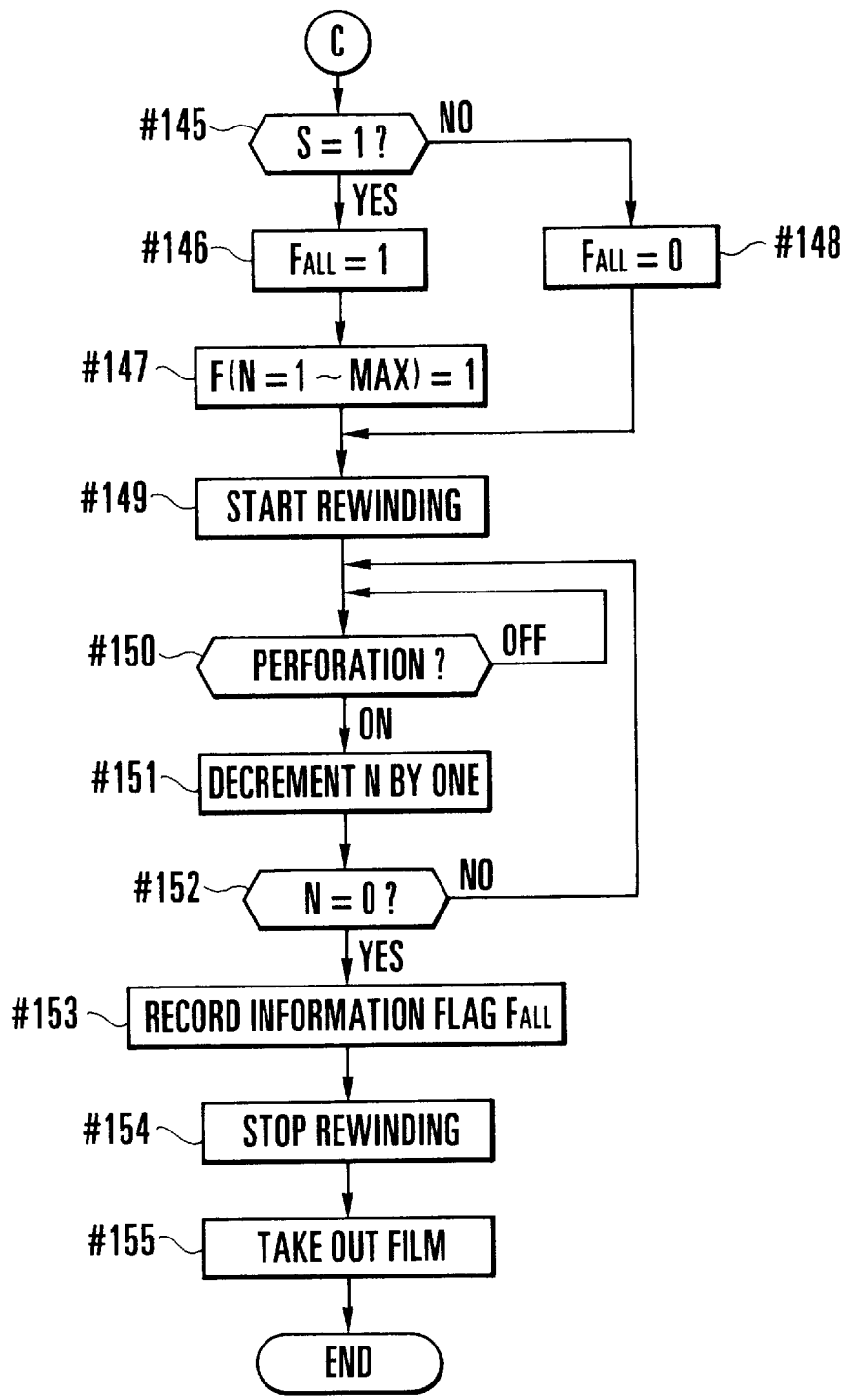
FIG. 12 is a further companion flowchart of the processing of the microprocessor 101 according to the fifth embodiment of the present invention.
Figure 13:
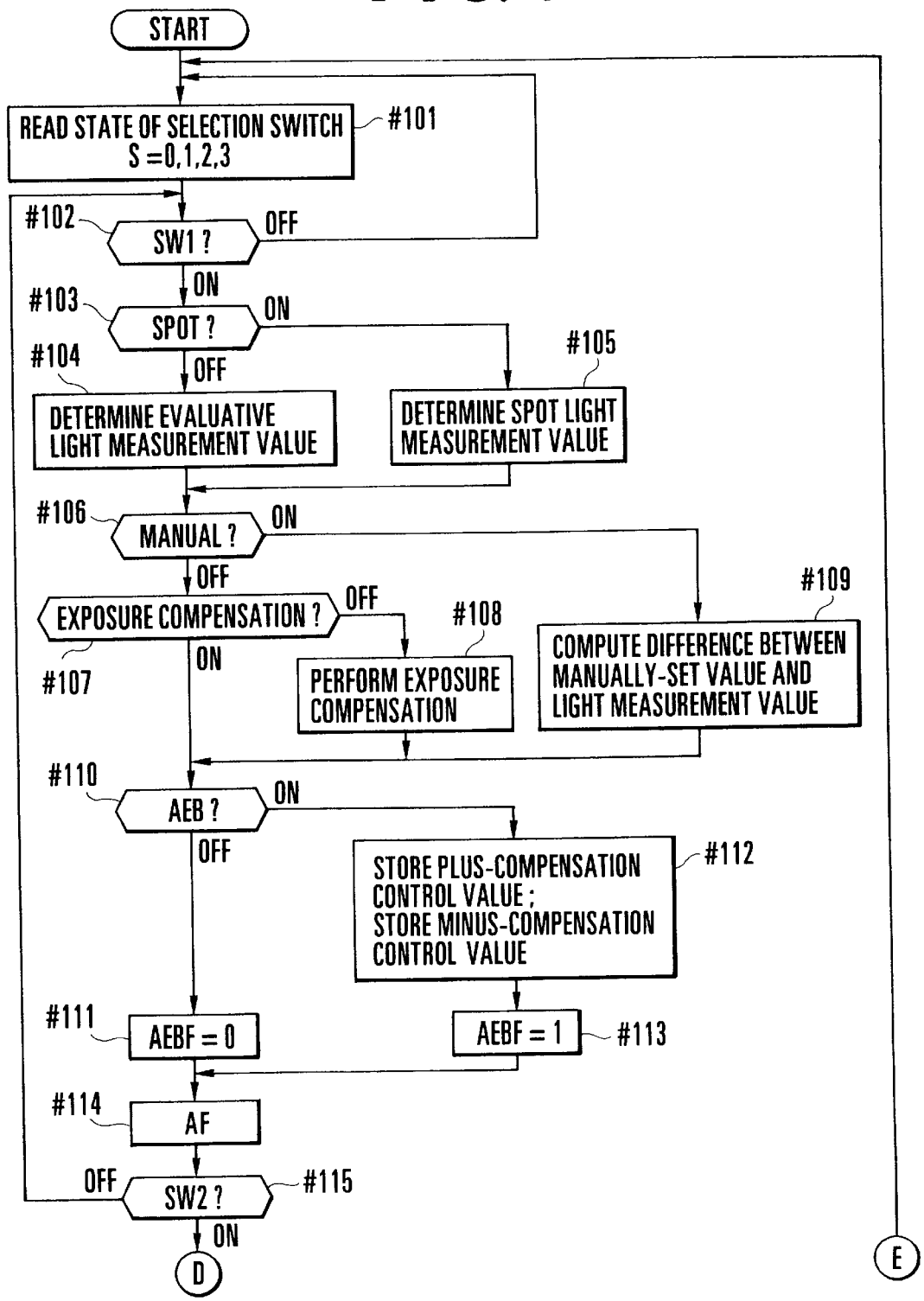
FIG. 13 is a flowchart of the processing of the microprocessor 101 according to a sixth embodiment of the present invention.
Figure 14:
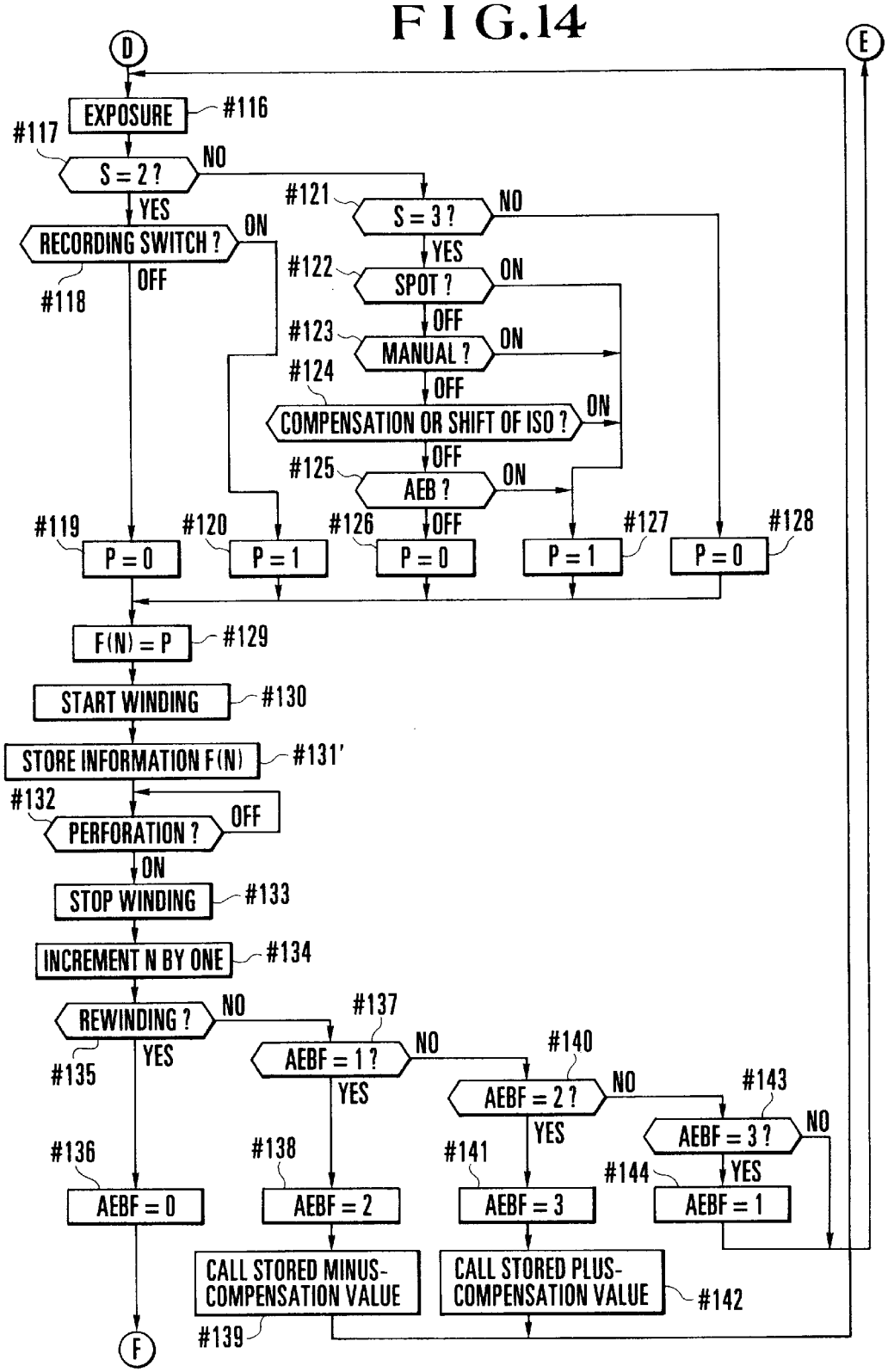
FIG. 14 is a companion flowchart of the processing of the microprocessor 101 according to the sixth embodiment of the present invention.
Figure 15:
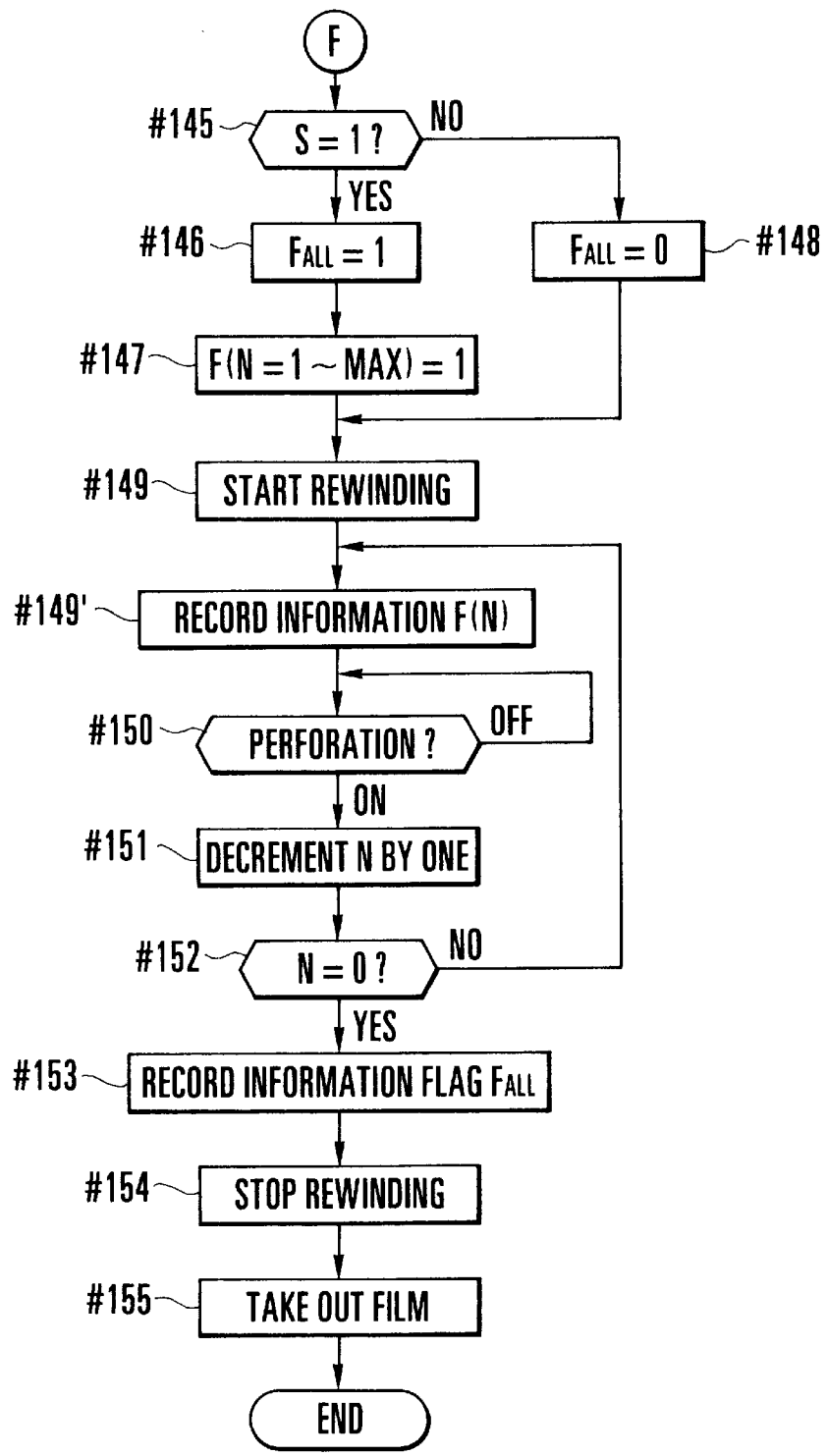
FIG. 15 is a companion flowchart of the processing of the microprocessor 101 according to the sixth embodiment of the present invention.

FIGS. 13, 14 and 15 are a flowchart showing a sixth embodiment of the present invention. In the flowchart shown in FIGS. 13, 14 and 15, identical reference numerals are used to denote operating steps identical to those of the flowchart shown in FIGS. 10, 11 and 12. For the sake of simplicity, the description of the identical steps is omitted and only steps different from those shown in FIGS. 10, 11 and 12 will be described below.

In the sixth embodiment, information, such as information indicating whether to fix the mode of printing to printing based on a reference amount of print exposure, i.e., whether to set the time of print exposure to a fixed time, is stored during winding, and such information is recorded during rewinding. In Step #131' shown in FIG. 14, the information is stored during winding, and the stored information is recorded during rewinding in Step #149' shown in FIG. 15. Specifically, in Step #131', the frame number of each frame and the corresponding information P ("1" or "0") are stored on frame-by-frame basis during winding. In step #149', during rewinding, the information P stored in Step #131' is recorded on the magnetic tracks for the respective frames in accordance with their frame numbers. If S=1 in Step #145, information for all the frames is set to "1" in Step #147. In this case, "1" is recorded on the magnetic track for each of the frames in Step #149'.

Figure 16:
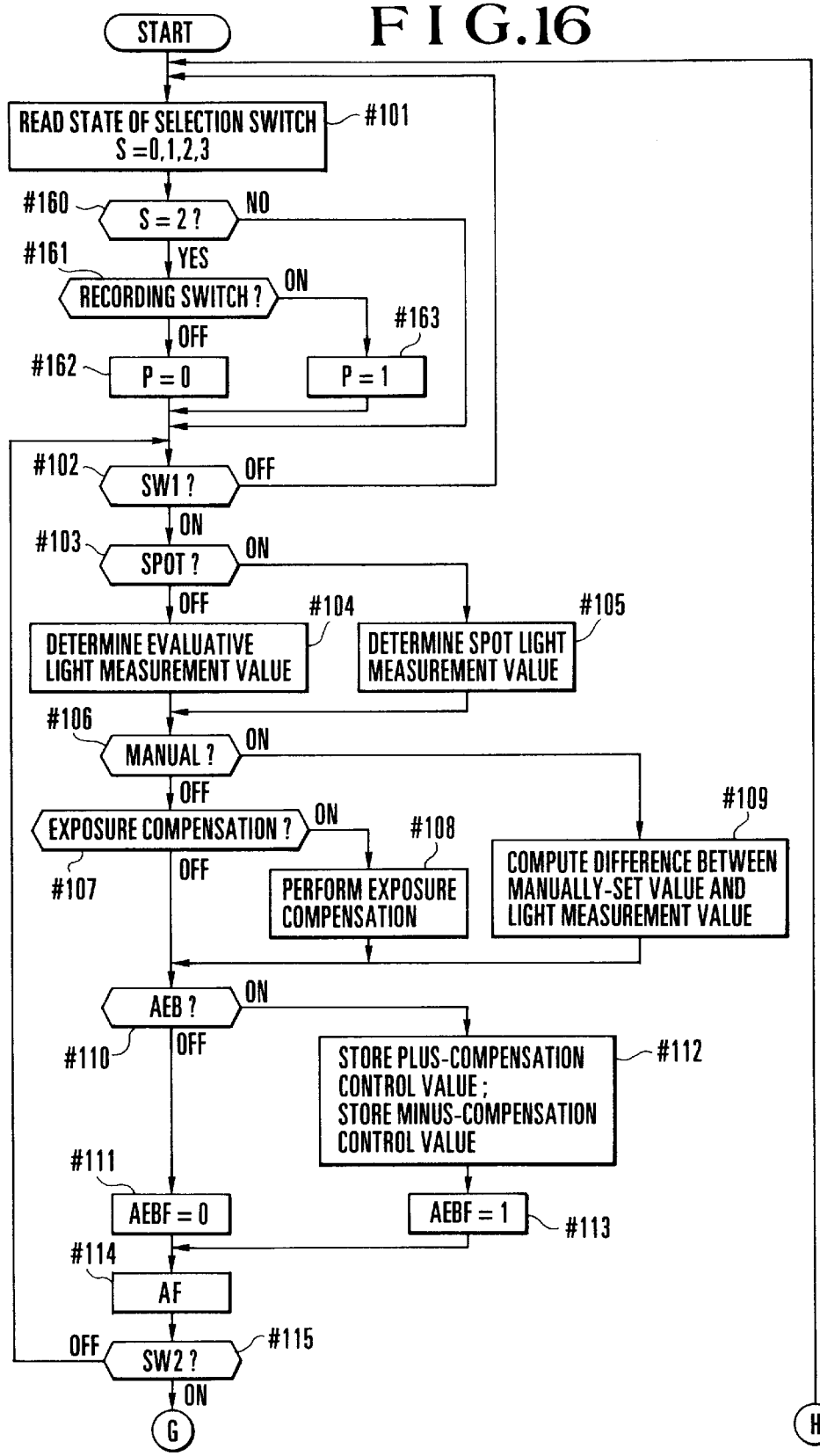
FIG. 16 is a flowchart of the processing of the microprocessor 101 according to a seventh embodiment of the present invention.
Figure 17:
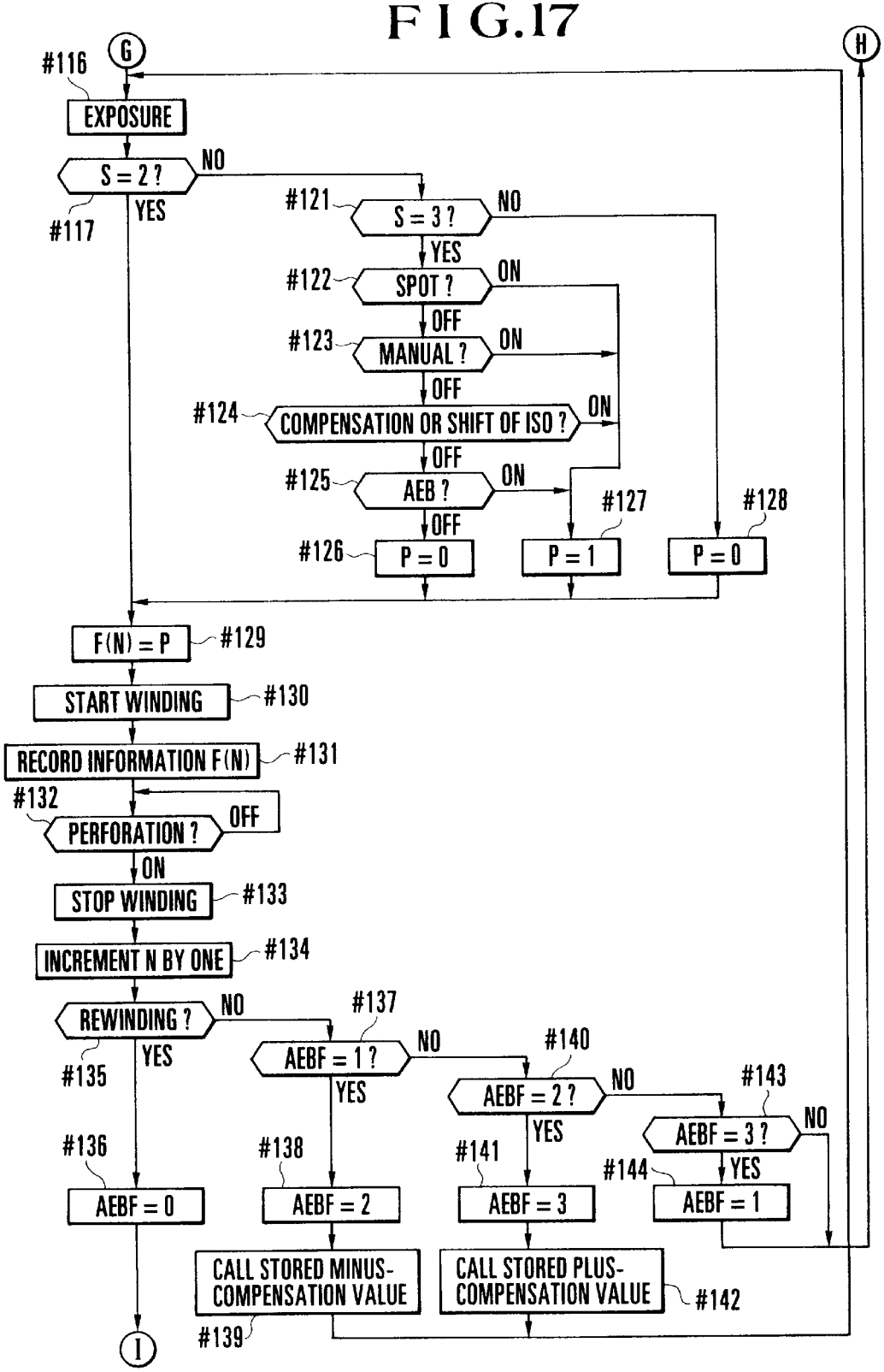
FIG. 17 is a companion flowchart of the processing of the microprocessor 101 according to the seventh embodiment of the present invention.
Figure 18:
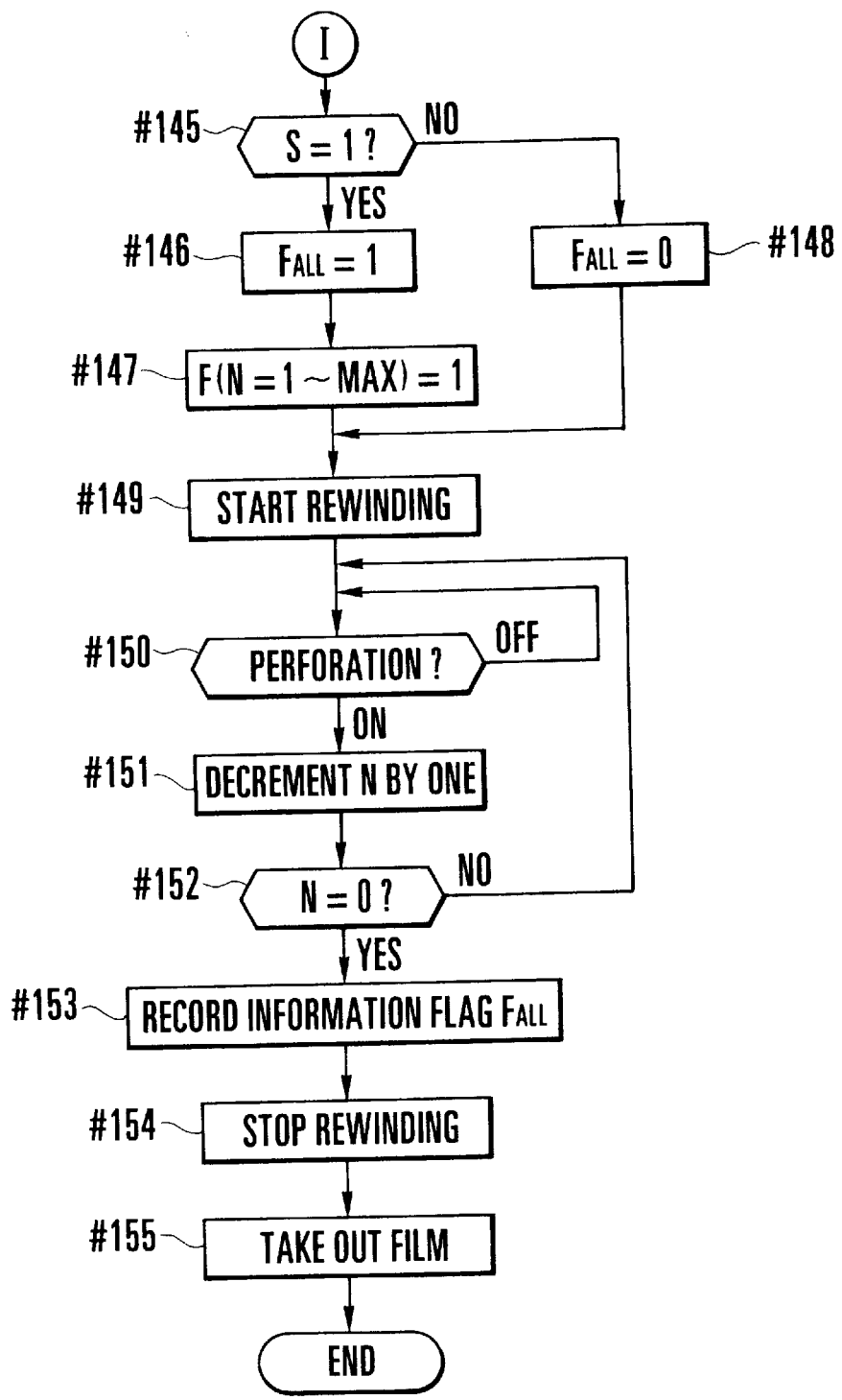
FIG. 18 is a companion flowchart of the processing of the microprocessor 101 according to the seventh embodiment of the present invention.

FIGS. 16, 17 and 18 are a flowchart showing a seventh embodiment of the present invention. In the flowchart shown in FIGS. 16, 17 and 18, identical reference numerals are used to denote operating steps identical to those of the flowchart shown in FIGS. 10, 11 and 12. For the sake of simplicity, the description of the identical steps is omitted and only steps different from those shown in FIGS. 10, 11 and 12 will be described below.

In the seventh embodiment, information recording by manual input for each individual frame is performed before photography. In Step #160 shown in FIG. 16, it is determined whether the mode of S=2 (recording by manual input for each individual frame) is to be performed, in accordance with the state of the selection switch 113 which has been read in Step #101. If S=2, the state of the recording switch 112 is detected in Step #161. If the switch 112 is off, P=0 is set in Step #162, whereas if the switch 112 is on, P=1 is set in Step #163. Then, the process proceeds to Step #102.

Figure 19:
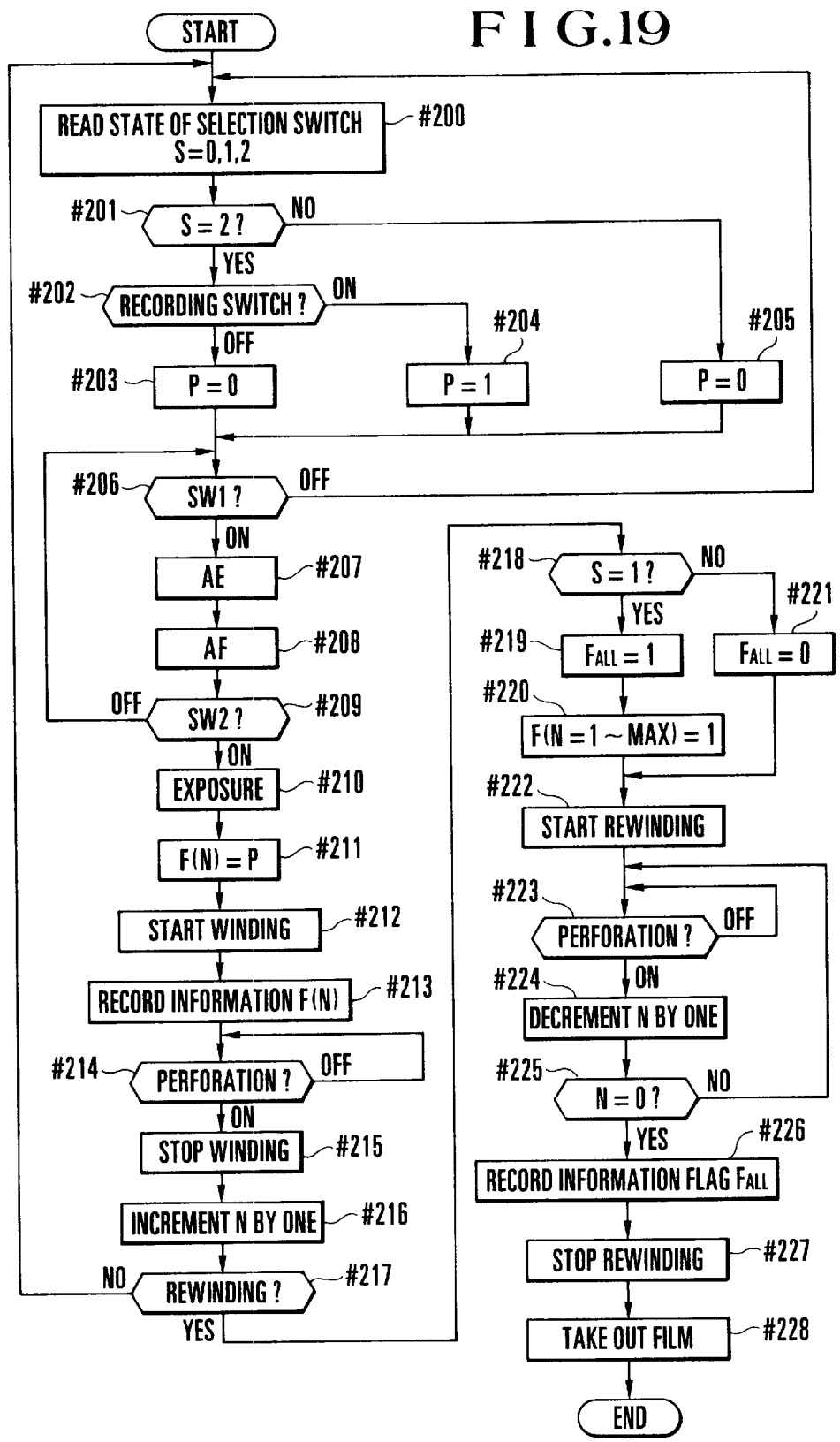
FIG. 19 is a flowchart of the processing of the microprocessor 101 according to an eighth embodiment of the present invention.

FIG. 19 is a flowchart showing an eighth embodiment of the present invention. First of all, in Step #200, the flag S is set in accordance with an input from the selection switch 113 for selecting an information recording method, such as whether to fix the mode of printing to printing based on a reference amount of print exposure, i.e., whether to set the time of print exposure to a fixed time. If S=0, the mode "recording off N" is set; if S=1, the mode "recording for all frames" is set; and if S=2, the mode "recording by manual input on frame-by-frame basis" is set. In Step #201, it is determined whether the flag S has been set to S=2 (recording by manual input on frame-by-frame basis), in accordance with the state of the selection switch 113 for selecting an information recording method, which state has been read in Step #200. If S=2, the state of the recording switch 112 is detected in Step #202. If the switch 112 is off, P=0 is set in Step #203, whereas if the switch 112 is on, P=1 is set in Step #204. If S≠2 in Step #201, P=0 is set in step #205. Then, in Step #206, the state of the light measurement starting switch (SW1) 110 is detected. If the light measurement starting switch (SW1) 110 is off, the process returns to Step #200, whereas if it is on, the process proceeds to Step #207. In Step #207, a light measurement value is determined on the basis of information from the light measuring part 102, and, in Step #208, distance measurement is performed on the basis of information from the distance measuring part 103. In Step #209, it is determined whether the release switch (SW2) has been pressed. If it has not been pressed, the process returns to Step #206, whereas if it has been pressed, the process proceeds to Step #210.

In Step #210, film exposure is performed on the basis of shutter and diaphragm control values. In Step #211, the set value of P ("0" or "1") is set as the information F(N) (N=frame number) for each individual frame. In Step #212, the motor driving circuit 108 is activated to start winding. In Step #213, the set information F(N) is recorded on the film via the magnetic recording circuit 106. Then, after film transport for one frame has been detected by the perforation detecting circuit 107 in step #214, the motor driving circuit 108 is stopped to stop winding in Step #215. In Step #216, the frame number N is increased by one, and it is determined in Step #217 whether rewinding is needed. If rewinding is not needed, the process returns to Step #200. If rewinding is needed, the process proceeds to Step #218, in which it is determined whether the flag S has been set to S=1 (recording of input information for all frames of film), in accordance with the state of the selection switch 113 which has been read in Step #200. If S=1, a flag $F_{ALL}$, which indicates an instruction to produce prints from all frames on the basis of the reference amount of print exposure, is set to "1" in Step #219 and the information F(N) (N=1 to MAX) for each individual frame is also set to "1" in Step #220. If S≠1 in Step #218, the flag $F_{ALL}$ is reset to "0" in Step #221. Then, the motor driving circuit 108 is activated to start rewinding, and it is detected in Step #223 whether the film is being rewound on frame-by-frame basis, through the perforation detecting circuit 107. If film rewinding for one frame is detected, the frame number N is decreased by one in Step #224 and it is determined in Step #225 whether the film for all frames has been rewound. If the film for all frames has not yet been rewound, the process returns to Step #223. If the film for all frames has been rewound, the process proceeds to Step #226, in which the value of the information flag $F_{ALL}$ which indicates an instruction to product prints from all frames on the basis of the reference amount of print exposure is recorded on the film via the magnetic recording circuit 106. Then, rewinding is stopped in Step #227, and when the film is taken out in Step #228, the entire operation is stopped.

Figure 20:
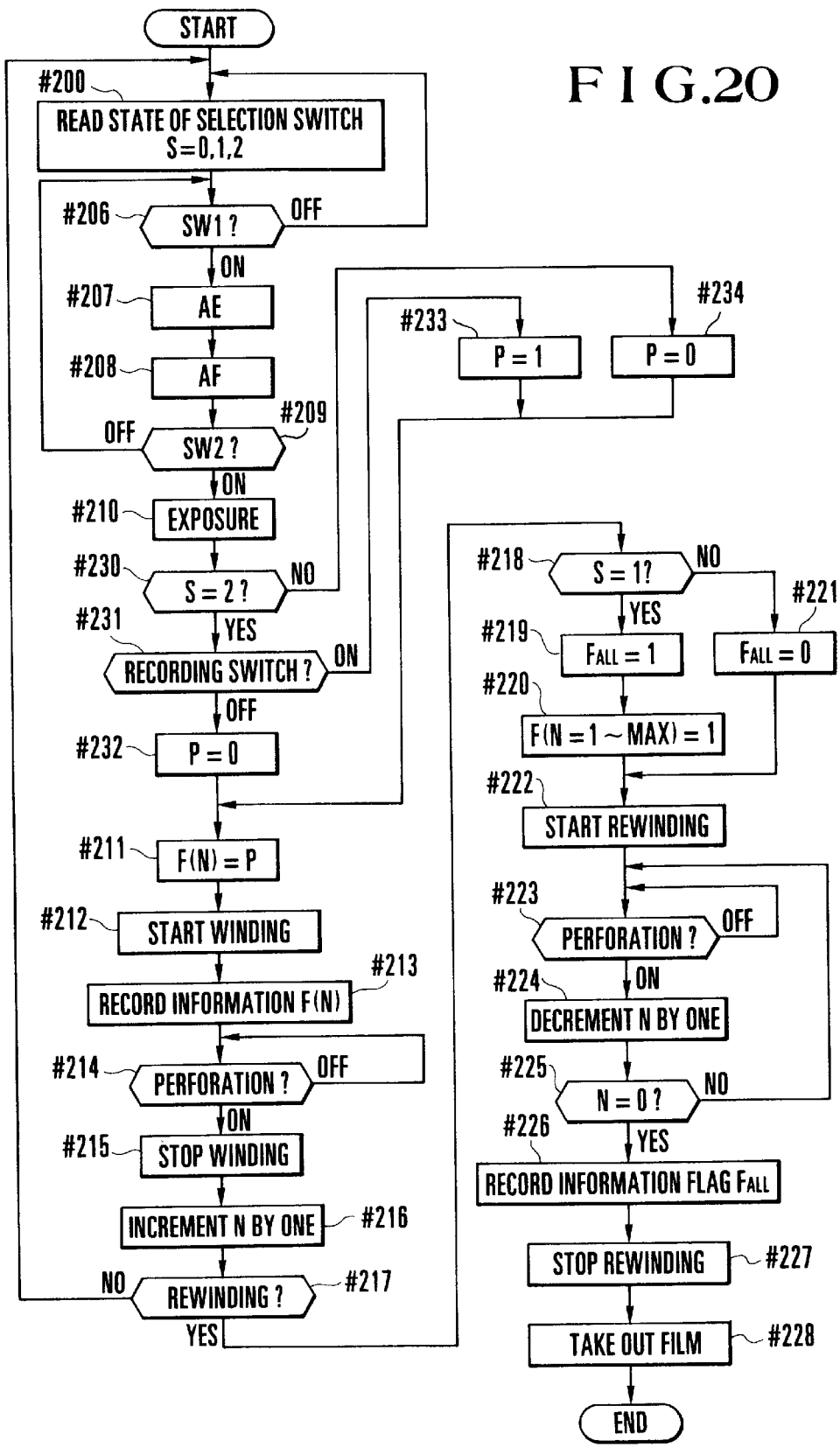
FIG. 20 is a flowchart of the processing of the microprocessor 101 according to a ninth embodiment of the present invention.

FIG. 20 is a flowchart showing a ninth embodiment of the present invention. In the flowchart shown in FIG. 20, identical reference numerals are used to denote operating steps identical to those of the flowchart shown in FIG. 19. For the sake of simplicity, the description of the identical steps is omitted and only steps different from those shown in FIG. 19 will be described below.

In the ninth embodiment, information recording by manual input for each individual frame is performed after photography. Steps #230 to #234 are identical to Steps #201 to #205 of FIG. 19, and the operations of Steps #230 to #234 are performed after the on state of the release switch (SW2) has been detected in Step #209.

Figure 21:
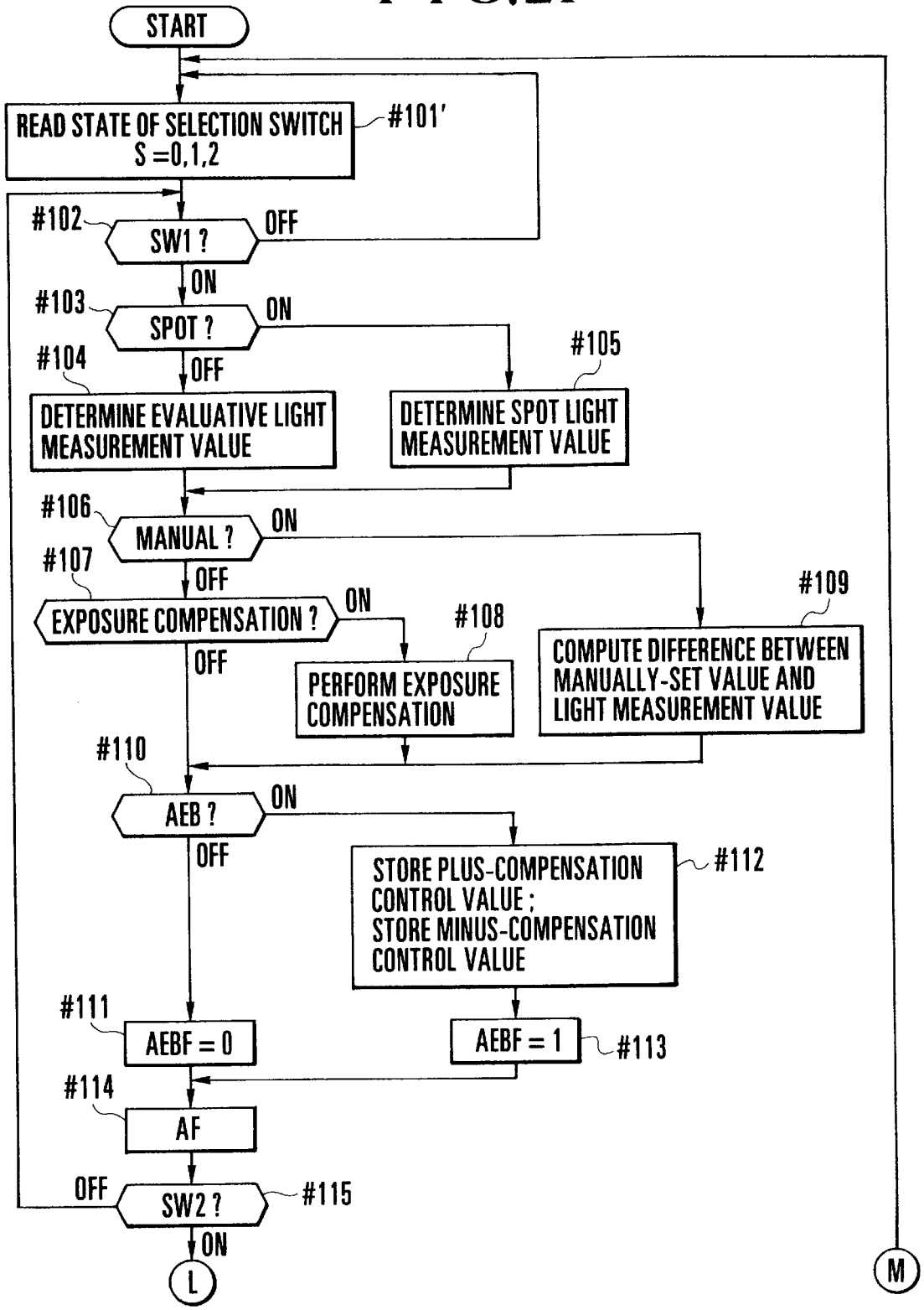
FIG. 21 is a flowchart of the processing of the microprocessor 101 according to a tenth embodiment of the present invention.
Figure 22:
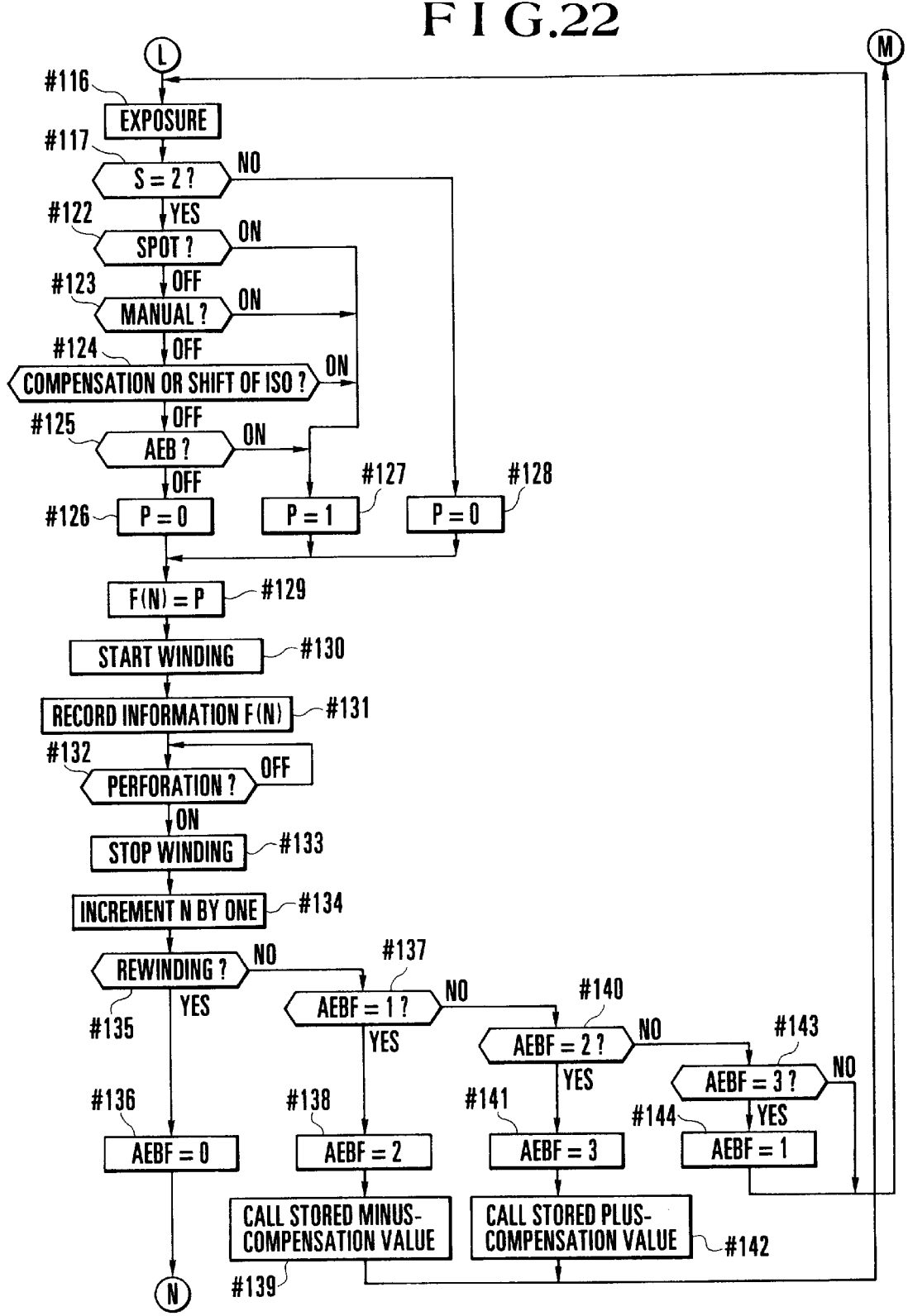
FIG. 22 is a companion flowchart of the processing of the microprocessor 101 according to the tenth embodiment of the present invention.
Figure 23:
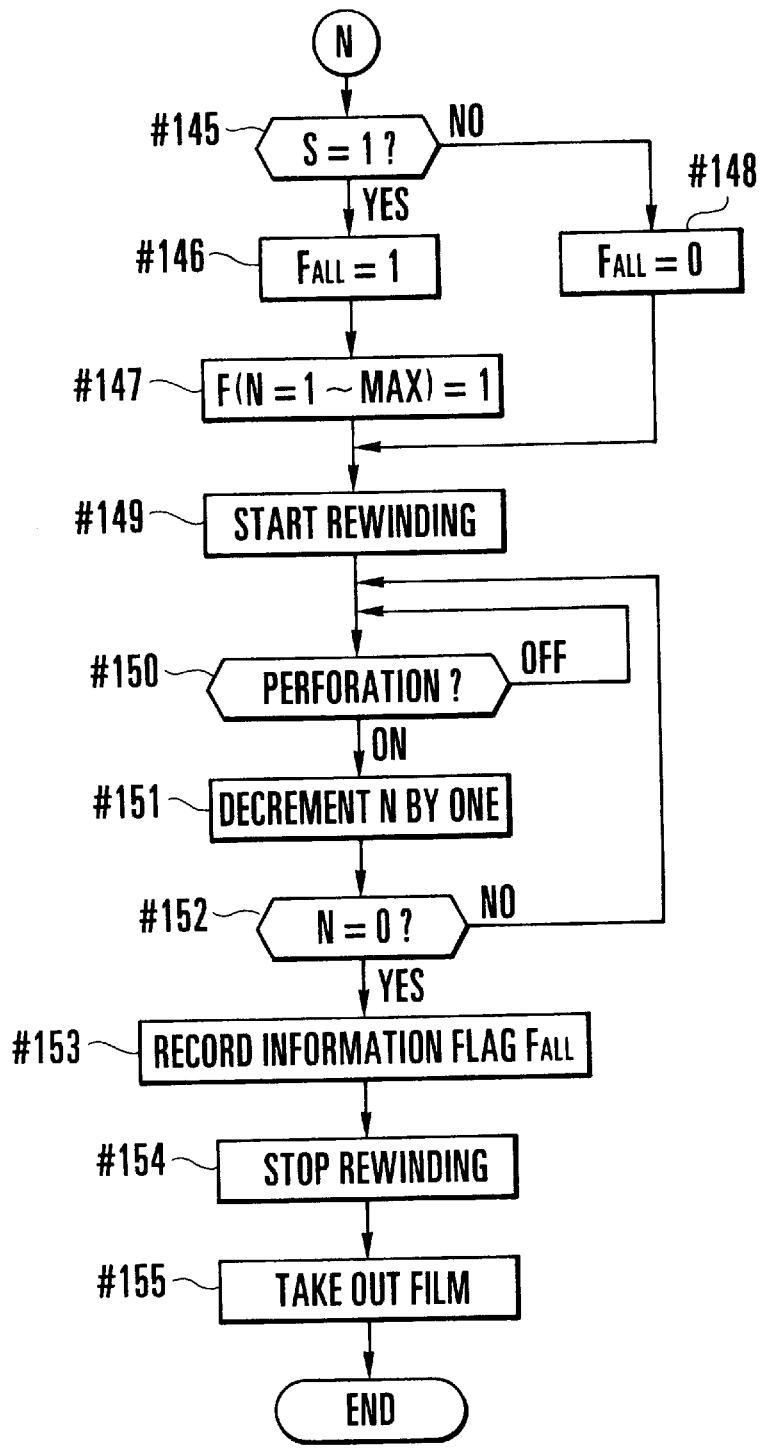
FIG. 23 is a companion flowchart of the processing of the microprocessor 101 according to the tenth embodiment of the present invention.

FIGS. 21, 22 and 23 are a flowchart showing a tenth embodiment of the present invention. The tenth embodiment is characterized in that it is possible to select either one of recording of input information for all frames of a film and recording by automatic input on frame-by-frame basis.

Figure 10:
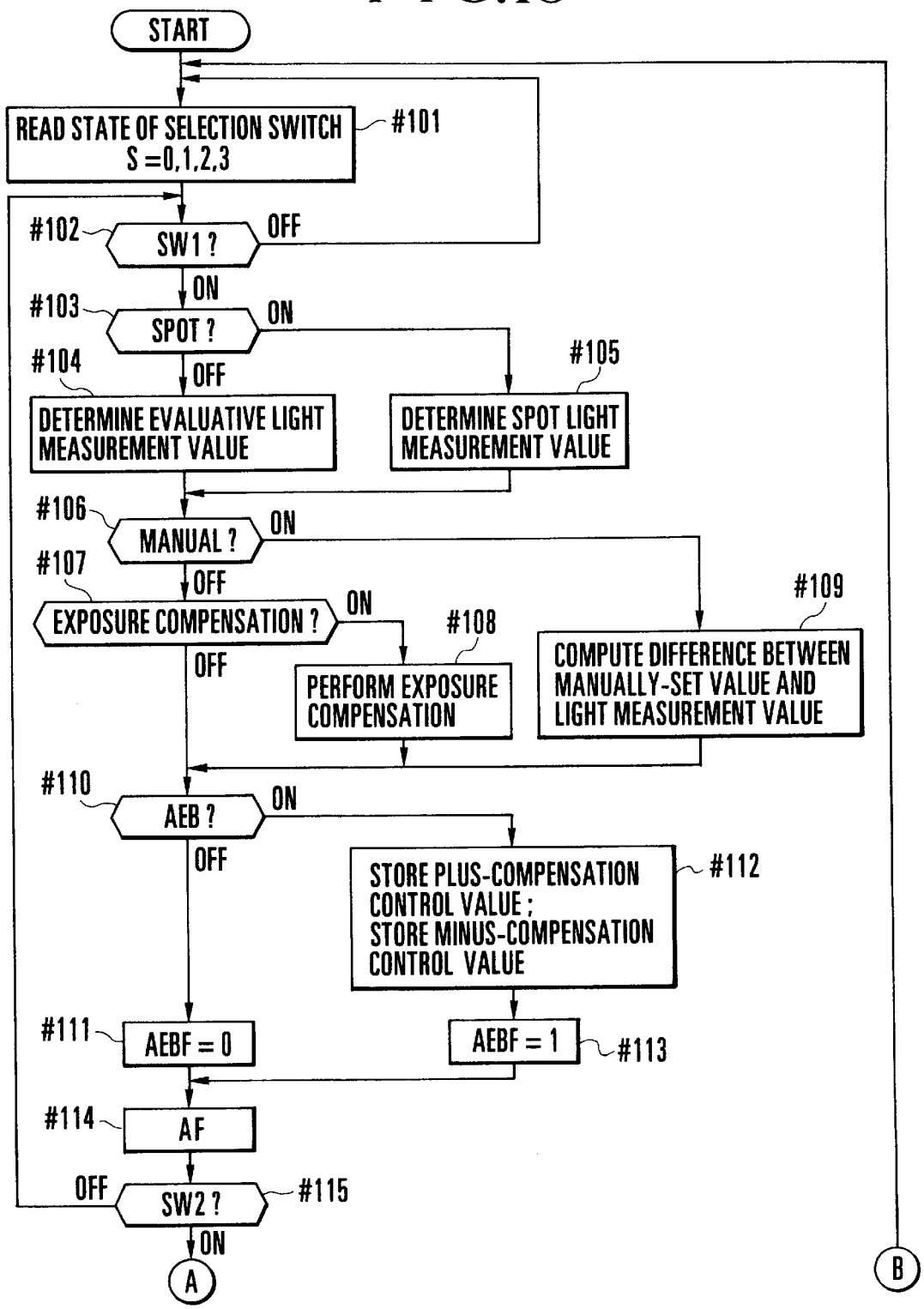
FIG. 10 is a flowchart of the processing of a microprocessor 101 according to a fifth embodiment of the present invention.
Figure 11:
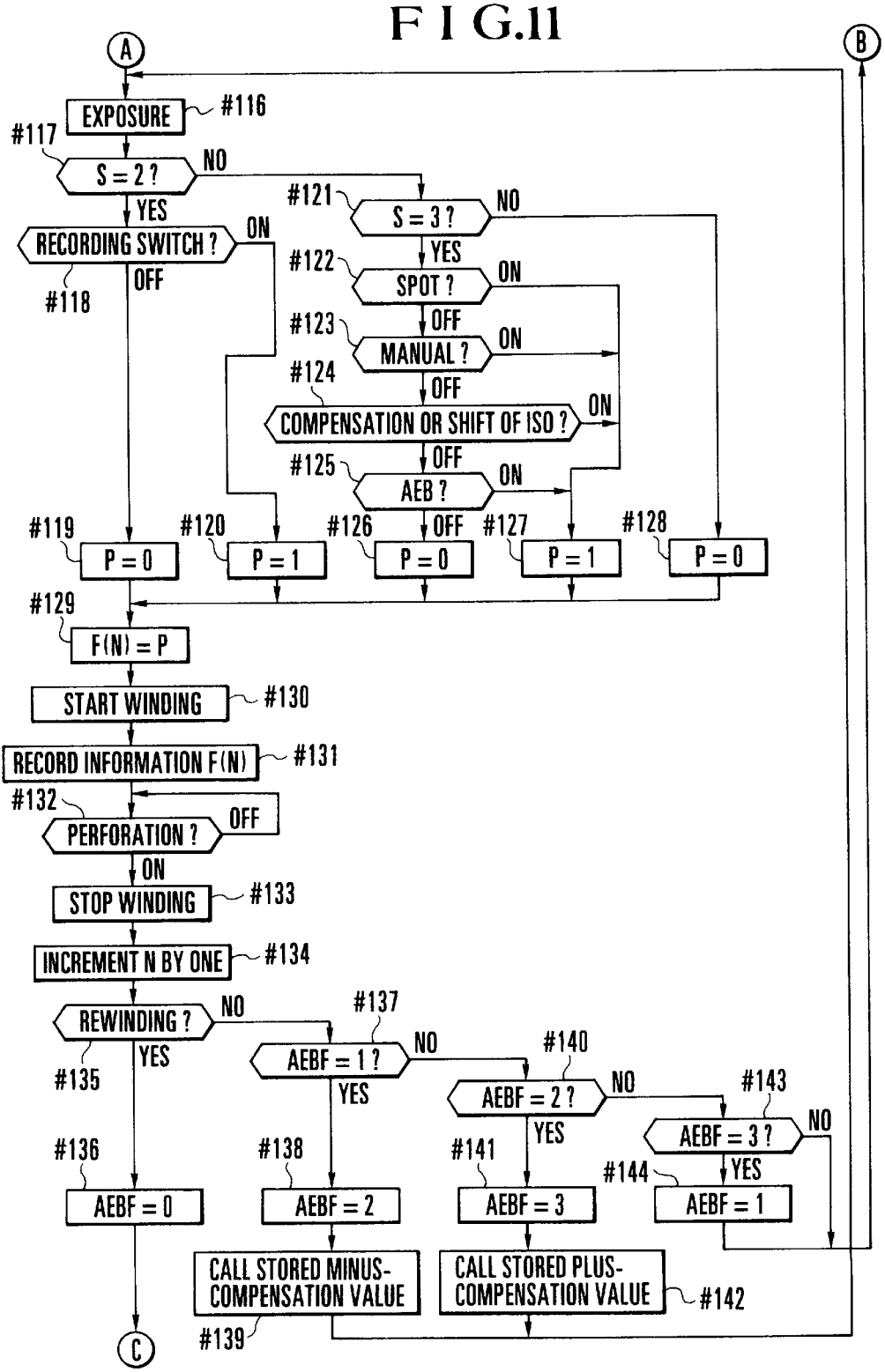
FIG. 11 is a companion flowchart of the processing of the microprocessor 101 according to the fifth embodiment of the present invention.

In the flowchart shown in FIGS. 21, 22 and 23, identical reference numerals are used to denote operating steps identical to those of the flowchart shown in FIGS. 10, 11 and 12. For the sake of simplicity, the description of the identical steps is omitted and only steps different from those shown in FIGS. 10, 11 and 12 will be described below. In Step #101', the state of the selection switch 113 for selecting an information recording method is detected. If S=0, the mode "recording off" is set; if S=1, the mode "recording for all frames" is set; and if S=2, the mode "recording by automatic input on frame-by-frame basis" is set. In the tenth embodiment, Steps #118 to #120 and #121 are omitted.

In the description of each of the above-described embodiments, reference has been made to the execution or nonexecution of exposure compensation during the mode "recording by automatic input on frame-by-frame basis". Although not specifically described herein, processing for the state in which a film speed is shifted is similar to the above-described processing for the execution or nonexecution of exposure compensation. Setting for shifting the film speed and setting for executing the exposure compensation can be regarded as similar in that exposure is intentionally controlled by a photographer.

Figure 24:
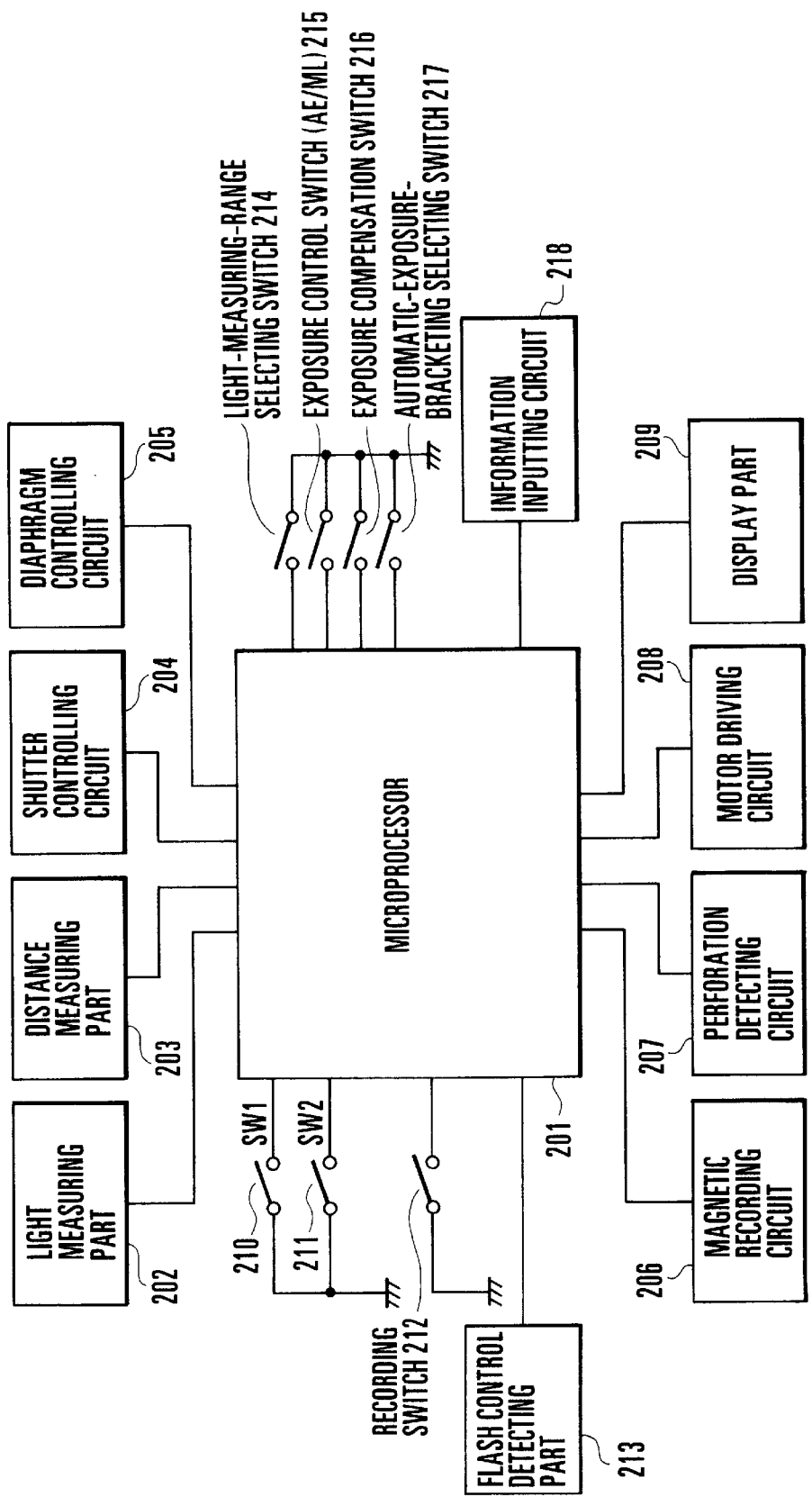
FIG. 24 is a block diagram schematically showing the circuit arrangement of another example of the camera to which the present invention is applied.

FIG. 24 is a block diagram showing the circuit arrangement of a camera according to an eleventh embodiment of the present invention. The camera shown in FIG. 9 includes a microprocessor 201, and all the operations, such as display processing, that are required for the camera to execute a photographing operation are controlled in accordance with a program built in the microprocessor 201. The mechanism of each part of the camera operates in accordance with an instruction given by the microprocessor 201. The camera also includes a light measuring part 202, and the output of the light measuring part 202 is inputted to an A/D converter provided in the microprocessor 201 and is converted into a digital value. The camera also includes a distance measuring part 203, a shutter controlling circuit 204 and a diaphragm controlling circuit 205, all of which make use of known circuits. The camera also includes a magnetic recording circuit 206, a perforation detecting circuit 207 and a motor driving circuit 208, and the motor driving circuit 208 is arranged to drive a film transporting motor (not shown) in the forward direction during film winding or in the reverse direction during film rewinding. A display part 209 displays a shutter control value, an aperture control value and the states of various other information settings.

The camera also includes a light-distance measurement starting switch (SW1) 210 which is turned on when a release operating member (not shown) is placed in a first operational state, an exposure starting switch (SW2) 211 which is turned on when the release operating member is placed in a second operational state, and a switch 212 for specifying whether information indicative of an instruction to perform print exposure with a fixed time is to be recorded for all frames.

The camera also includes a flash control detecting part 213 for making a decision as to whether correct flash control has been effected during flash emission, i.e., the amount of flash emission has reached a predetermined amount, a light-measuring-range selecting switch 214 for selecting either one of evaluative light measurement and spot light measurement, an exposure controlling switch 215 for selecting either one of AE (automatic exposure) and manual exposure, an exposure compensation switch 216 arranged to be pressed while the amount of exposure compensation is being inputted via an information inputting circuit 218, an automatic-exposure-bracketing (AEB) selecting switch 217 arranged to be pressed while the amount of exposure bracketing is being inputted via the information inputting circuit 218, and the information inputting circuit 218 for decoding and counting information inputted from a dial (not shown).

The film used in the eleventh and other embodiments of the present invention has magnetic recording areas, one of which is formed in the leader part of the film and the others of which are respectively formed at at least locations which correspond to individual frames. Various information is recorded on these magnetic recording areas by the magnetic recording circuit 206. During exposure for printing, a printer reads the recorded information and executes control as to whether to fix the time of print exposure for all frames. The film speed (ISO speed) is also inputted to the microprocessor 201.

The operation of the camera shown in FIG. 24 will be described below with reference to the flowchart shown in FIGS. 25, 26 and 27.

In Step T101, the state of the light-distance measurement starting switch (SW1) 210 is detected. If it is off, the process returns to Step T101, whereas if it is off, the process proceeds to Step T102.

In Step T102, an input signal is provided from the light-measuring-range selecting switch 214 and it is determined whether the spot light measurement mode has been selected. If it has not been selected, the process proceeds to Step T103, in which a light measurement value is determined by evaluative light measurement. If it has been selected, the process proceeds to Step T104, in which a light measurement value is determined by spot light measurement.

Then, in Step T105, the state of the exposure controlling switch 215 is detected and it is determined whether the selected exposure control mode is manual exposure. If AE (automatic exposure) has been selected, the process proceeds to Step T106, in which the state of the exposure compensation switch 216 is detected and it is determined whether exposure compensation has been set. If it is determined that exposure compensation has been set, the exposure compensation is executed in Step T107. If it is determined in Step T105 that manual compensation has been set, the process proceeds to Step T108, in which the difference between the light measurement value and a control set value is computed. Incidentally, exposure control is performed by using the control value. Then, in Step T109, the state of the automatic-exposure-bracketing selecting switch 217 is detected and it is determined whether the automatic exposure bracketing (AEB) has been set. If the AEB has not been set, the process proceeds to Step T110, in which the flag AEB is set to "0". If the AEB has been set, the process proceeds to Step T111, in which control values for the second and third exposures are stored, and the flag AEB is set to "1" in Step T112. Then, the process proceeds to Step T113.

Then, distance measurement is performed in Step T113, and it is determined in Step T114 whether the exposure starting switch (SW2) 211 has been pressed. If the exposure starting switch (SW2) 211 has not been pressed, the process returns to Step T101, whereas if it has been pressed, the process proceeds to Step T115 shown in FIG. 26.

In Step T115, film exposure is performed on the basis of the shutter and diaphragm control values. Then, it is determined in Step T116 whether the mode of spot light measurement has been selected. If the answer in Step T116 is NO, the process proceeds to Step T117, in which it is determined whether the mode of manual exposure control has been selected. If the answer in Step T117 is NO, the process proceeds to Step T118, in which it is determined whether exposure compensation has been set (the film speed has been shifted). If the answer in Step T118 is NO, the process proceeds to Step T119, in which it is determined whether the AEB (automatic exposure bracketing) has been set. If the answer in any one of Steps T116 to T119 is YES, i.e., a photographer has some image-creating intention, the process proceeds to Step T122, in which an image-creating-intention flag F(N) is set to "1" (N=frame number). In Step T123, a presence-of-image-creating-intention counter $K_{OK}$ is incremented by one. Incidentally, these settings of Steps T122 and T123 indicate that a photographer has intentionally controlled exposure. If the answer in any of Steps T116 to T119 is NO, the image-creating-intention flag F(N) is reset to "0" in Step T120 and an absence-of-image-creating-intention count $K_{NG}$ is incremented by one in Step T121. Then, the process proceeds to Step T124.

In Step T124, the motor driving circuit 208 is activated to start winding a film. After film transport for one frame has been detected by the perforation detecting circuit 207 in Step T125, the motor driving circuit 208 is stopped to stop winding in Step T126. In Step T127, the frame number N is increased by one, and it is determined in Step T128 whether rewinding is needed. If rewinding is not needed, the process proceeds to Step T130, in which it is determined whether the value of the flag AEB is "1". If it is "1", the flag AEB is set to "2" in Step T131 and a minus-compensation value is called in Step T132. Then, the process returns to Step T115. If it is determined in Step T130 that the value of the flag AEB is not "1", the process proceeds to Step T133, in which it is determined whether the value of the flag AEB is "2". If it is "2", the flag AEB is set to "3" in Step T134 and a plus-compensation value is called in Step T135. Then, the process returns to Step T115. If it is determined in Step T133 that the value of the flag AEB is not "2", the process proceeds to Step T136, in which it is determined whether the value of the flag AEB is "3". If it is "3", the flag AEB is returned to "1" in Step T137, whereas if it is not "3", the process returns to Step T101. If rewinding is needed, the process proceeds to Step T129, in which the flag AEB is returned to "0", and then, the process proceeds to Step T138.

In Step T138 shown in FIG. 27, the state of the recording switch 212 is detected and it is determined whether a mode for recording information indicative of an instruction to produce prints from all frames on the basis of a reference amount of print exposure, i.e., fix the time of print exposure, (hereinafter referred to simply as the "all-frame fixing mode") has been selected. If the recording switch 212 is on and the all-frame fixing mode has been selected, the process proceeds to Step T139, in which the value of the absence-of-image-creating-intention count $K_{NG}$ is compared with $K_T$ ($K_T$ is a predetermined number not less than 1). If the value of the absence-of-image-creating-intention count $K_{NG}$ is not less than $K_T$, the method of recording information for each individual frame of the film is selected. Specifically, in Step T142, the motor driving circuit 208 is activated to start rewinding, and, in Step T143, the value of the image-creating-intention flag F(N) is detected for each individual frame and if the detected value of the image-creating-intention flag F(N) is "1", an instruction to perform printing based on the reference amount of print exposure is recorded via the magnetic recording circuit 206 on a magnetic track (magnetic recording area) for a frame corresponding to that image-creating-intention flag F(N). In Step T144, it is detected whether the film has been rewound by one frame, via the perforation detecting circuit 207. If it is detected that the film has been rewound by one frame, the process proceeds to Step T145, in which the frame number N is decreased by one. In Step T146, it is determined whether the film for all frames has been rewound. If the film for all frames has not yet been rewound, the process returns to Step T143. If the film for all frames has been rewound, the process proceeds to Step T152, in which rewinding is made to stop. If it is determined in Step T139 that the value of the absence-of-image-creating-intention count $K_{NG}$ is less than $K_T$, the process proceeds to Step T140, in which the flag $F_{ALL}$ is set to "1" in order to record information indicative of an instruction to produce prints from all frames on the basis of the reference amount of print exposure. Then, the process proceeds to Step T147. If it is determined in Step T138 that the recording switch 212 is off, the flag $F_{ALL}$ is reset to "0" in Step T141 and the process proceeds to Step T147.

In Step T147, the motor driving circuit 208 is activated to start rewinding, and, in Step T148, it is detected whether the film has been rewound by one frame, via the perforation detecting circuit 207. If it is detected that the film has been rewound by one frame, the process proceeds to Step T149, in which the frame number N is decreased by one. In Step T150, it is determined whether the film for all frames has been rewound. If the film for all frames has not yet been rewound, the process returns to Step T148. If the film for all frames has been rewound, the process proceeds to Step T151, in which the value of the flag $F_{ALL}$ ("1" indicative of an instruction to produce prints from all frames on the basis of the reference amount of print exposure or "0" indicative of an instruction to perform automatic printing of all frames) is recorded on a magnetic track (magnetic recording area) formed in the leader part of the film via the magnetic recording circuit 206. In Step T152, rewinding is made to stop, and, in Step T153, the presence-of-image-creating-intention counter $K_{OK}$ and the absence-of-image-creating-intention count $K_{NG}$ are returned to "0". When the film is taken out in Step T154, the entire operation is brought to an end.

Figure 27:
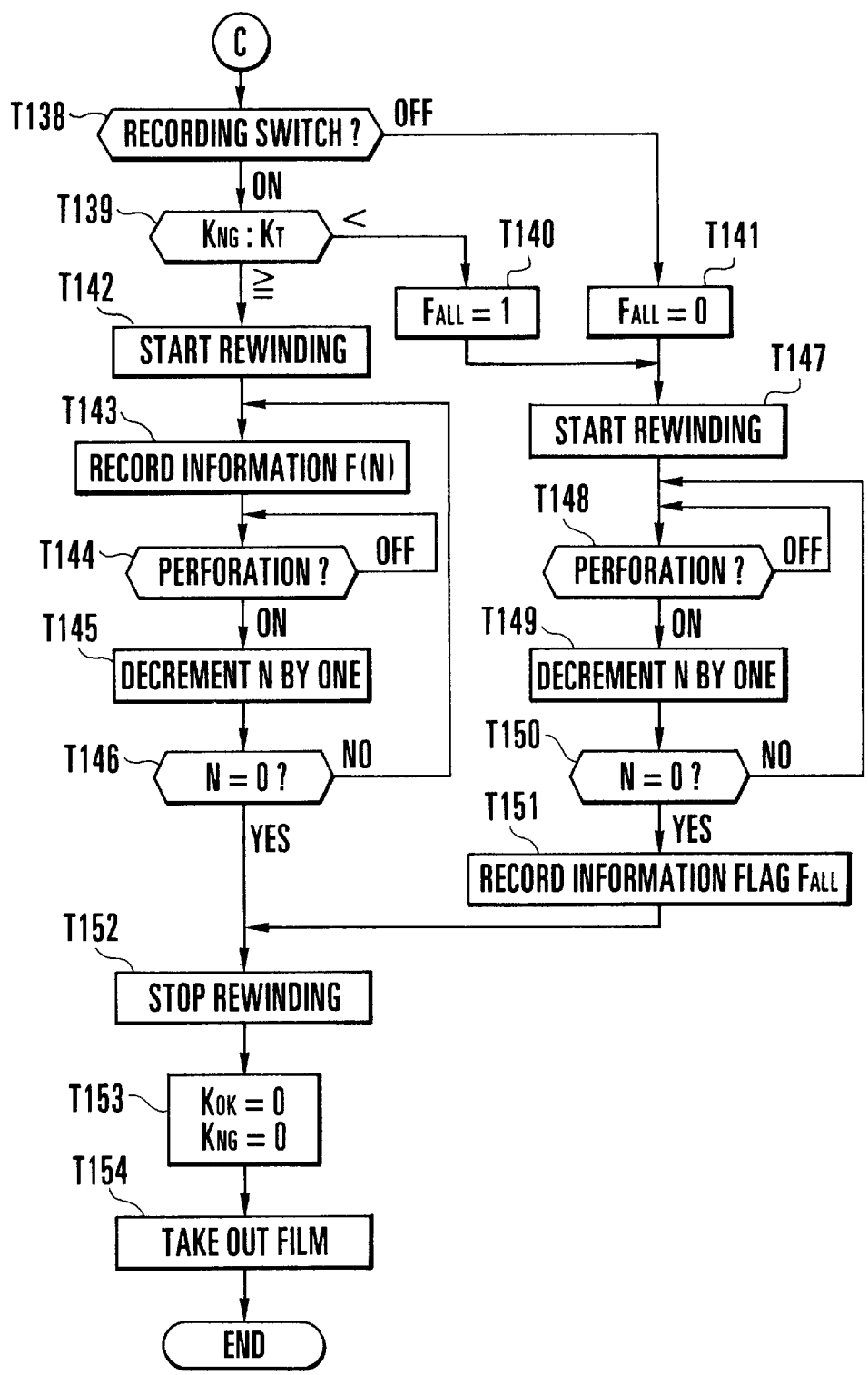
FIG. 27 is a further companion flowchart showing the operation of the eleventh embodiment of the present invention.
Figure 28:
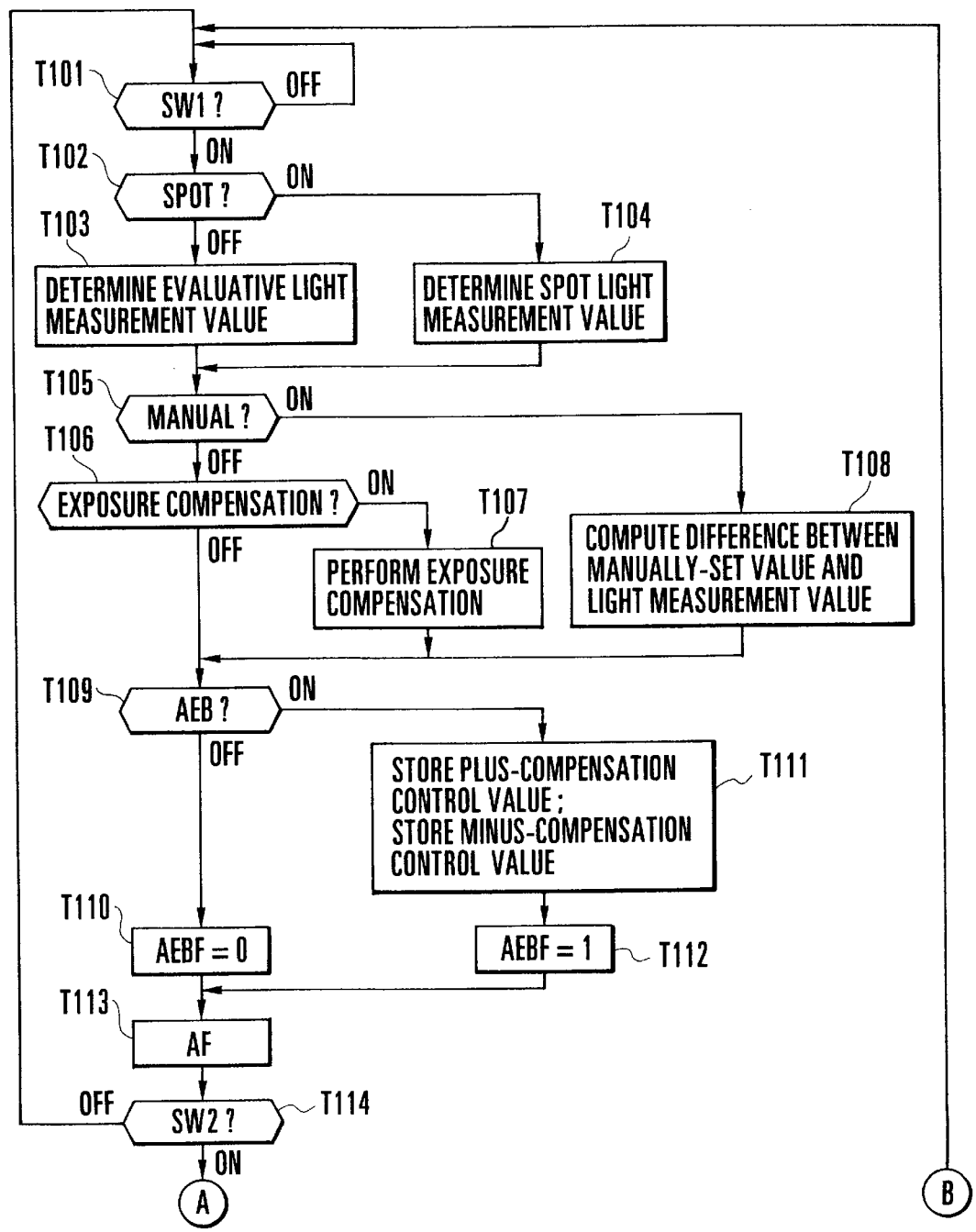
FIG. 28 is a flowchart showing the operation of a twelfth embodiment of the present invention.
Figure 29:
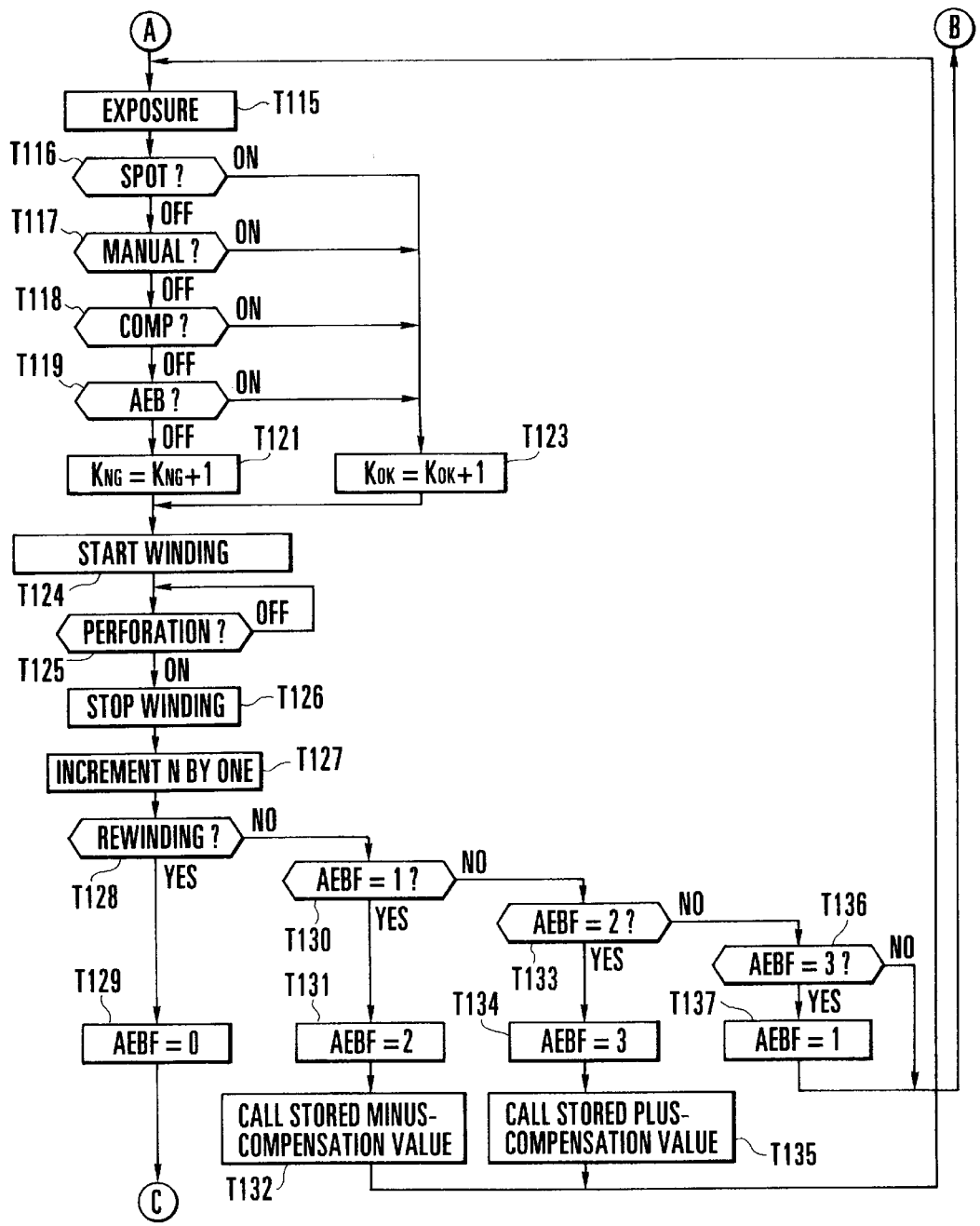
FIG. 29 is a companion flowchart showing the operation of the twelfth embodiment of the present invention.
Figure 30:
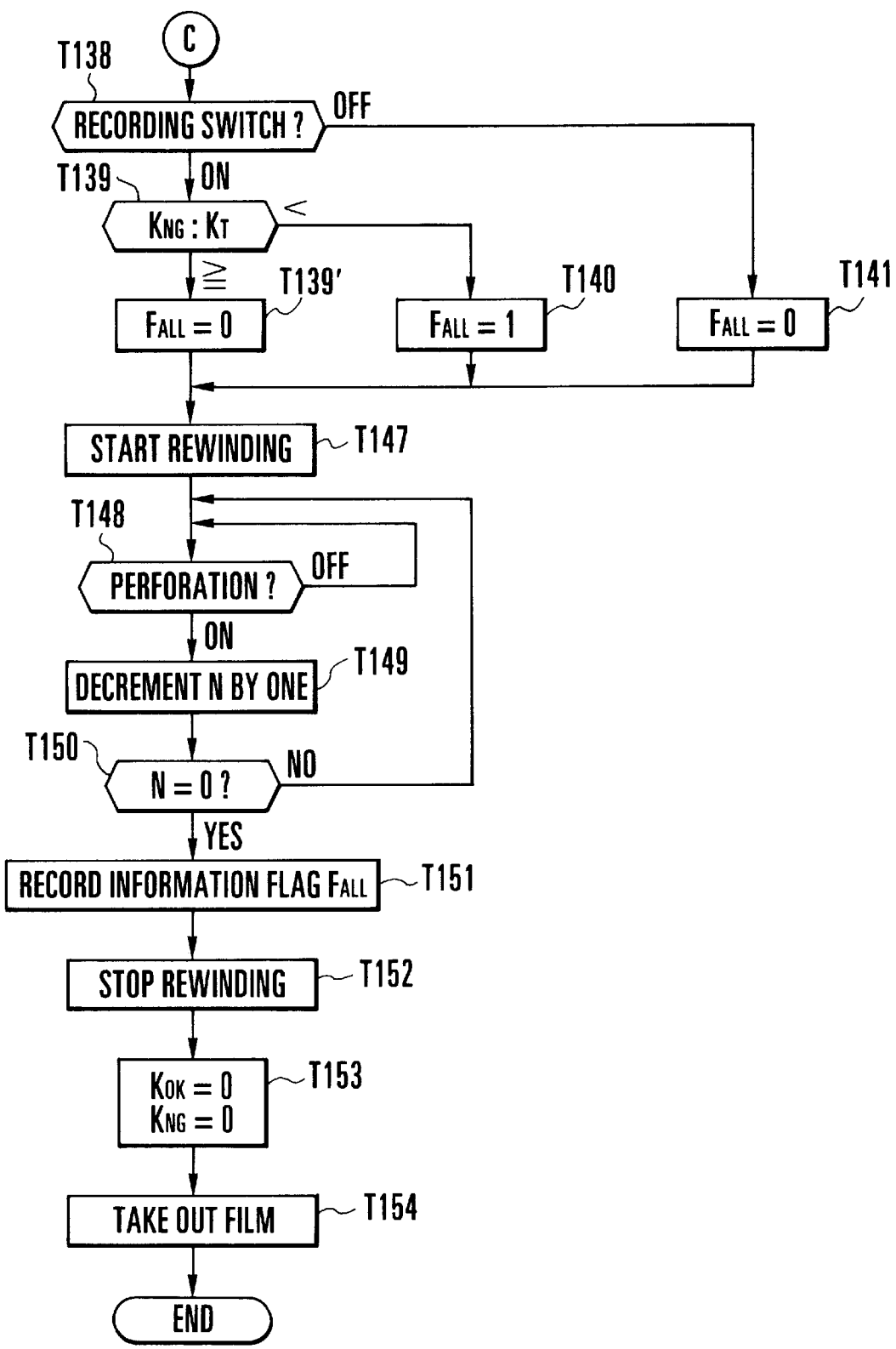
FIG. 30 is a further companion flowchart showing the operation of the twelfth embodiment of the present invention.

FIGS. 28, 29 and 30 are a flowchart showing a twelfth embodiment of the present invention. In FIGS. 28, 29 and 30, identical reference numerals are used to denote operating steps identical to those shown in FIGS. 25, 26 and 27. For the sake of simplicity, the description of the identical steps is omitted and only steps different from those shown in FIGS. 25, 26 and 27 will be described below.

In the eleventh embodiment described above with reference to FIGS. 25, 26 and 27, if the number of frames unsuited to printing based on a fixed time of print exposure is not less than the predetermined number, the processing of fixing the time of print exposure for each individual frame is selected. In contrast, in the twelfth embodiment, if the number of frames unsuited to printing based on a fixed time of print exposure is not less than the predetermined number, information indicative of an instruction to fix the time of print exposure for all frames is not recorded even if the processing of recording such information is selected.

For this reason, in the twelfth embodiment, Steps T120 and T122 incorporated in the eleventh embodiment are omitted. Referring to Steps T138 to T141 shown in FIG. 30, if the recording switch 212 is on and the absence-of-image-creating-intention count $K_{NG}$ is not less than the predetermined number of frames $K_T$, the information flag $F_{ALL}$ is reset to "0" (Step T139'). If the recording switch 212 is on and the absence-of-image-creating-intention count $K_{NG}$ is less than the predetermined number of frames $K_T$, the information flag $F_{ALL}$ is set to "1" (Step T140). After the film for all frames has been rewound (the frame number N has returned to "0") in Step T150, the value of the flag $F_{ALL}$ is magnetically recorded in Step T151. In this case, the value of the flag $F_{ALL}$ is recorded on the magnetic track formed in the leader part of the film.

Figure 25:
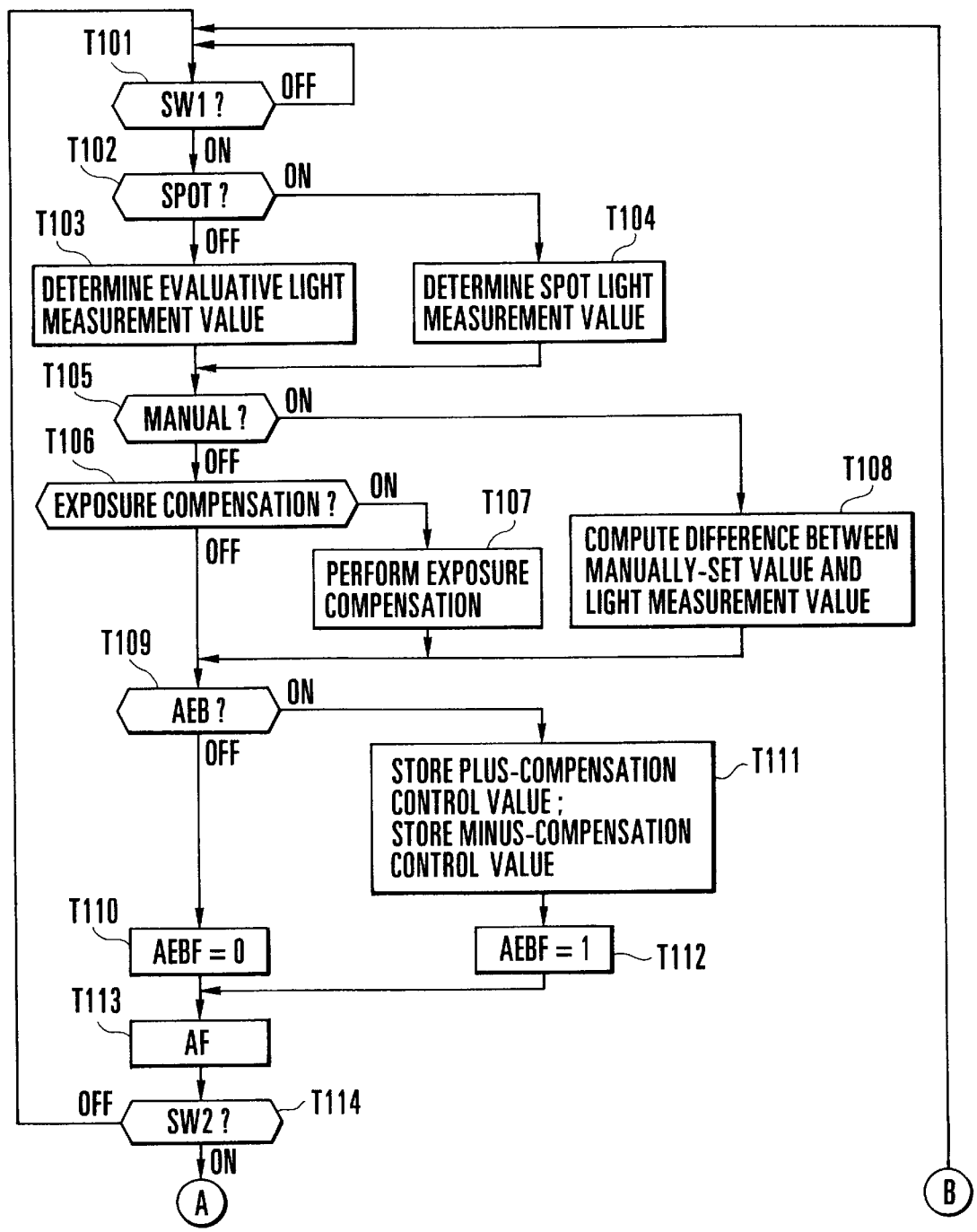
FIG. 25 is a flowchart showing the operation of an eleventh embodiment of the present invention.
Figure 26:
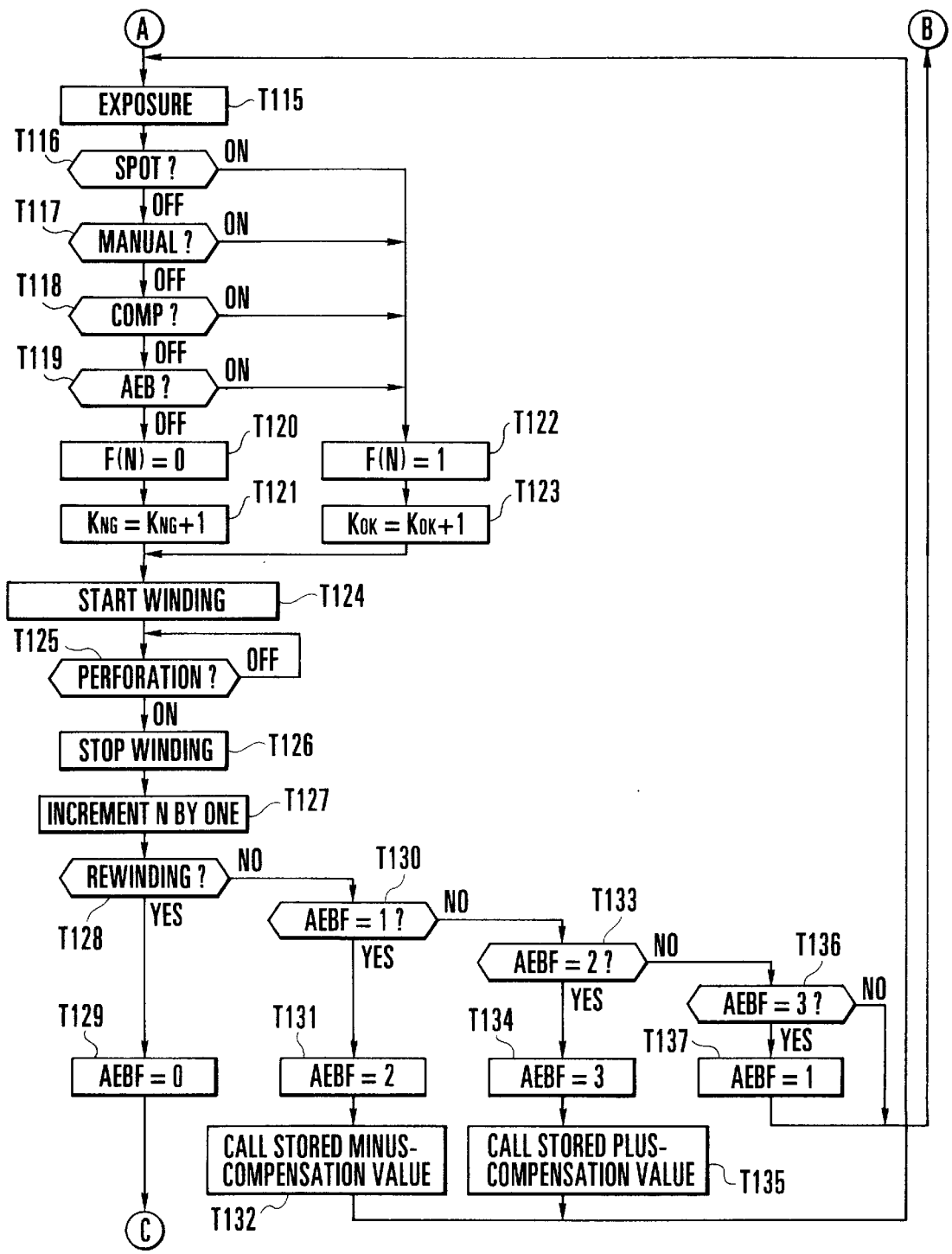
FIG. 26 is a further companion flowchart showing the operation of the eleventh embodiment of the present invention.
Figure 31:
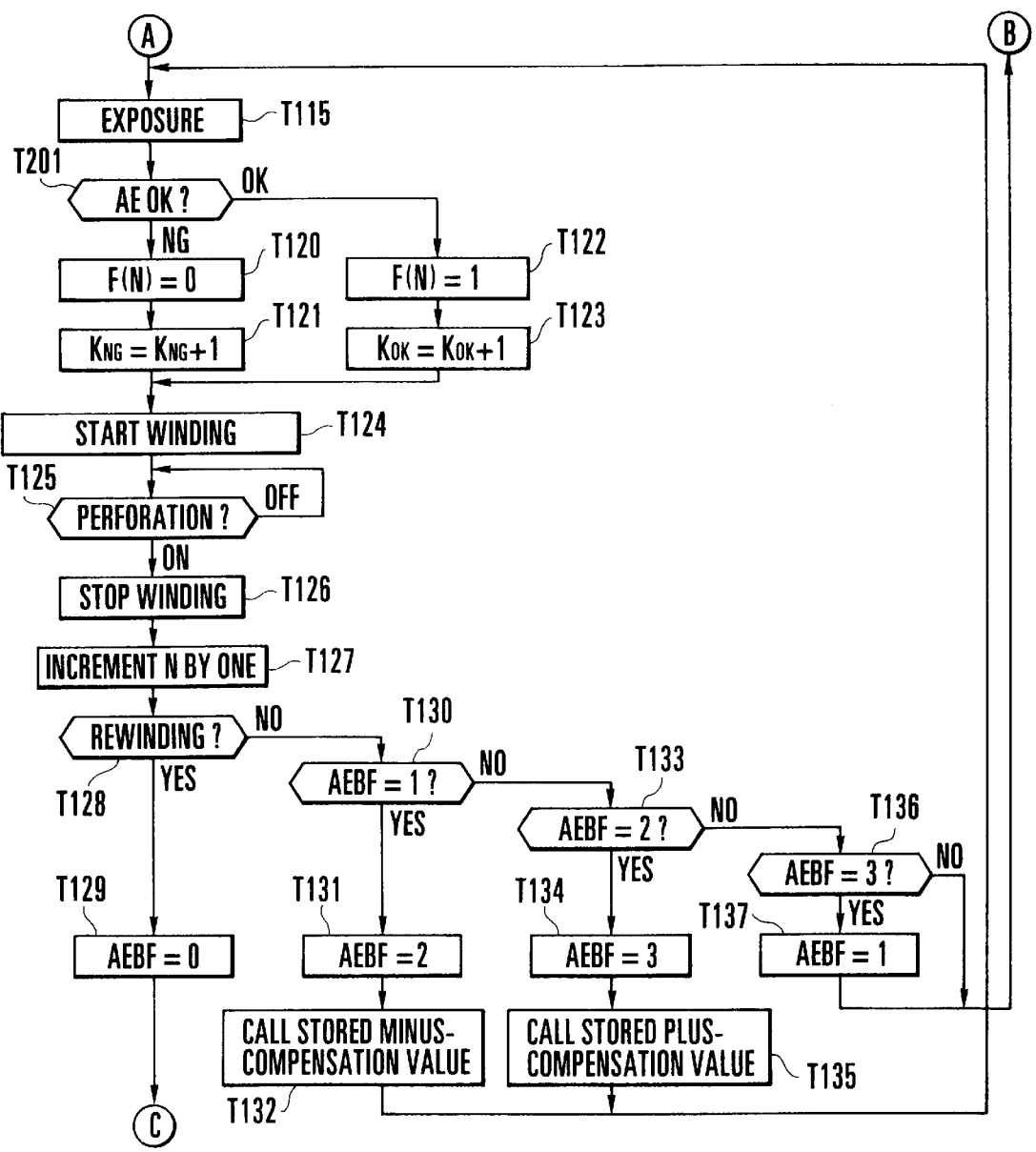
FIG. 31 is a flowchart showing the operation of a thirteenth embodiment of the present invention.

FIG. 31 shows a thirteenth embodiment which is a modification of the flowchart of FIG. 26 according to the eleventh embodiment shown in FIGS. 25 to 27.

In the thirteenth embodiment, Step T201 is provided in place of Steps T116 to T119 of FIG. 26 which shows the eleventh embodiment. In Step T201, a decision is made as to the state of exposure of an exposed frame, and it is determined whether the exposure thereof is in the AE-controllable range (correct exposure range). If the exposure of the exposed frame is in the AE-controllable range, the image-creating-intention flag F(N) corresponding to that frame is set to "1" and the presence-of-image-creating-intention counter $K_{OK}$ is incremented by one. If the exposure of the exposed frame is not in the AE-controllable range, the corresponding image-creating-intention flag F(N) is reset to "0" and the absence-of-image-creating-intention count $K_{NG}$ is incremented by one.

FIG. 32 shows a fourteenth embodiment which is a modification of the flowchart of FIG. 26 according to the eleventh embodiment shown in FIGS. 25 to 27.

In the fourteenth embodiment, Step T301 is provided in place of Steps T116 to T119 of FIG. 26 which shows the eleventh embodiment. In Step T301, it is determined whether correct flash control has been effected during flash emission for exposure of a frame. If correct flash control has been effected, the image-creating-intention flag F(N) corresponding to the exposed frame is reset to "0" and the presence-of-image-creating-intention counter $K_{OK}$ is incremented by one. In the case of incorrect flash control, the corresponding image-creating-intention flag F(N) is reset to "0" and the absence-of-image-creating-intention count $K_{NG}$ is incremented by one.

Any of the above-described eleventh to fourth embodiments is characterized in that a decision is made as to whether all frames of a film are suited to printing based on a fixed time of print exposure, and none of the aforesaid examples are to be construed as limiting examples.

Although the thirteenth and fourteenth embodiments are modifications of the eleventh embodiment, a modification of the twelfth embodiment may also be adopted. The modification of the twelfth embodiment may be obtained by replacing the part of FIG. 29 of the flowchart shown in FIGS. 28 to 30 with the flowchart of FIG. 31 or 32.

Figure 33:
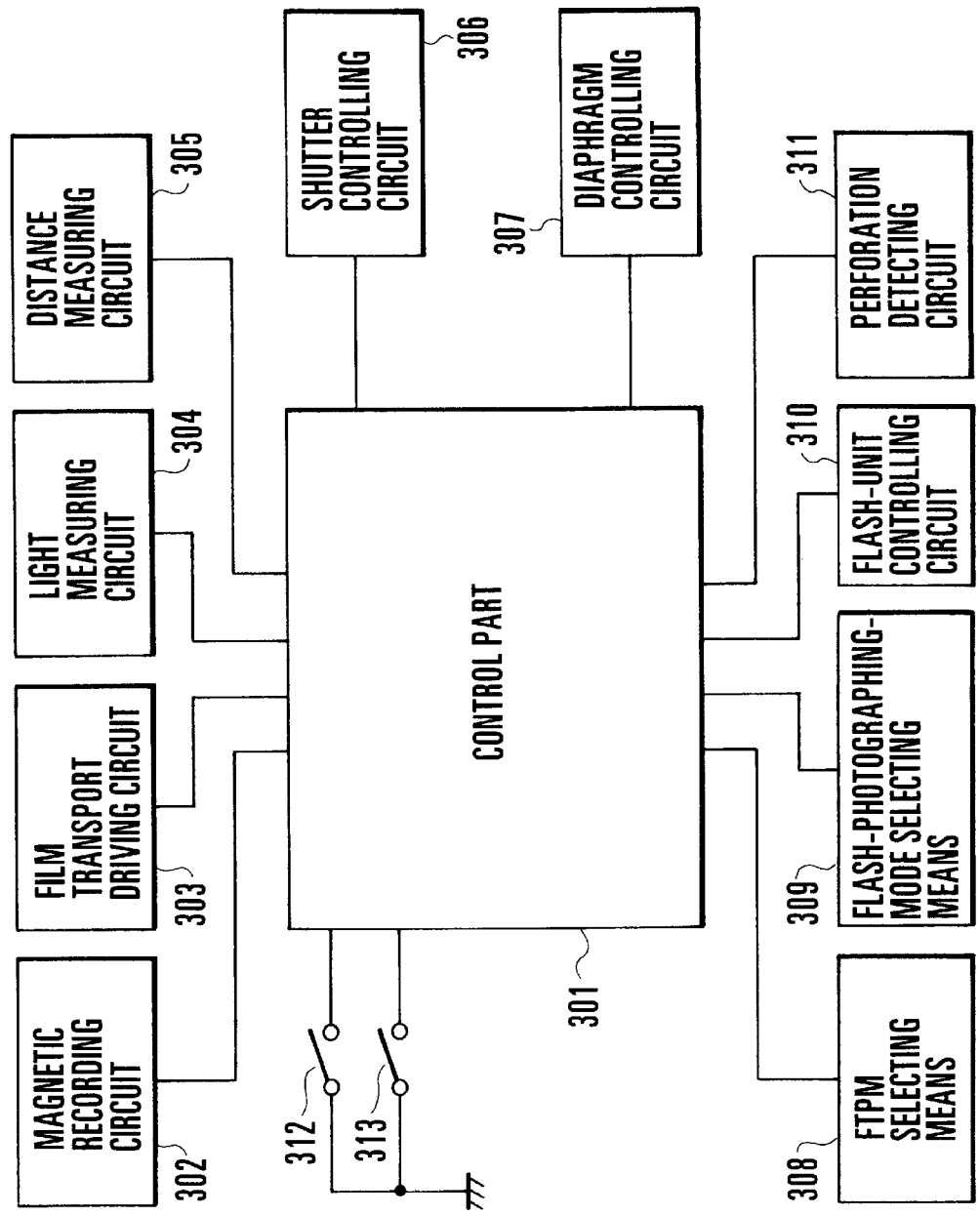
FIG. 33 is a block diagram of the electrical circuit of another example of a camera to which the present invention is applied.
Figure 34:
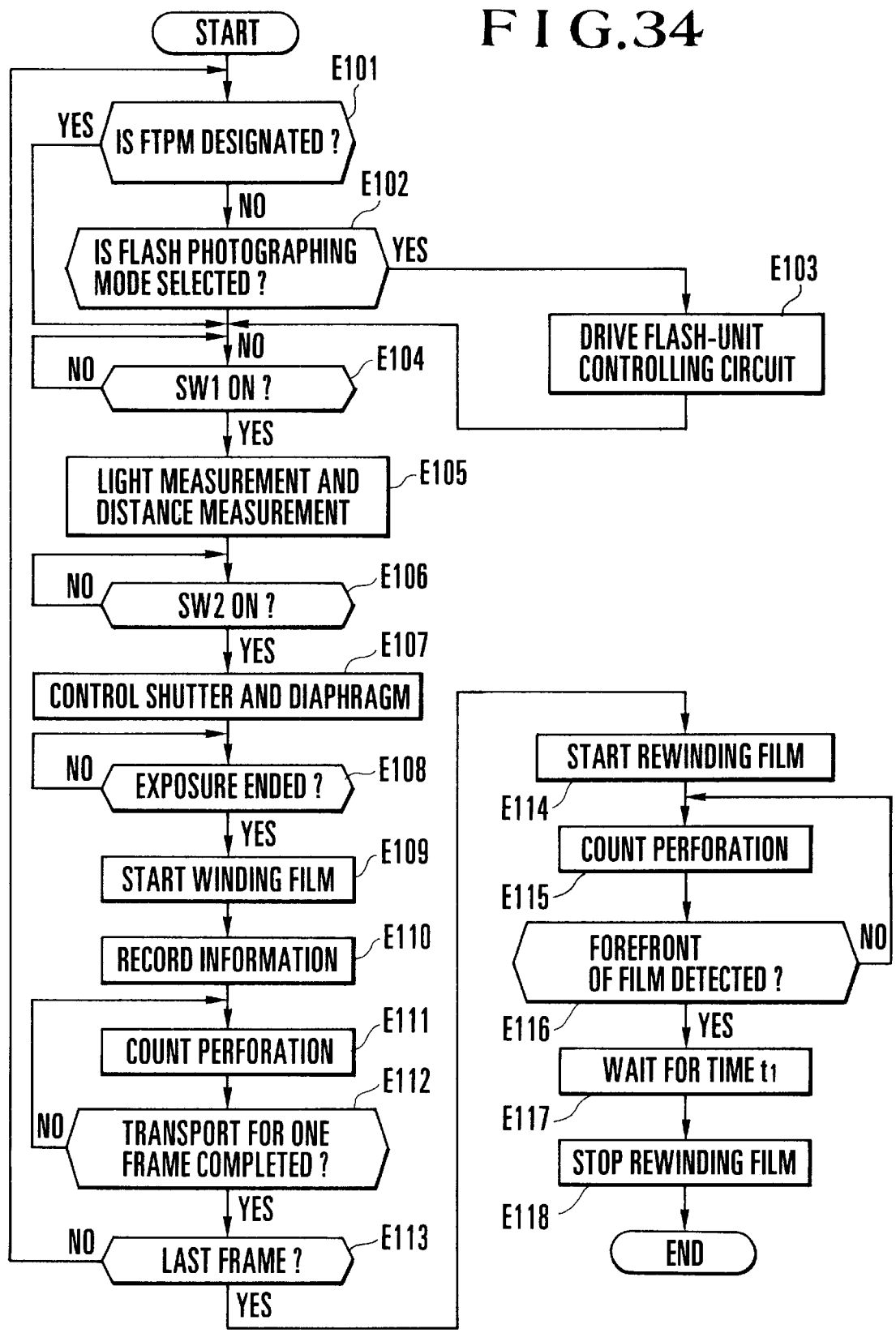
FIG. 34 is a flowchart showing the operation of a fifteenth embodiment of the present invention.

FIGS. 33 and 34 show a fifteenth embodiment of the present invention, and FIG. 33 is a block diagram of the electrical circuit of a camera according to the fifteenth embodiment. Referring to FIG. 33, the camera includes a control part 301 for controlling the entire camera, the control part 301 being formed by a microcomputer or the like, a magnetic recording circuit 302 for controlling a magnetic head (not shown) to write and read information to and from a magnetic storage part (magnetic recording area) provided on a film, a film transport driving circuit 303 for driving a film transporting motor (not shown) for winding and rewinding the film, a light measuring circuit 304, a distance measuring circuit 305, a shutter controlling circuit 306, a diaphragm controlling circuit 307, FTPM selecting means 308 for choosing whether to designate printing based on a reference amount of print exposure (processing based on a fixed time of print exposure), flash-photographing-mode selecting means 309 for choosing whether to use a flash photographing mode for causing a built-in or externally attached type of flash unit to emit flash light, a flash-unit controlling circuit 310 for controlling the built-in or externally attached type of flash unit if the flash photographing mode is selected by the flash-photographing-mode selecting means 309, the flash-unit controlling circuit 310 including a built-in capacitor for flash emission, a perforation detecting circuit 311 for detecting the perforations of the film by means of a photoreflector or the like, a light measurement starting switch (SW1) 312, and an exposure starting switch (SW2) 313. The light measurement starting switch (SW1) 312 and the exposure starting switch (SW2) 313 are respectively arranged to be turned on at the first and second strokes of one switch member.

FIG. 34 is a flowchart showing the operation of the camera according to the fifteenth embodiment of the present invention.

First of all, in Step E101, it is determined whether processing based on the reference amount of print exposure has been designated for a frame to be exposed, by the FTPM selecting means 308. If processing based on the reference amount of print exposure has not been designated, the process proceeds to Step E102, whereas if it has been designated, the process proceeds to Step E104. In Step E102, it is determined whether the flash photographing mode has been selected by the flash-photographing-mode selecting means 309. If it has been selected, the process proceeds to Step E103, in which the flash-unit controlling circuit 310 is driven to start charging of the capacitor for flash emission (not shown). If it is determined in Step E102 that the flash photographing mode has not been selected, the process proceeds to Step E104.

In Step E104, it is determined whether the SW1 312 is on. If it is on, the process proceeds to Step E105, in which the light measuring circuit 304 and the distance measuring circuit 305 are operated and light and distance measuring operations are respectively performed on the basis of information provided by these circuits 304 and 305. Then, the process proceeds to Step E106, in which it is determined whether the SW2 313 is on. If it is on, the process proceeds to Step E107, in which the shutter controlling circuit 306 and the diaphragm controlling circuit 307 are operated to start an exposure operation. At this time, if the flash photographing mode has been selected, the flash-unit controlling circuit 310 causes the flash unit to emit flash light. Then, in Step E108, it is determined whether the exposure operation has ended. If it has ended, the process proceeds to Step E109. Incidentally, a method for detecting whether the exposure operation has ended may be a known method using, for example, a shutter-trailing-curtain running completion signal. In Step E109, the film transport driving circuit 303 is made to drive the film transporting motor, thereby starting winding of the film.

Then, in Step E110, photographic conditions, an arbitrary comment and information indicating whether processing based on the reference amount of print exposure are been designated are recorded on the magnetic storage part of the film by the operation of the magnetic recording circuit 302 (if it is determined in Step E101 that processing based on the reference amount of print exposure has been designated, information indicative of an instruction to perform processing based on the reference amount of print exposure, i.e., information indicative of an instruction to perform processing based on a fixed time of print exposure, is recorded on a magnetic track for that frame). In Step E111, the perforation detecting circuit 311 is made to count the number of perforations, and it is determined in Step E112 whether the number of perforations for one frame has been counted. If the answer in Step E113 is YES, the process proceeds to Step E113, whereas if it is NO, the process returns to Step E111. If the last frame is detected in Step E113, the process proceeds to Step E114, whereas if it is not the last frame, the process returns to Step E101 and the photographic sequence of Steps E101 to E112 is repeated.

In Step E114, the film transport driving circuit 303 is made to drive the film transporting motor, thereby starting rewinding the film. In Step E115, the perforation detecting circuit 311 is made to count the number of perforations of the film. After the film for all frames has been rewound, if the perforation detecting circuit 311 detects the passage of the forefront of the film (E116), the process waits until a timer time t1 passes in Step E117. When the timer time t1 passes, the process proceeds to Step E118, in which the film transport driving circuit 303 is made to stop the film transporting motor. Incidentally, the timer time t1 is the time required to completely roll the film in the cartridge thereof. In the fifteenth embodiment, if processing based on the reference amount of print exposure is designated, flash photography is inhibited.

Figure 35:
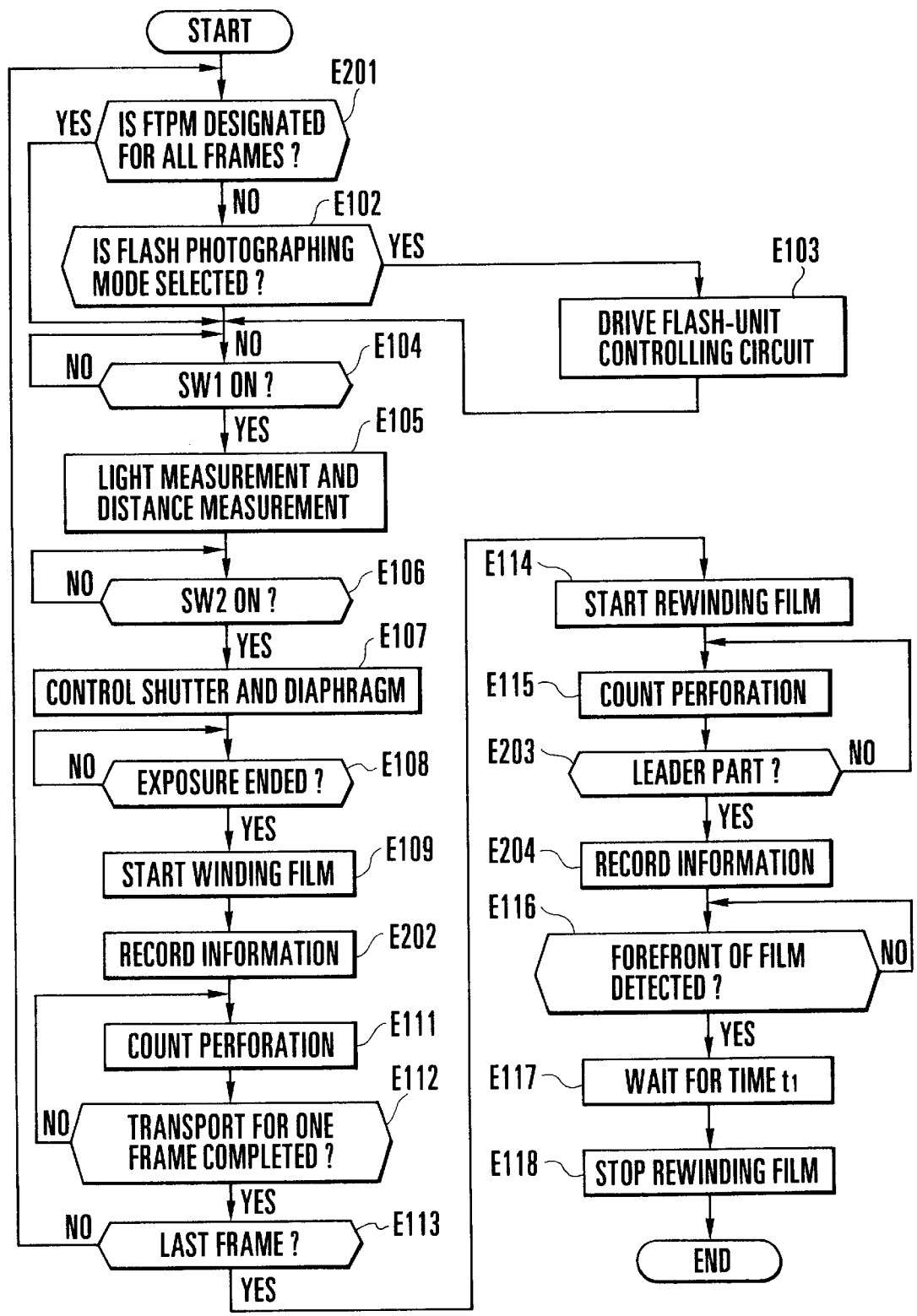
FIG. 35 is a flowchart showing the operation of a camera according to a sixteenth embodiment of the present invention.

FIG. 35 is a flowchart showing the operation of a camera according to a sixteenth embodiment of the present invention. In FIG. 35, identical reference numerals are used to denote operating steps identical to those shown in FIG. 34, and the description thereof is omitted.

Referring to only steps different from those shown in FIG. 34, in Step E201, it is determined whether processing based on the reference amount of print exposure (processing based on the fixed time of print exposure) has been designated for all frames through the FTPM selecting means 308 by a manual operation. In Step E202, information, such as photographic conditions and an arbitrary comment, is recorded on the magnetic recording part of the film by the operation of the magnetic recording circuit 302, but the information obtained in Step E201, which indicates whether processing based on the reference amount of print exposure has been designated, is not recorded. In Step E203, the perforation detecting circuit 311 is made to detect the leader part of the film. If the leader part is detected, the process proceeds to Step E204, in which the magnetic recording circuit 302 is made to record, on the magnetic recording part of the film, information indicating whether processing based on the reference amount of print exposure has been designated.

Figure 36:
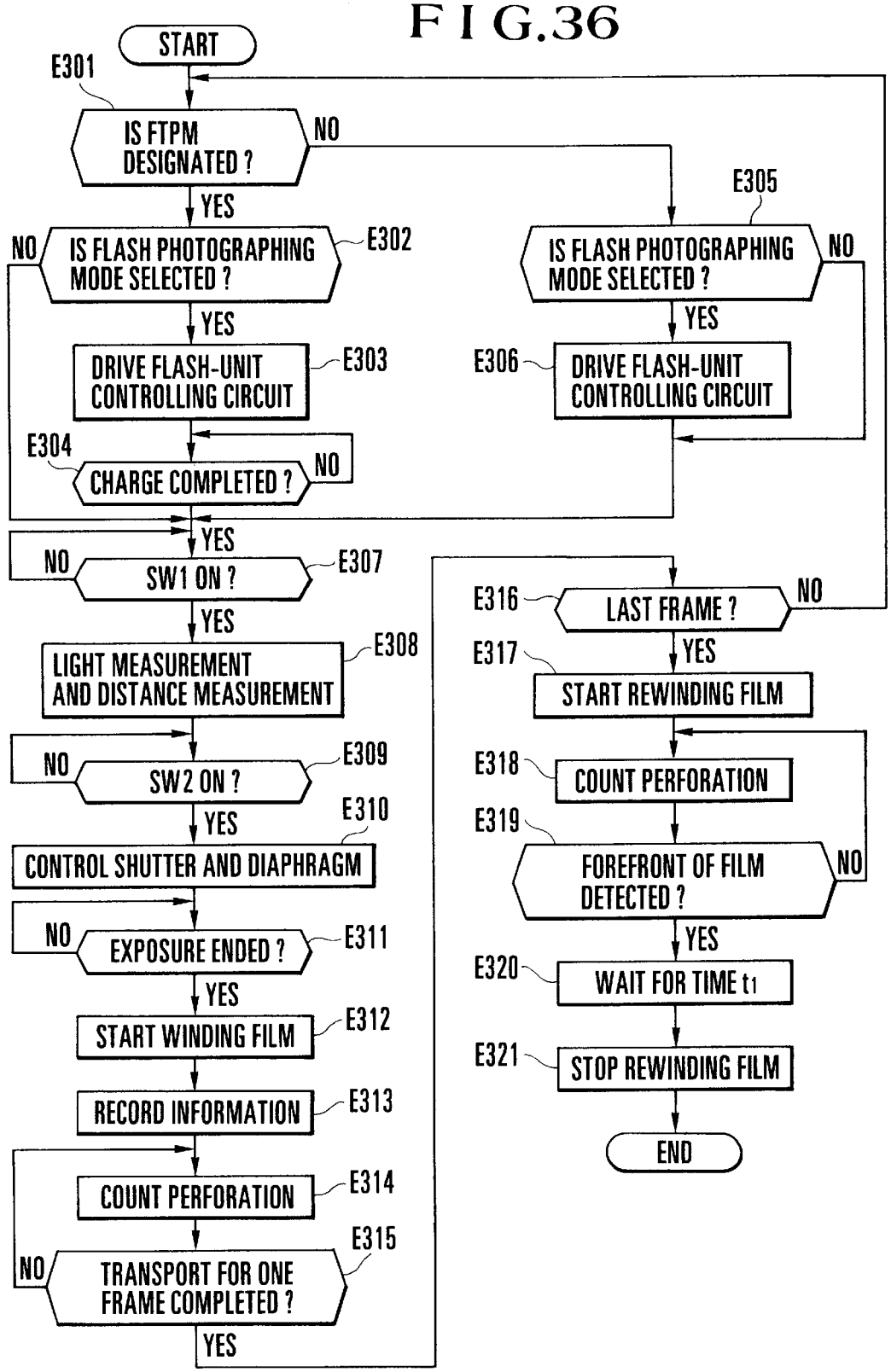
FIG. 36 is a flowchart showing the operation of a camera according to a seventeenth embodiment of the present invention.

FIG. 36 is a flowchart showing the operation of a camera according to a seventeenth embodiment of the present invention.

First of all, in Step E301, it is determined whether processing based on the reference amount of print exposure has been designated for a frame to be exposed, by the FTPM selecting means 308. If processing based on the reference amount of print exposure has not been designated, the process proceeds to Step E305, whereas if it has been designated, the process proceeds to Step E302. In Step E305, it is determined whether the flash photographing mode has been selected by the flash-photographing-mode selecting means 309. If it has been selected, the process proceeds to Step E306, in which the flash-unit controlling circuit 310 is driven (charging of the capacitor for flash emission is started). Then, the process proceeds to Step E307. If it is determined in Step E305 that the flash photographing mode has not been selected, the process proceeds to Step E307.

It is determined in Step E302 whether the flash photographing mode has been selected, and if it has been selected, the process proceeds to Step E303, in which the flash-unit controlling circuit 310 is driven. Then, it is determined in Step E304 whether the charging of the capacitor in the flash-unit controlling circuit 310 has been completed. If it has been completed, the process proceeds to Step E307, whereas if it has not been completed, the process proceeds to Step E304. If it is determined in Step E302 that the flash photographing mode has not been selected, the process proceeds to Step E307.

Steps E307 to E321 are substantially identical to Steps E104 to E118 shown in FIG. 34, and the description thereof is omitted. In the seventeenth embodiment, if processing based on the reference amount of print exposure is designated and the flash photography mode is selected, the camera waits for the completion of charging of the flash unit and executes flash photography only when flash photography of correct exposure is enabled.

Figure 37:
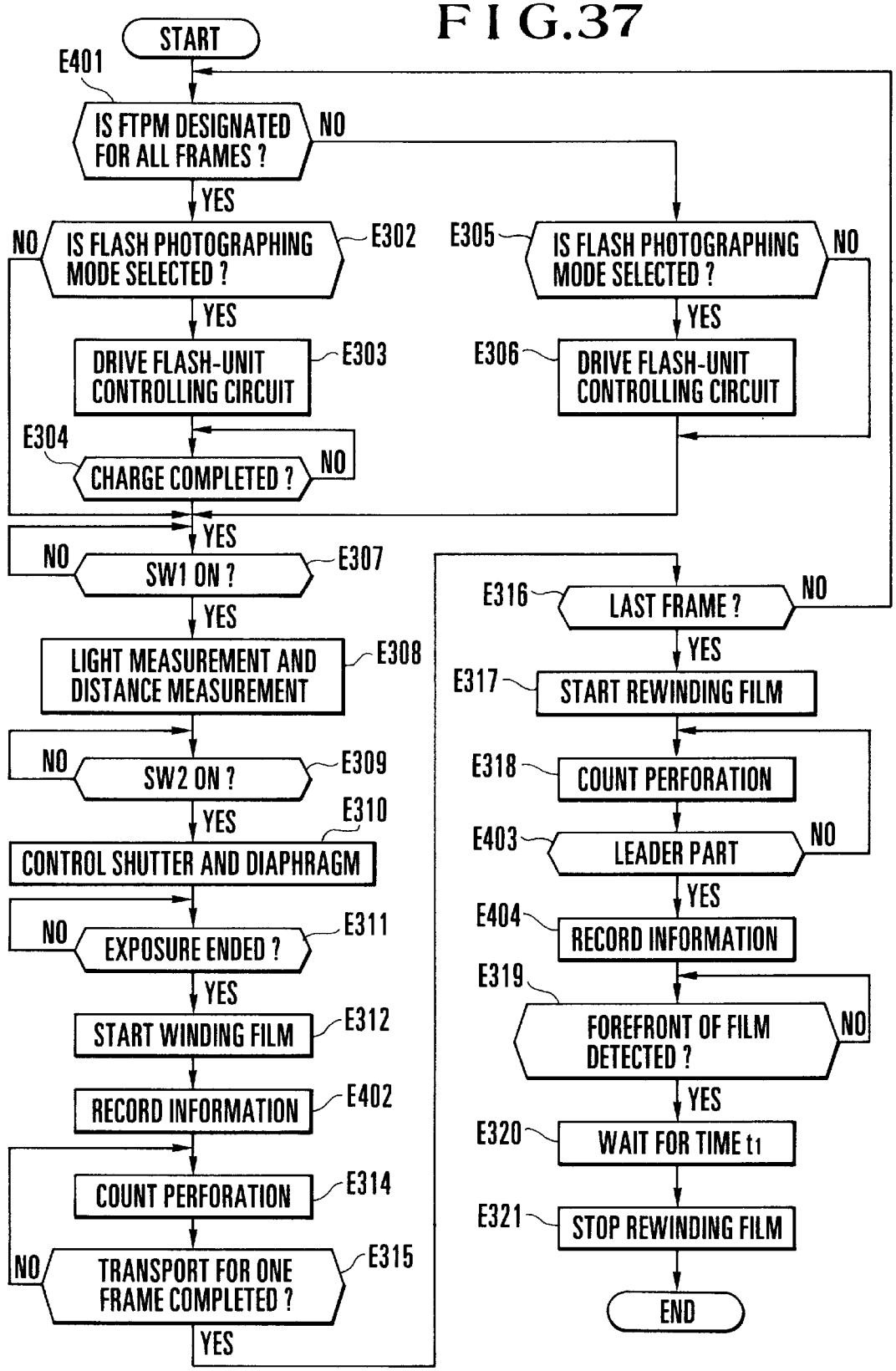
FIG. 37 is a flowchart showing the operation of a camera according to an eighteenth embodiment of the present invention.

FIG. 37 is a flowchart showing the operation of a camera according to an eighteenth embodiment of the present invention.

In FIG. 37, identical reference numerals are used to denote operating steps identical to those shown in FIG. 36, and the description thereof is omitted.

Referring to only steps different from those shown in FIG. 36, in Step E401, it is determined whether processing based on the reference amount of print exposure has been designated for all frames by the FTPM selecting means 308. In Step E402, information, such as photographic conditions and an arbitrary comment, is recorded on the magnetic recording part of the film by the operation of the magnetic recording circuit 302, but the information obtained in Step E401, which indicates whether processing based on the reference amount of print exposure has been designated, is not recorded. In Step E403, the perforation detecting circuit 311 is made to detect the leader part of the film. If the leader part is detected, the process proceeds to Step E404, in which the magnetic recording circuit 302 is made to record, on the magnetic recording part of the film, information indicating whether processing based on the reference amount of print exposure has been designated.

Figure 38:
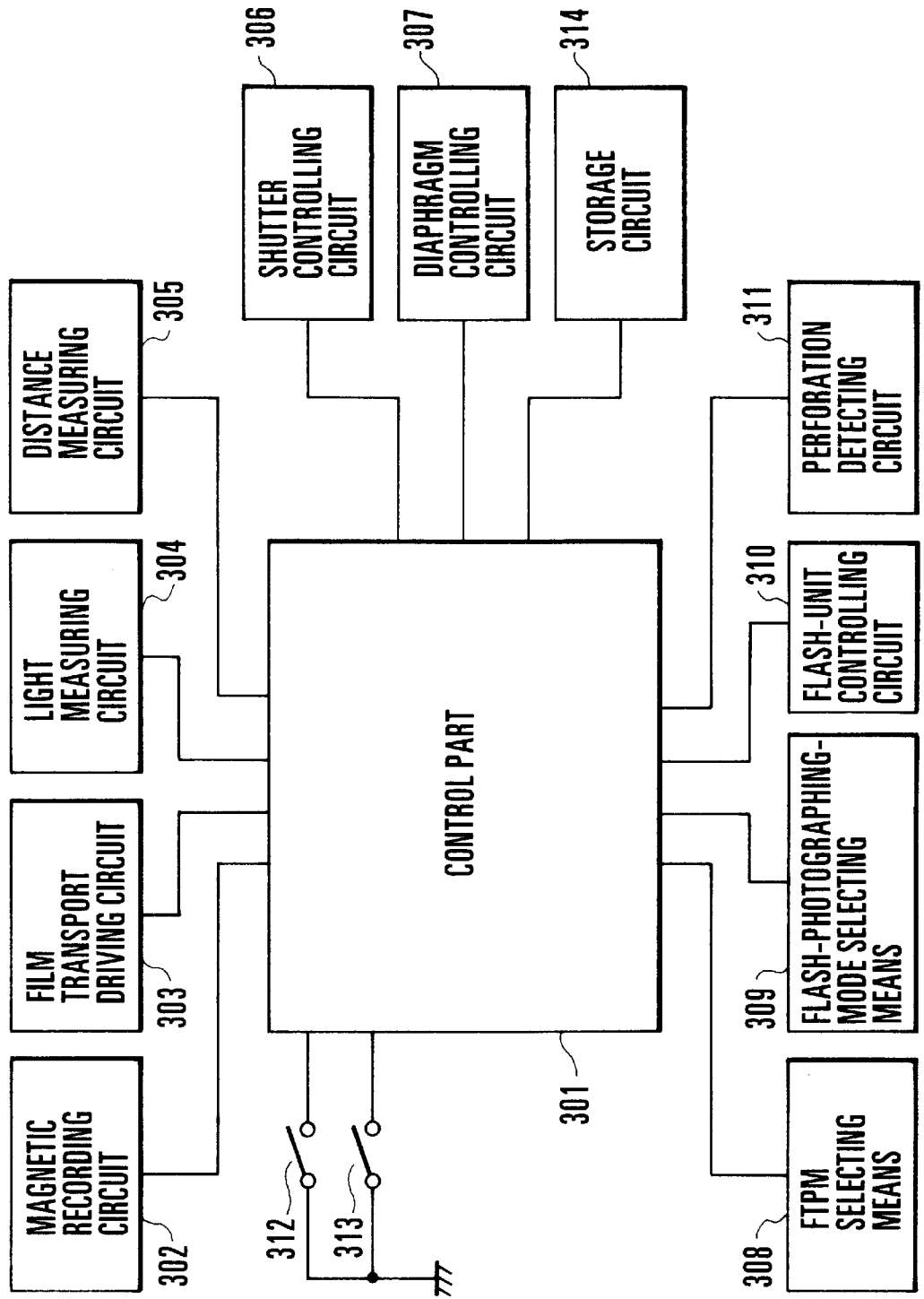
FIG. 38 is a block diagram of the electrical circuit of another example of a camera to which the present invention is applied.
Figure 39:
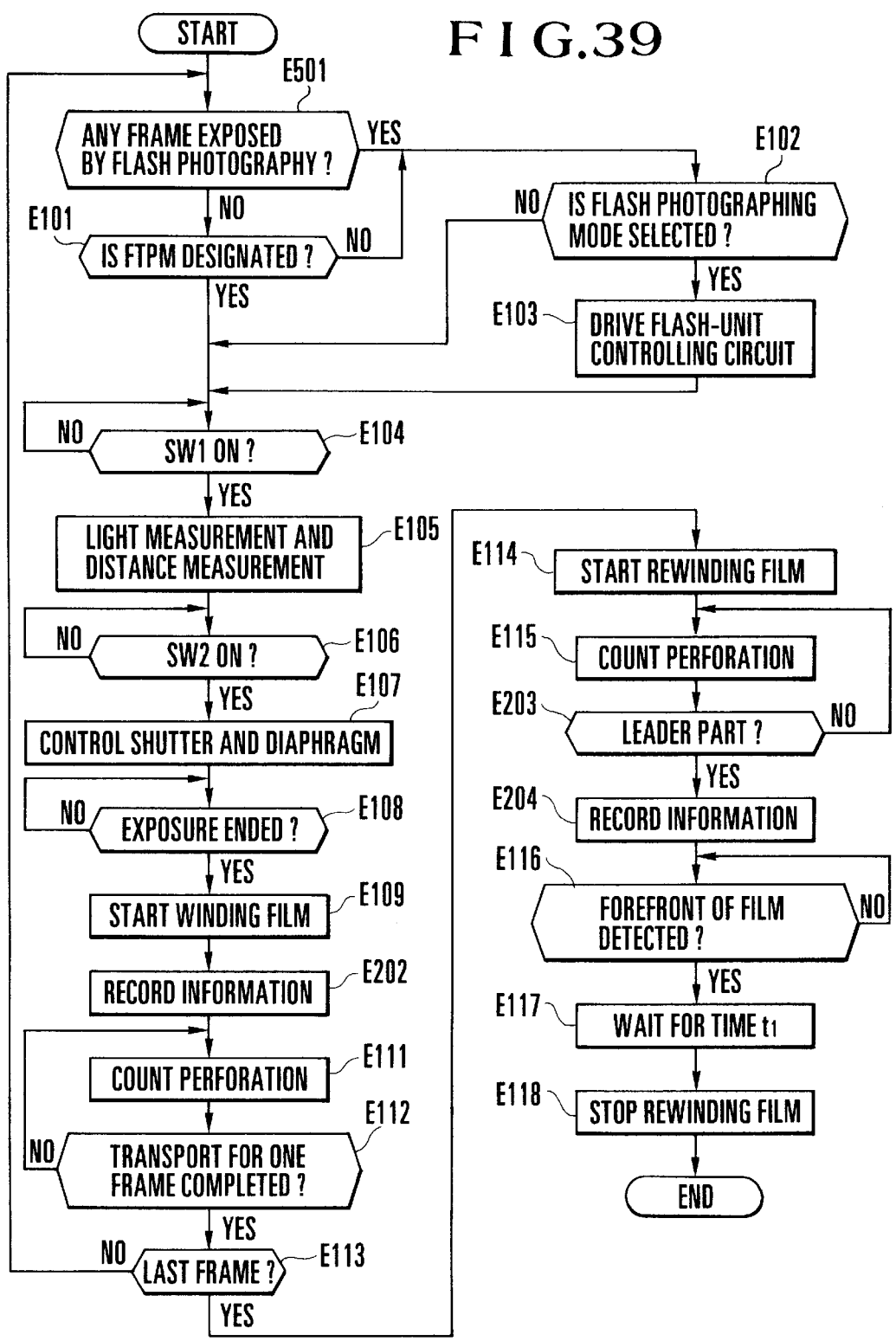
FIG. 39 is a flowchart showing the operation of a camera according to a nineteenth embodiment of the present invention.

FIGS. 38 and 39 show a nineteenth embodiment of the present invention, and FIG. 38 is a block diagram of the electrical circuit of a camera according to the nineteenth embodiment. The camera shown in FIG. 38 differs from that shown in FIG. 33 in that a storage circuit 314 is newly added. If a film cartridge is loaded in the camera and the flash-photographing-mode selecting means 309 is selected, the storage circuit 314 stores information indicating whether there is a frame exposed by flash photography.

FIG. 39 is a flowchart showing the operation of a camera according to the nineteenth embodiment of the present invention. In FIG. 39, identical reference numerals are used to denote operating steps identical to those shown in FIG. 35, and the description thereof is omitted. Referring to only steps different from those shown in FIG. 35, if it is determined in Step E501 that the storage circuit 314 stores information indicating that there is a frame exposed by flash photography, the process proceeds to Step E102, whereas if it is determined in Step E501 that the storage circuit 314 stores information indicating that there is no such frame, the process proceeds to Step E101.

Figure 40:
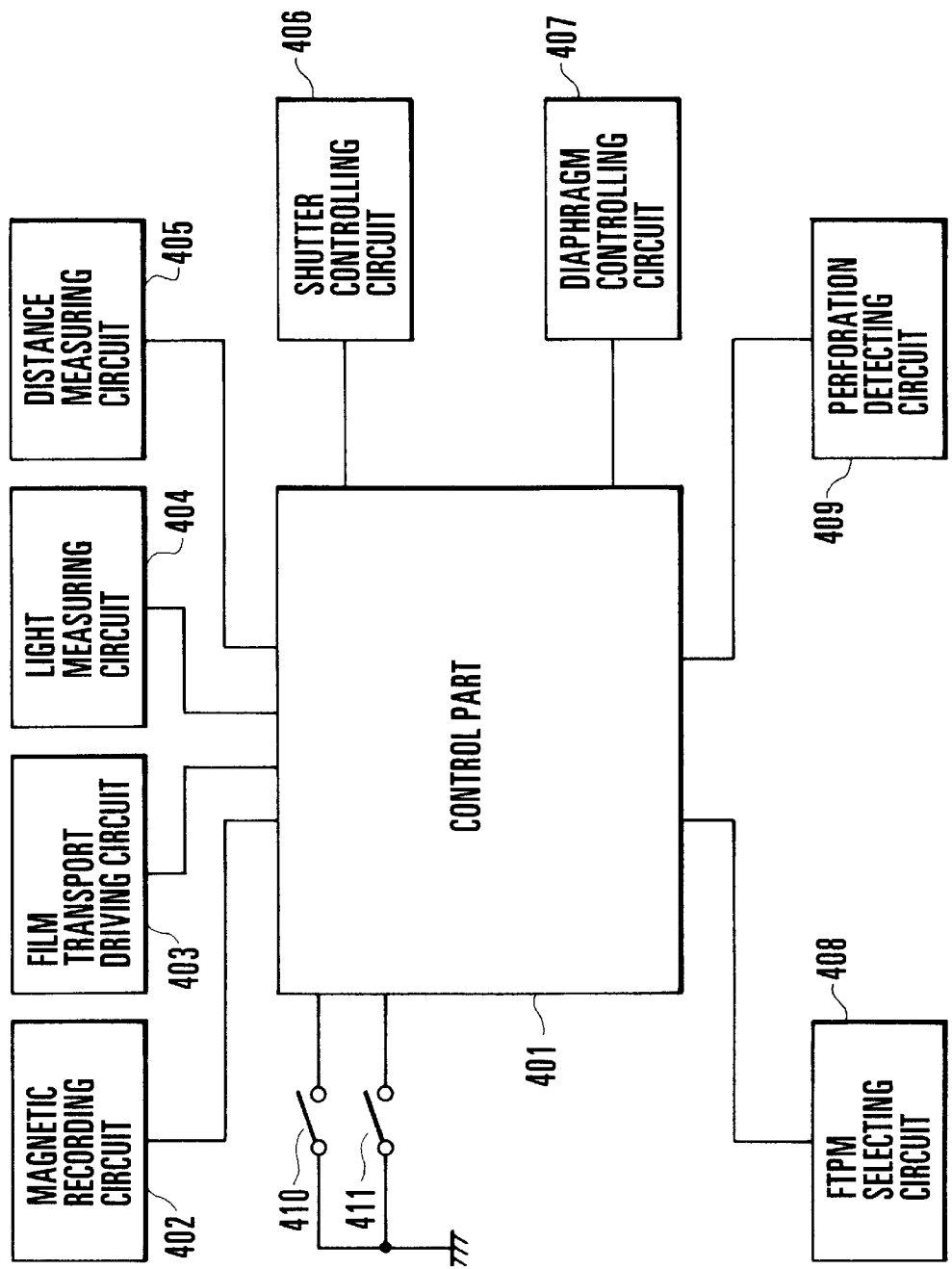
FIG. 40 is a block diagram of the electrical circuit of another example of a camera to which the present invention is applied.

FIG. 40 is a block diagram showing the electrical arrangement of a camera according to a twentieth embodiment of the present invention.

Referring to FIG. 40, the camera includes a control part 401 for controlling the entire camera, the control part 401 being formed by a microcomputer or the like, a magnetic recording circuit 402 for controlling a magnetic head (not shown) to write and read information to and from a magnetic storage part (magnetic recording area) provided on a film, a film transport driving circuit 403 for driving a film transporting motor (not shown) for winding and rewinding the film, a light measuring circuit 404, a distance measuring circuit 405, a shutter controlling circuit 406, a diaphragm controlling circuit 407, and an FTPM selecting circuit 408 for choosing whether to use FTPM (a reference amount of print exposure) for all frames during printing. The FTPM selecting circuit 408 is arranged to choose whether to perform printing based on FTPM for all frames, through the manual operation of a manual operating member (not shown). The camera also includes a perforation detecting circuit 409 for detecting the perforations of the film by means of a photoreflector or the like, a light measurement starting switch (SW1) 410, and an exposure starting switch (SW2) 411. The light measurement starting switch (SW1) 410 and the exposure starting switch (SW2) 411 are respectively arranged to be turned on at the first and second strokes of one switch member.

Figure 41:
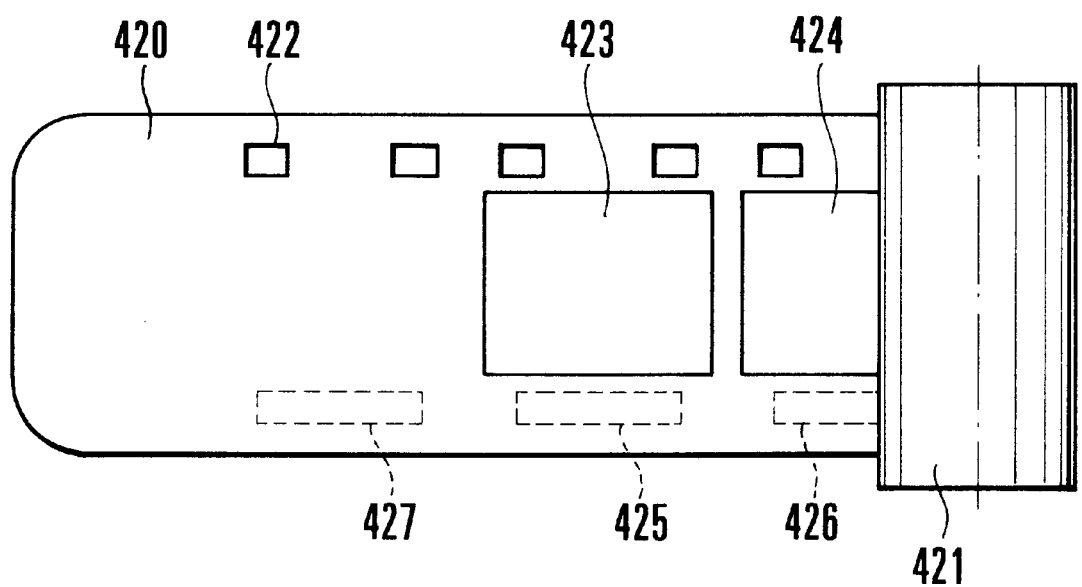
FIG. 41 is a schematic view showing the state in which a film having magnetic storage parts is drawn from a film cartridge for use in the camera shown in FIG. 40.

FIG. 41 is a schematic view showing a state in which a film provided with magnetic storage parts is drawn from a film cartridge.

Referring to FIG. 41, a film 420 provided with the magnetic storage parts (to be described later) is accommodated in a film cartridge 421, and perforations 422 are formed in the film 420. Reference numerals 423 and 424 denotes photographic image planes. The photographic image planes 423 and 424 are respectively provided with magnetic storage parts 425 and 426 on which to record information, and the photographic image plane 423 is the first frame. A magnetic storage part 427 is provided between the photographic image plane 423 which is the first frame and the forefront of the film 420.

Figure 42:
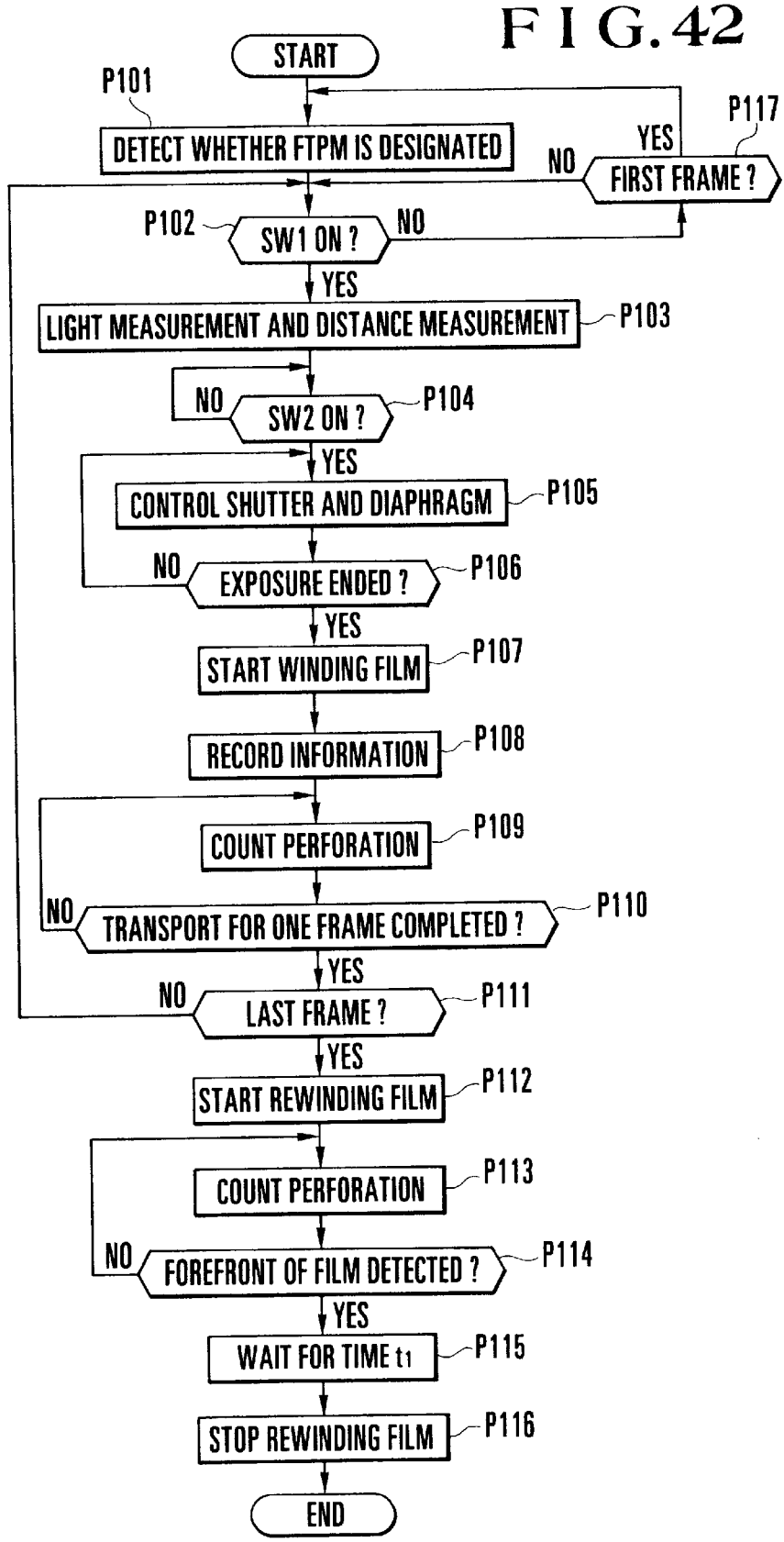
FIG. 42 is a flowchart showing the operation of the camera according to the twentieth embodiment of the present invention.

FIG. 42 is a flowchart showing the operation of a camera according to the twentieth embodiment of the present invention.

First of all, in Step P101, it is determined whether FTPM (processing based on the reference amount of print exposure) has been designated for all frames by the FTPM selecting circuit 408. Then, in Step P102, it is determined whether the switch SW1 410 is on. If it is on, the process proceeds to Step P103, in which the light measuring circuit 404 and the distance measuring circuit 405 are operated and light and distance measuring operations are respectively performed on the basis of information provided by these circuits 404 and 405.

If it is determined in Step P102 that the switch SW1 410 is not on, the process proceeds to Step P117, in which it is determined whether a frame to be exposed is the first frame. If it is the first frame, the process returns to Step P101, whereas if it is the first frame, the process proceeds to Step P102.

When the light and distance measuring operations are ended in Step P103, the process proceeds to Step P104, in which it is determined whether the switch SW2 411 is on. If it is off, the process stays in Step P104. After the switch SW2 411 has been turned on, the process proceeds to Step P105, in which the shutter controlling circuit 406 and the diaphragm controlling circuit 407 are operated to start an exposure operation. Then, in Step P106, it is detected whether the exposure operation has ended. If it has ended, the process proceeds to Step P107. Incidentally, a method for detecting whether the exposure operation has ended may be a known method using, for example, a shutter-trailing-curtain running completion signal. Since this method is known, the description thereof is omitted for the sake of simplicity.

Then, in Step P107, the film transport driving circuit 403 is made to drive a film transporting motor (not shown), thereby starting winding of the film. Then, in Step P108, the magnetic recording circuit 402 is operated to record, through the magnetic head (not shown), photographic conditions, an arbitrary comment and information indicating whether FTPM has been designated on the basis of information detected in Step P101, on the corresponding one of the magnetic storage parts provided for the respective frames on the film. Then, in Step P109, the perforation detecting circuit 409 is made to count the number of perforations formed in the film. In Step P110, it is determined whether the number of perforations for one frame has been counted, i.e., winding for one frame has been completed. If it has not been completed, the process returns to Step P109, in which the above-described operation is repeated. If it is determined in Step P110 that winding for one frame has been completed, the process proceeds to Step P111.

In Step P111, it is determined whether the exposed frame is the last frame. If it is not the last frame, the process returns to Step P102 and the photographic sequence of Steps P102 to P110 is repeated. If it is the last frame, the process proceeds to Step P112, in which the film transport driving circuit 403 is made to drive the film transporting motor (not shown), thereby starting rewinding the film. In Step P113, the perforation detecting circuit 409 is made to count the number of perforations of the film. Then, if the film for all frames is rewound and the perforation detecting circuit 409 detects the passage of the forefront of the film (Step P114), the process proceeds to Step P115, in which the process waits the timer time t1 passes. When the timer time t1 passes, the process proceeds to Step P116, in which the film transport driving circuit 403 is made to stop the film transporting motor (not shown).

Incidentally, the timer time t1 is the time required to completely roll the film in the film cartridge thereof.

In the twentieth embodiment, when exposure of the first frame is ended, detection of the state of the FTPM selecting circuit 408 is not carried out. Accordingly, during photography, even if the FTPM selecting circuit 408 is erroneously manipulated, the state of the FTPM selecting circuit 408 which has been selected before the exposure of the first frame does not change.

Figure 43:
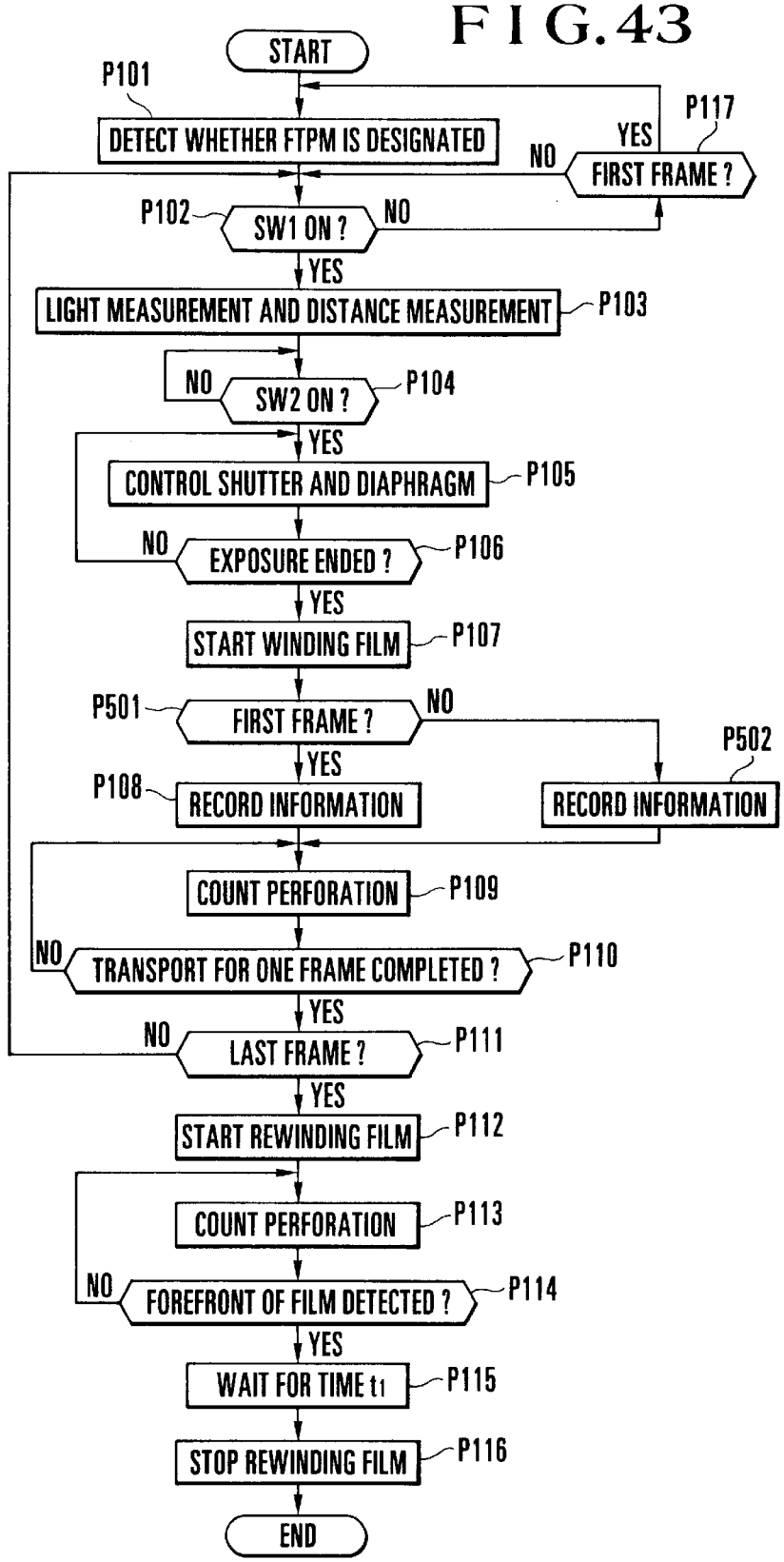
FIG. 43 is a flowchart showing the operation of a camera according to a twenty-first embodiment of the present invention.

FIG. 43 is a flowchart showing the operation of a camera according to a twenty-first embodiment of the present invention. In FIG. 43, identical reference numerals are used to denote operating steps identical to those shown in FIG. 42, and the description thereof is omitted. The circuit arrangement of the camera is similar to that shown in FIG. 40.

Referring to only steps different from those shown in FIG. 42, after winding of the film for an exposed frame is started in Step P107, the process proceeds to Step P501, in which it is determined whether the exposed frame is the first frame. If the exposed frame is the first frame, the process proceeds to Step P108, whereas if it is not the first frame, the process proceeds to Step P502. In Step P502, the magnetic recording circuit 402 is operated to record information excluding information indicating whether FTPM has been designated, such as photographic conditions and an arbitrary comment, on the corresponding one of the magnetic recording parts provided for the respective frames of the film. After that, the process proceeds to Step P109.

According to the twenty-first embodiment, since information indicating whether FTPM has been designated for all frames is recorded on at least the magnetic recording part for the first frame, it is possible to omit the operation of recording such information on each magnetic recording part. In addition, it is possible to achieve effects and advantages similar to those of the twentieth embodiment.

Figure 44:
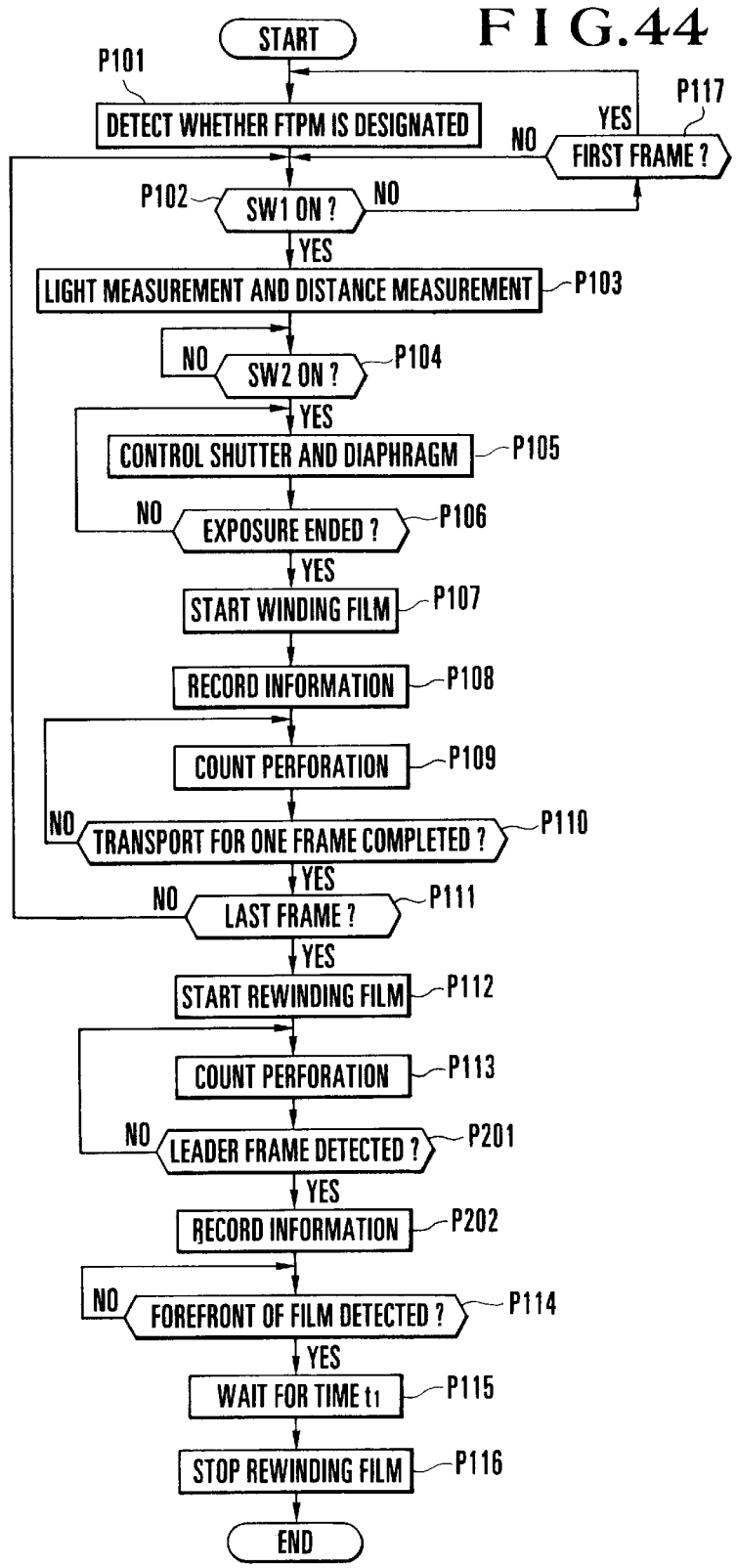
FIG. 44 is a flowchart showing the operation of a camera according to a twenty-second embodiment of the present invention.

FIG. 44 is a flowchart showing the operation of a camera according to a twenty-second embodiment of the present invention. In FIG. 44, reference numerals are used to denote operating steps identical to those shown in FIG. 42, and the description thereof is omitted. The camera has a circuit arrangement similar to that shown in FIG. 40.

Referring to only steps different from those shown in FIG. 42, after the number of perforations of the film has been counted in step P113, the process proceeds to Step P201, in which it is determined through detection by the perforation detecting circuit 409 whether the first frame is an information recording frame (leader frame) provided in the leader part of the film. If it is determined that the first frame is a leader frame, the process proceeds to Step P202, in which information indicating whether FTPM has been designated is recorded in the leader frame on the basis of the information detected in Step P101.

If the leader frame is not detected in Step P201, the process returns to Step P113 and a similar operation is repeated.

According to the twenty-second embodiment, if FTPM is designated by the FTPM selecting circuit 408, information to that effect is recorded in each of the frames and the leader part of the film. During printing, a printer may read the information from each of the frames or the leader part of the film. Accordingly, the freedom of design of a reader device for use in the printer can be expanded. In addition, it is possible to retain effects and advantages similar to those of the twentieth embodiment.

Figure 45:
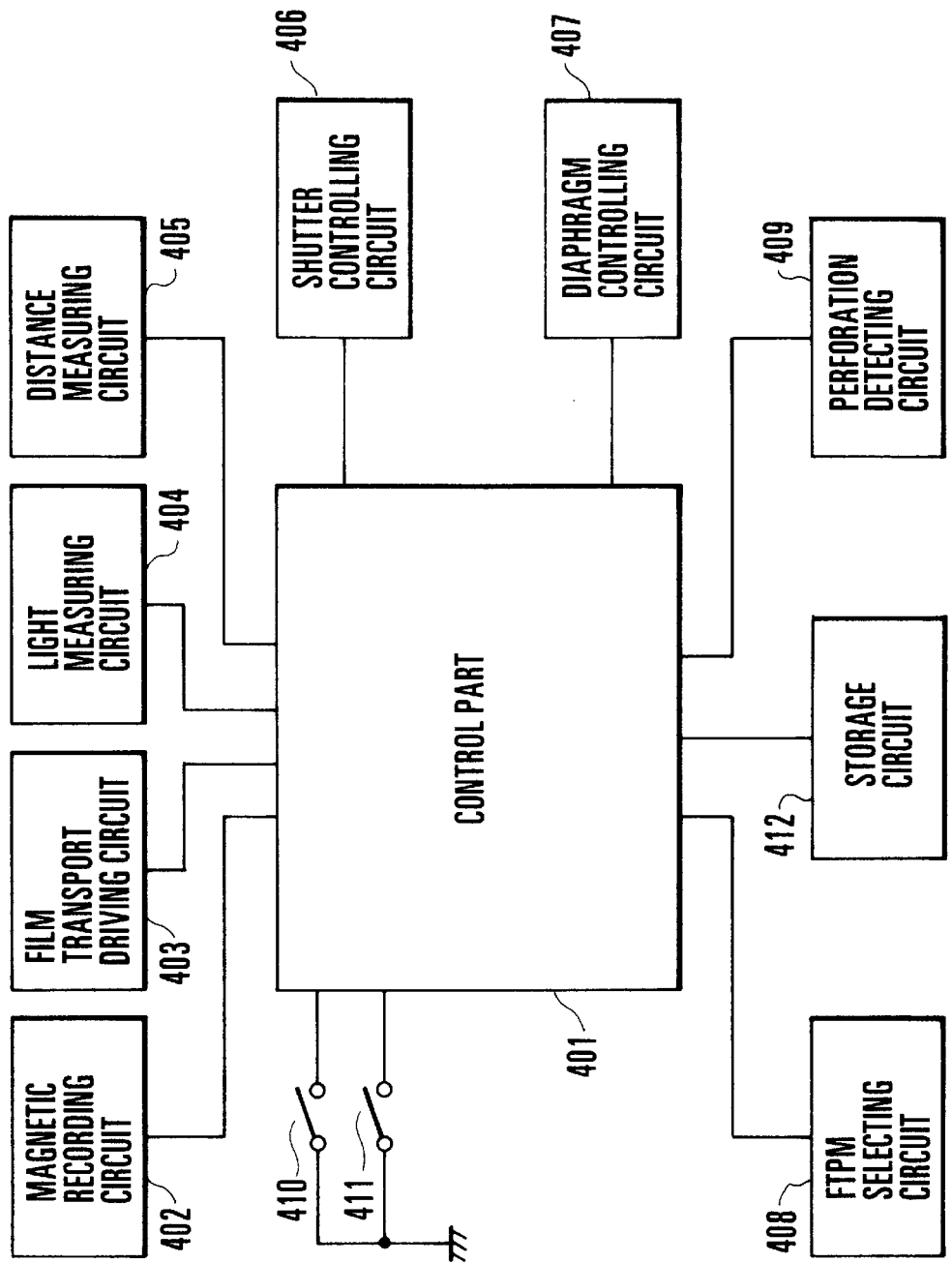
FIG. 45 is a block diagram showing the electrical arrangement of a camera according to a twenty-third embodiment of the present invention.

FIG. 45 is a block diagram showing the electrical arrangement of a camera according to a twenty-third embodiment of the present invention. In FIG. 45, identical reference numerals are used to denote constituent elements identical to those shown in FIG. 40, and the description thereof is omitted.

The arrangement shown in FIG. 45 differs from that shown in FIG. 40 in that a storage circuit 412 capable of storing a large amount of information, such as photographic conditions and arbitrary comments relative to exposed frames, is connected to the control part 401.

Figure 46:
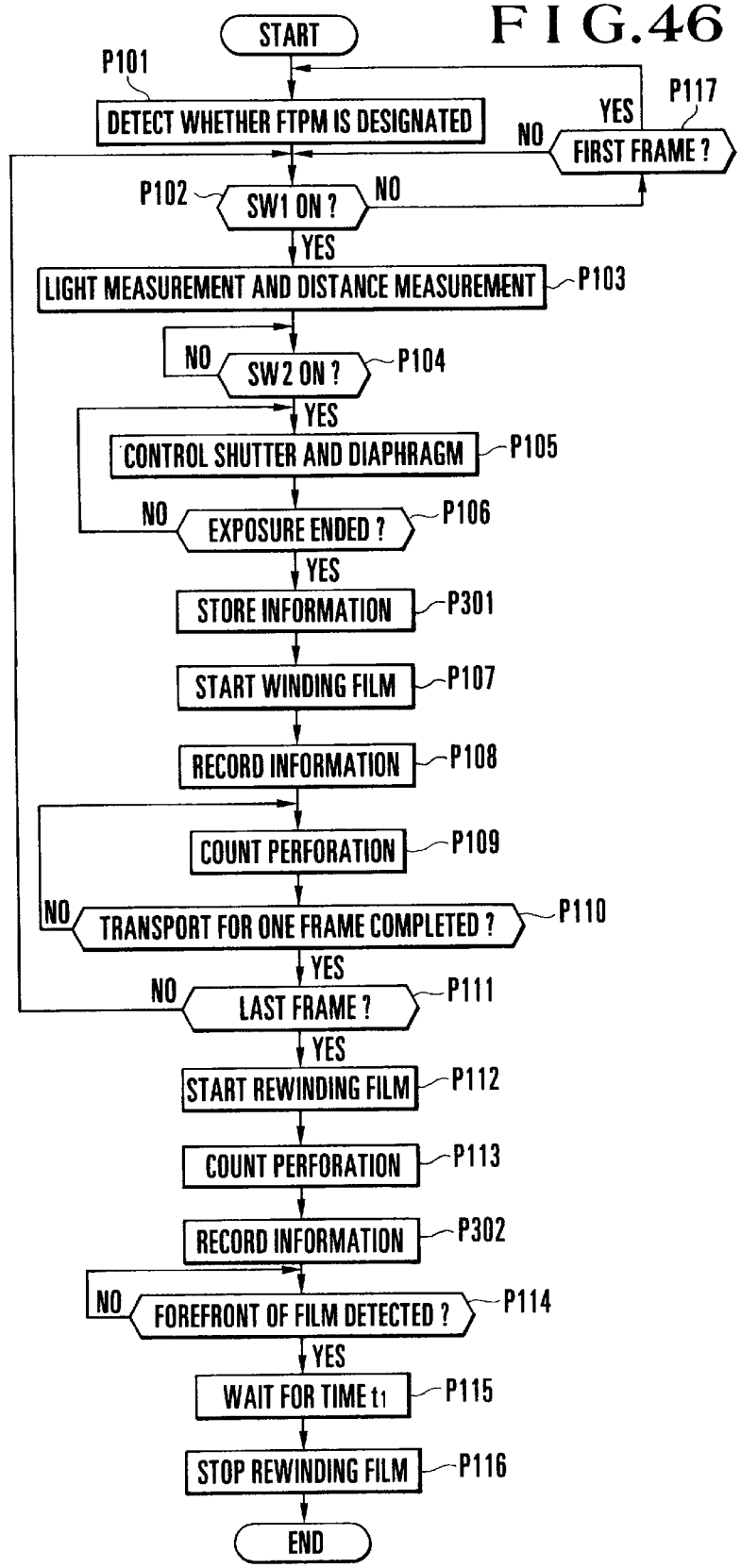
FIG. 46 is a flowchart showing the operation of the camera according to the twenty-third embodiment of the present invention.

FIG. 46 is a flowchart showing the operation of the camera according to the twenty-third embodiment of the present invention. In FIG. 46, identical reference numerals are used to denote operating steps identical to those shown in FIG. 42, and the description thereof is omitted.

A first difference between the flowcharts of FIGS. 46 and 42 is that Step P108 is omitted and Step P301 is added between Steps P106 and P107. Specifically, if it is determined in Step P106 of FIG. 46 that an exposure operation for a frame has ended, the process proceeds to Step P301, in which photographic conditions, an arbitrary comment and information indicating whether FTPM has been designated, which information is based on the information detected in P101, are recorded in the storage circuit 412.

A second difference between the flowcharts of FIGS. 46 and 42 is that Step P302 is added between Steps P113 and P114. After the number of perforations of the film is counted in Step P113, the process proceeds to Step P302, in which the photographic conditions, the arbitrary comments and the aforesaid information for the respective frames which are stored in the storage circuit 412 are recorded on magnetic storage parts for the respective frames on the film by the magnetic recording circuit 402 during rewinding.

According to the twenty-third embodiment of the present invention, if FTPM is designated by the FTPM selecting circuit 408, information to that effect is recorded on the magnetic storage parts for the respective frames during rewinding of the film, whereby stable recording is possible (because the variation of transporting speed is smaller during rewinding). In addition, it is possible to retain effects and advantages similar to those of the twentieth embodiment.

Figure 47:
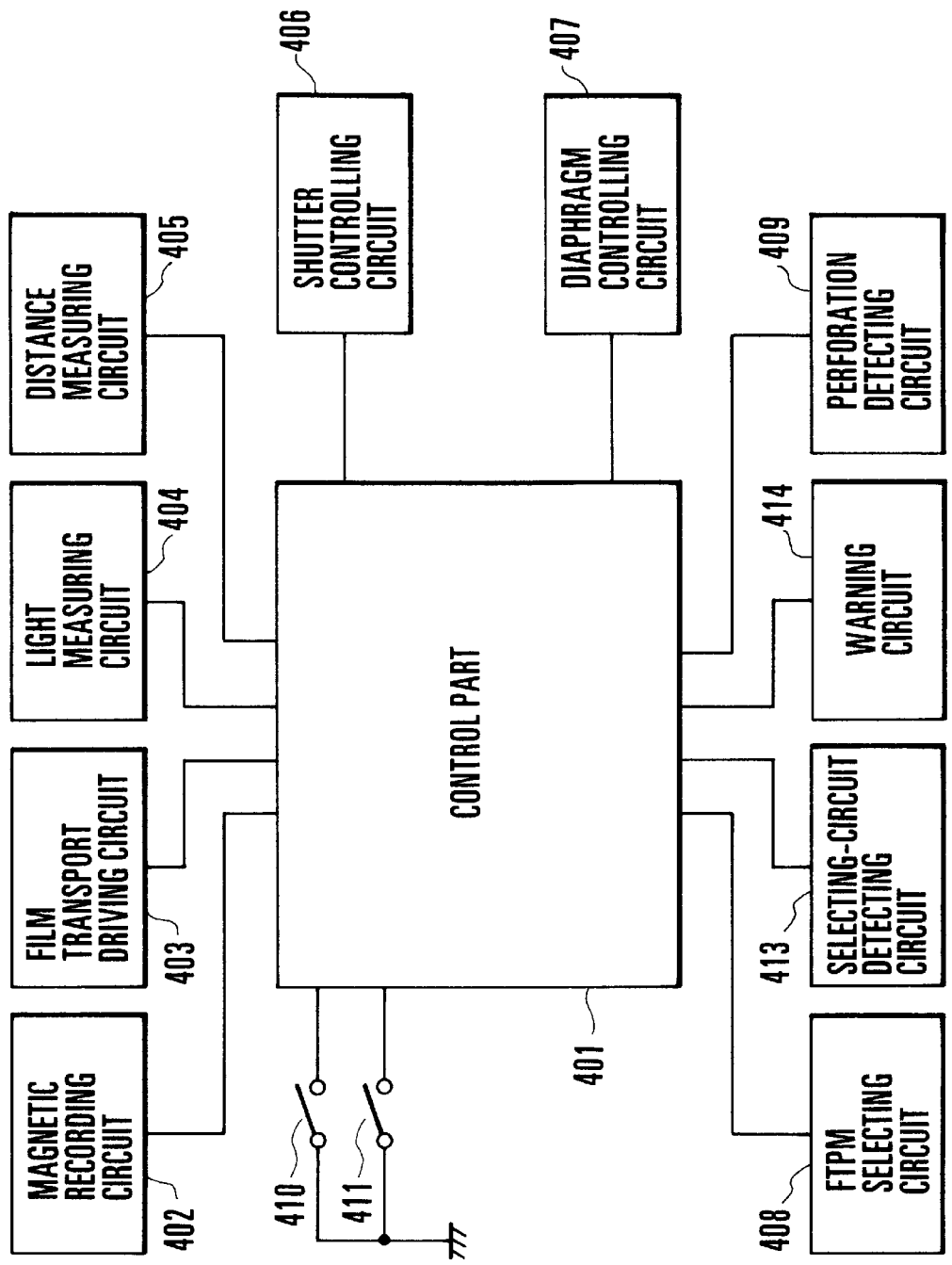
FIG. 47 is a block diagram showing the electrical arrangement of a camera according to a twenty-fourth embodiment of the present invention.

FIG. 47 is a block diagram showing the electrical arrangement of a camera according to a twenty-fourth embodiment of the present invention. In FIG. 47, identical reference numerals are used to denote constituent elements identical to those shown in FIG. 40, and the description thereof is omitted.

The arrangement of FIG. 47 differs from that of FIG. 40 in that a selecting-circuit detecting circuit 413 and a warning circuit 414 are added. The selecting-circuit detecting circuit 413 is provided for detecting whether FTPM has been selected (designated) by the FTPM selecting circuit 408, and the warning circuit 414 is provided for warning that no FTMP has been selected by the FTPM selecting circuit 408, on the basis of a detection result provided by the selecting-circuit detecting circuit 413. A specific example of the warning circuit 414 may be a display circuit using a light-emitting diode, a liquid-crystal display or the like, or a sound generating circuit using a buzzer, a speaker or the like.

Figure 48:
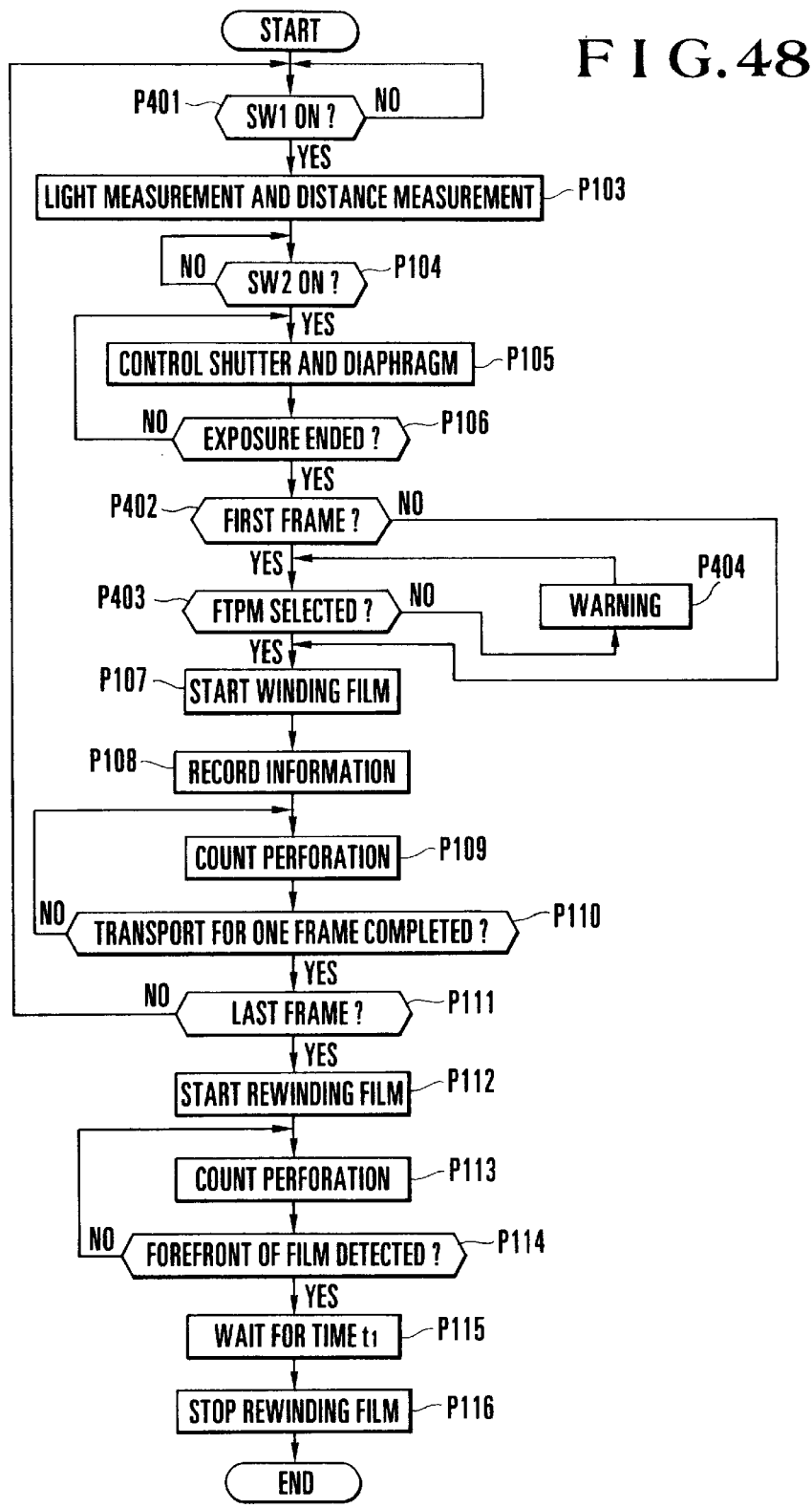
FIG. 48 is a flowchart showing the operation of the camera according to the twenty-fourth embodiment of the present invention.

FIG. 48 is a flowchart showing the operation of a camera according to a twenty-fourth embodiment of the present invention. In FIG. 48, identical reference numerals are used to denote operating steps identical to those shown in FIG. 42, and the description thereof is omitted.

Referring to only steps different from those shown in FIG. 42, in Step P401, it is determined whether the light measurement starting switch (SW1) 410 is on. If it is on, the process proceeds to Step P103.

If it is determined in Step P106 that an exposure operation for a frame has been completed, the process proceeds to Step P402, in which it is determined whether the exposed frame is the first frame. If it is the first frame, the process proceeds to Step P403, whereas if it is not the first frame, the process proceeds to Step P107. In Step P403, the selecting-circuit detecting circuit 413 is used to determine whether designation of FTPM has been selected, and, if selected, whether FTPM has been selected (designated). If FTPM has been selected, the process proceeds to Step P107, whereas if FTPM has not been selected, the process proceeds to Step P404.

In Step P404, the warning circuit 414 is made to warn that FTPM has not been selected.

According to the twenty-fourth embodiment, if the selecting-circuit detecting circuit 413 detects that FTPM has not been selected by the FTPM selecting circuit 408, the camera is made inoperative. Since the warning circuit 414 for issuing a warning to that effect is provided, a photographer can be informed that FTPM has not been selected by the FTPM selecting circuit 408. In addition, it is possible to achieve effects and advantages similar to those of the twentieth embodiment.

Figure 49:
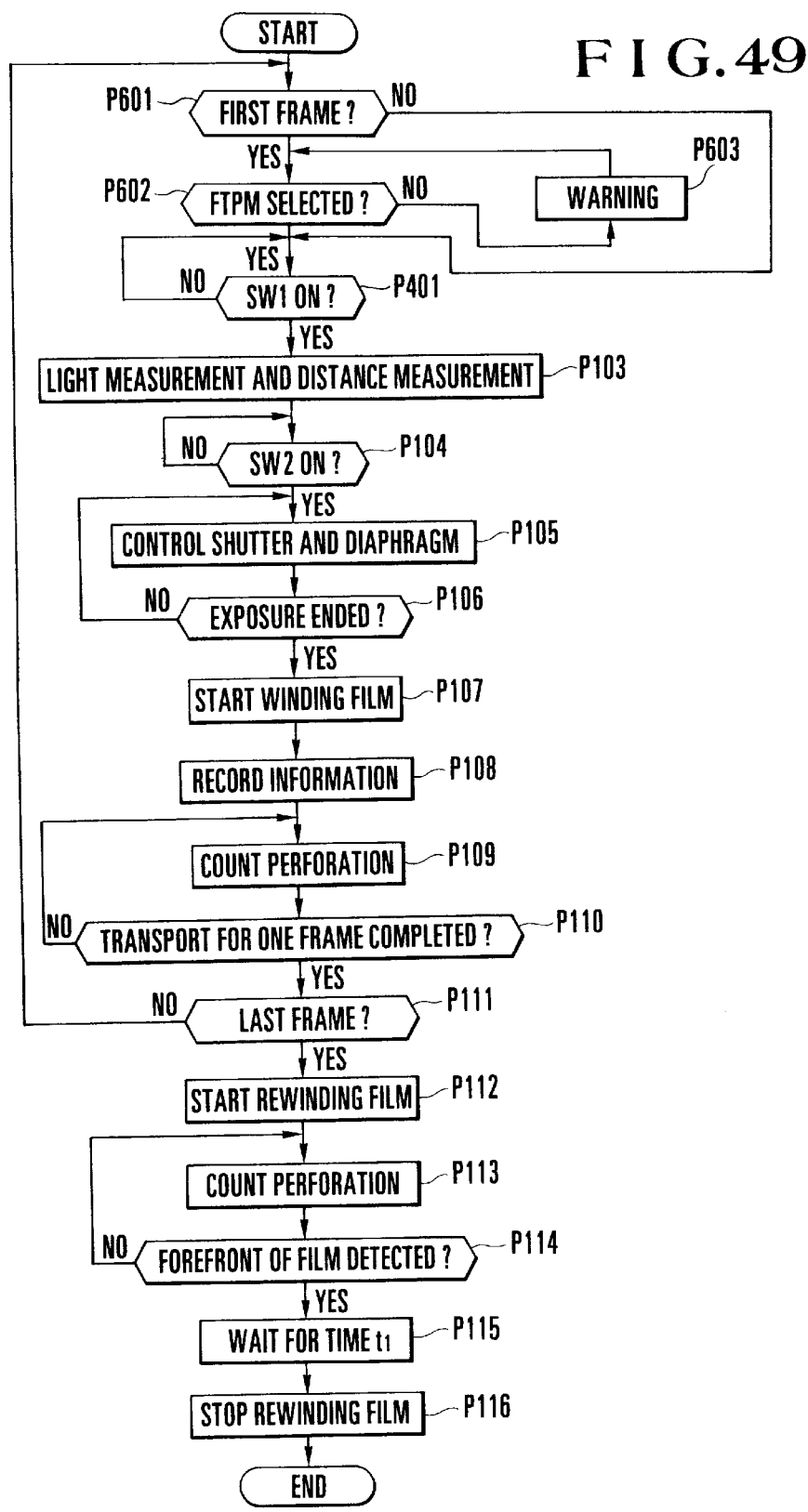
FIG. 49 is a flowchart showing the operation of a camera according to a twenty-fifth embodiment of the present invention.

FIG. 49 is a flowchart showing the operation of a camera according to the twenty-fifth embodiment of the present invention. In FIG. 49, identical reference numerals are used to denote operating steps identical to those shown in FIG. 48, and the description thereof is omitted. The camera has a circuit arrangement similar to that shown in FIG. 47.

A difference between the flowcharts of FIG. 49 and 48 is that Steps P402–P404 are omitted and Steps P601–P603 are added before Step P401.

Referring to only the newly added steps, in Step P601, it is determined whether a frame to be exposed is the first frame. If it is the first frame, the process proceeds to Step P602, whereas if it is not the first frame, the process proceeds to Step P401. In Step P602, the selecting-circuit detecting circuit 413 is used to determine whether designation of FTPM has been selected, and, if selected, whether FTPM has been selected (designated). If FTPM has been selected, the process proceeds to Step P401, whereas if FTPM has not been selected, the process proceeds to Step P603. In Step P603, the warning circuit 414 warns that FTPM has not been selected.

According to the twenty-fifth embodiment, similarly to the twenty-fourth embodiment, if the selecting-circuit detecting circuit 413 detects that FTPM has not been selected by the FTPM selecting circuit 408, the camera is made inoperative. Since the warning circuit 414 for issuing a warning to that effect is provided, a photographer can be informed that FTPM has not been selected by the FTPM selecting circuit 408. In addition, it is possible to achieve effects and advantages similar to those of the twentieth embodiment.

Incidentally, in each of the above-described embodiments, although information for each individual frame as well as information common to all frames consists of one bit, the number of bits per information may be increased. For example, to cope with a camera which does not have the function of generating information indicative of various information recording methods, the following two-bit information may be prepared:

00 . . . not specified
10 . . . automatic printing (printer AE)
11 . . . fixed time of print exposure In this case, it is possible to determine whether printer AE has been intentionally designated.

Incidentally, in the description of each of the above-described embodiments, the reference amount of print exposure is referred to also as the fixed time of print exposure. However, the concept of the reference amount of print exposure also includes the average value of the integral transmission densities of all frames or a plurality of continuously exposed frames of one film, or the amount of exposure obtained by compensating for the amount of exposure of automatic printing by a predetermined amount. The term "automatic printing" means a laboratory system or the like in which all frames are processed with a so-called average exposure on the basis of the integral transmission density of a single frame.

What is claimed is:

1. A camera including:
    a recording part for recording information relative to a printing processing method on a film; and
    processing means for determining whether photography suited to automatic printing has been performed and for causing said recording part to record on a film in a single film area specific information indicative of an instruction to inhibit automatic printing of all frames of the film, if said processing means determines that the photography suited to automatic printing has not been performed.

2. A camera according to claim 1, wherein said processing means determines that photography unsuited to automatic printing has been performed, with regard to a frame correctly exposed under automatic exposure control or a manually exposed frame.

3. A camera according to claim 1, wherein said processing means causes said recording part to record the specific information if said processing means determines that photography unsuited to automatic printing has been performed for all exposed frames.

4. A camera including:
    a recording part for recording information relative to a printing processing method on a film; and
    processing means for determining whether photography suited to automatic printing has been performed and for causing said recording part to record on a film in a single film area specific information indicative of an instruction to perform print exposure different from the automatic printing for all frames of the film, if said processing means determines that the photography suited to automatic printing has not been performed.

5. A camera according to claim 4, wherein said processing means determines that photography unsuited to automatic printing has been performed, with regard to a frame correctly exposed under automatic exposure control or a manually exposed frame.

6. A camera according to claim 4, wherein said processing means causes recording of the specific information if said processing means determines that photography unsuited to automatic printing has been performed for all exposed frames.

7. A camera according to claim 4, wherein the specific information is information indicative of an instruction to set a printing period of time to a fixed period of time.

8. A camera including:
    a recording part for recording information relative to a printing processing method on a film; and
    processing means for determining whether or not each frame of the film is photographed appropriately for auto-printing and for causing said recording part to record specific information on all of the frames to prohibit the auto-printing when the number of the frames determined to be appropriately photographed for the auto-printing is less than a predetermined number even when there is a frame which is determined to be photographed appropriately for auto-printing.

9. A camera according to claim 8, wherein said processing means determines that photography unsuited to auto-printing has been performed, with regard to a frame correctly exposed under automatic exposure control or a manually exposed frame.

10. A camera according to claim 8, wherein the specific information is information indicative of an instruction to set a printing period of time to a fixed period of time.

11. A camera including recording part for recording information relative to a printing processing method on a film, comprising:
    processing means for determining whether photography suited to automatic printing has been performed and having a first mode for causing said recording part to record on a film specific information indicative of an instruction to inhibit automatic printing of all frames of the film, if said processing means determines that photography suited to automatic printing has not been performed, and a second mode for forcedly causing said recording part to record on the film the specific information indicative of the instruction to inhibit automatic printing of all frames of the film; and selecting means for selecting the first mode or the second mode.

12. A camera according to claim 11, wherein said processing means further has a third mode for inhibiting said recording part from recording the specific information, said selecting means being arranged to select the first, second or third mode.

13. A camera according to claim 11, wherein said processing means determines that photography unsuited to automatic printing has been performed, with regard to a frame correctly exposed under automatic exposure control or a manually exposed frame.

14. A camera according to claim 11, wherein said processing means, when in the first mode, causes said recording part to record the specific information if said processing means determines that photography unsuited to automatic printing has been performed for all or not less than a predetermined number of exposed frames.

15. A camera including:

a recording part for recording information relative to a printing processing method on a film; and processing means for determining whether photography suited to automatic printing processing has been performed for each of individual frames and for causing said recording part to record on a film specific information indicative of an instruction to inhibit automatic printing of all frames of the film, when said processing means determines the number of frames which are photographed not suitably for automatic printing is more than a predetermined number even if said processing means does not determine that all frames are photographed not suitably for automatic printing, as well as for, if said processing means determines that the photography suited to automatic printing has not been performed for not greater than a predetermined number of frames, causing said recording part to selectively record on the film on a frame-by-frame basis information indicative of an instruction to individually inhibit automatic printing of each of the frames for which photography suited to automatic printing has not been performed, in accordance with a decision result as to each of the individual frames provided by said processing means.

16. A camera according to claim 15, wherein said processing means determines that photography unsuited to the automatic printing processing has been performed, with regard to a frame correctly exposed under automatic exposure control or a manually exposed frame.

17. A camera according to claim 15, wherein the specific information is information indicative of an instruction to set a printing period of time to a fixed period of time.

18. A camera including a recording part for recording information relative to a printing processing method on a film, comprising:

processing means having a first mode for causing said recording part to record in a single film area on a film specific information indicative of an instruction to inhibit automatic printing of all frames of the film and a second mode for causing said recording part to selectively record on the film on a frame-by-frame basis information indicative of an instruction to individually inhibit automatic printing of each of the frames; and selecting means for selecting the first or second mode.

19. A camera according to claim 18, wherein the specific information is information indicative of an instruction to set a printing period of time to a fixed period of time.

20. A camera including a recording part for recording information relative to a printing processing method on a film, comprising:

selecting means for choosing whether forcibly to cause said recording part to record specific information indicative of an instruction to inhibit automatic printing of all frames of a film; and processing means for determining whether photography suited to automatic printing has been performed and for inhibiting, if said processing means determines that the photography suited to automatic printing has not been performed for less than a predetermined number of frames, said recording part from recording the specific information, even if it is chosen by said selecting means that said recording part be forcibly caused to record the specific information.

21. A camera according to claim 20, wherein said processing means determines that photography unsuited to the automatic printing processing has been performed, with regard to a frame correctly exposed under automatic exposure control, a manually exposed frame or a frame exposed in a specific light measurement mode, an exposure compensation mode or an automatic exposure bracketing mode.

22. A camera according to claim 20, wherein the specific information is information indicative of an instruction to set a printing period of time to a fixed period of time.

23. A camera according to claim 20, wherein, if said processing means determines that the photography suited to automatic printing has not been performed for less than a predetermined number of frames, said processing means causes said recording part to record on the film on a frame-by-frame basis information indicative of an instruction to individually inhibit automatic printing of each of the frames for which photography suited to automatic printing has not been performed, in accordance with a decision result as to each of the frames of the film provided by said processing means, even if it is chosen by said selecting means that said recording part be caused to record the specific information.

24. A camera including a recording part for recording information relative to a printing processing method on a film, comprising:

selecting means for choosing whether to cause said recording part to record specific information indicative of an instruction to inhibit automatic printing; and processing means for inhibiting said camera from operating in a predetermined photographing mode, when it is chosen by said selecting means that said information recording means be caused to record the specific information.

25. A camera according to claim 24, wherein the predetermined photographing mode is a flash photographing mode.

26. A camera according to claim 24, wherein the specific information is information indicative of an instruction to set a printing period of time to a fixed period of time.

27. A camera including a recording part for recording information relative to a printing processing method on a film, comprising:

selecting means for choosing whether to cause said recording part to record specific information indicative of an instruction to inhibit automatic printing; and processing means for inhibiting, if exposed frames include a frame exposed in a specific photographic state, said selecting means from causing said information recording means to record the specific information.

28. A camera according to claim 27, wherein the specific photographic state is flash photography.

29. A camera according to claim 27, wherein the specific information is information indicative of an instruction to set a printing period of time to a fixed period of time.

30. A camera including:

a recording part for recording information relative to a printing processing method on a film and processing means for permitting under a predetermined condition acceptance of an instruction to record in a single film area specific information for inhibiting automatic printing of all frames of the film.

31. A camera according to claim 30, wherein the specific information is information indicative of an instruction to set a printing period of time to a fixed period of time.

32. A camera including a recording part for recording information relative to a printing processing method on a film, comprising:

(a) selecting means for selecting an instruction to record specific information for inhibiting automatic printing of all frames of a film; and (b) processing means for restraining, after said camera has performed a predetermined operation, said selecting means from selecting the instruction to record the specific information.

33. A camera according to claim 32, wherein said processing means operates to restrain said selecting means from selecting the instruction to record the specific information after exposure of a first frame has been performed by said camera.

34. A camera according to claim 32, wherein the specific information is information indicative of an instruction to set a printing period of time to a fixed period of time.

* * * * *